United States Patent
Yasui et al.

(10) Patent No.: US 6,684,150 B2
(45) Date of Patent: Jan. 27, 2004

(54) APPARATUS FOR AND METHOD OF CONTROLLING PLANT

(75) Inventors: Yuji Yasui, Wako (JP); Hiroshi Tagami, Wako (JP); Yoshihisa Iwaki, Wako (JP); Kunihiro Morishita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 161 days.

(21) Appl. No.: 10/068,096

(22) Filed: Feb. 1, 2002

(65) Prior Publication Data

US 2002/0143460 A1 Oct. 3, 2002

(30) Foreign Application Priority Data

Feb. 1, 2001 (JP) .......................... 2001-025472

(51) Int. Cl.$^7$ .................. F02D 41/14; F01N 3/10; G05B 13/04
(52) U.S. Cl. ................. 701/106; 701/109; 700/29; 60/276; 60/285
(58) Field of Search ................. 701/101, 102, 701/103, 106, 109, 115; 60/274, 276, 284, 285; 123/672, 673, 674, 679; 700/28, 29, 50, 52

(56) References Cited

U.S. PATENT DOCUMENTS

| | | | |
|---|---|---|---|
| 5,253,630 A | 10/1993 | Akazaki et al. | 123/682 |
| 5,391,282 A | 2/1995 | Miyashita et al. | 204/401 |
| 5,531,208 A | 7/1996 | Hasegawa et al. | 123/673 |
| 5,558,075 A | 9/1996 | Maki et al. | 123/680 |
| 5,568,799 A | 10/1996 | Akazaki et al. | 123/480 |
| 6,079,205 A | 6/2000 | Yasui et al. | 60/276 |
| 6,082,099 A | 7/2000 | Yasui et al. | 60/276 |
| 6,112,517 A | 9/2000 | Yasui et al. | 60/274 |
| 6,188,953 B1 * | 2/2001 | Yasui et al. | 701/109 |
| 6,256,983 B1 * | 7/2001 | Yasui | 60/285 |
| 6,266,605 B1 * | 7/2001 | Yasui et al. | 701/109 |

FOREIGN PATENT DOCUMENTS

| | | |
|---|---|---|
| JP | 04-369471 A | 12/1992 |
| JP | 05-079374 A | 3/1993 |
| JP | 07-083094 A | 3/1995 |
| JP | 08-021273 A | 1/1996 |
| JP | 08-105345 A | 4/1996 |
| JP | 11-093740 A | 4/1999 |
| JP | 11-093741 A | 4/1999 |
| JP | 11-153051 A | 6/1999 |

* cited by examiner

Primary Examiner—Willis R. Wolfe
(74) Attorney, Agent, or Firm—Lahive & Cockfield, LLP

(57) ABSTRACT

A manipulation variable generating unit 7 for generating a target air-fuel ratio KCMD to converge the output of an oxygen concentration sensor 5 disposed downstream of a catalytic converter 3 in an exhaust system E as a plant to a given target value has a plurality of estimators for generating data indicating estimated values of the output of the oxygen concentration sensor after a dead time of the exhaust system E or a total dead time which is the sum of the dead time of the exhaust system E and a dead time of a system comprising an engine control unit 8 and an internal combustion engine 1, according to respective different algorithms. The manipulation variable generating unit 7 generates the target air-fuel ratio KCMD according to an adaptive sliding mode control process using a value selected from the estimated values or a combined value representing a combination of the estimated values.

80 Claims, 18 Drawing Sheets

FIG. 7

| RULE No. | ANTECEDENT PART | | CONSEQUENT PART |
|---|---|---|---|
| | $\sigma(k)$ | $VO2(k)$ | $\overline{VO2F}(k+d)$ |
| 1 | N (NEGATIVE) | N (NEGATIVE) | N (NEGATIVE) |
| 2 | N (NEGATIVE) | Z (ZERO) | N (NEGATIVE) |
| 3 | N (NEGATIVE) | P (POSITIVE) | N (NEGATIVE) |
| 4 | Z (ZERO) | N (NEGATIVE) | Z (ZERO) |
| 5 | Z (ZERO) | Z (ZERO) | Z (ZERO) |
| 6 | Z (ZERO) | P (POSITIVE) | Z (ZERO) |
| 7 | P (POSITIVE) | N (NEGATIVE) | P (POSITIVE) |
| 8 | P (POSITIVE) | Z (ZERO) | P (POSITIVE) |
| 9 | P (POSITIVE) | P (POSITIVE) | P (POSITIVE) |

APPARATUS FOR AND METHOD OF CONTROLLING PLANT

BACKGROUND OF THE INVENTION

1. Field of the Invention

The present invention relates to an apparatus for and a method of controlling a plant.

2. Description of the Related Art

The applicant of the present application has proposed a technique for controlling the air-fuel ratio of an air-fuel mixture to be combusted in an internal combustion engine, and hence the air-fuel ratio of an exhaust gas that enters a catalytic converter (hereinafter referred to as "upstream-of-catalyst air-fuel ratio") in order to converge the output of an exhaust gas sensor (oxygen concentration sensor) to a given target value (constant value), the oxygen concentration sensor being disposed downstream of the catalytic converter for detecting the concentration of a certain component, e.g., the concentration of oxygen, in the exhaust gas that has passed through the catalytic converter, in order to enable the catalytic converter disposed in the exhaust passage of the internal combustion engine to perform its desired exhaust gas purifying capability, as disclosed in Japanese laid-open patent publication No. 11-93740 and U.S. Pat. No. 6,079,205. The upstream-of-catalyst air-fuel ratio is specifically the air-fuel ratio of a combusted air-fuel mixture that enters the catalytic converter, as recognized from the concentration of oxygen in the exhaust gas.

According to the disclosed system, an exhaust system ranging from an upstream side of the catalytic converter to the oxygen concentration sensor disposed downstream of the catalytic converter is used a system to be controlled. A manipulation variable for determining the upstream-of-catalyst air-fuel ratio as an input quantity for the exhaust system, e.g., a target air-fuel ratio for the exhaust gas, is successively generated in order to converge the output of the oxygen concentration sensor as an output variable from the exhaust system to the target value. By manipulating the air-fuel ratio of the air-fuel mixture combusted in the internal combustion engine depending on the target air-fuel ratio, the upstream-of-catalyst air-fuel ratio is manipulated into the target air-fuel ratio, and hence the output of the oxygen concentration sensor is converged to the target value.

The exhaust system has a relatively long dead time owing to the catalytic converter included in the exhaust system. While the internal combustion engine is operating in a low rotational speed range, e.g., is idling, the dead time of a system for generating the upstream-of-catalyst air-fuel ratio from the target air-fuel ratio, which system includes the internal combustion engine and will be referred to as "air-fuel ratio manipulating system") is also relatively long. These dead times tend to adversely affect the process of converging the output of the oxygen concentration sensor to the target value. According to the above technique, therefore, data representing an estimated value for the output of the oxygen concentration sensor after the dead time of the exhaust system or the sum of the dead time of the exhaust system and the dead time of the air-fuel ratio manipulating system is sequentially generated according to an algorithm which is constructed based on a predetermined model of the exhaust system. The target air-fuel ratio is generated using the above estimated value. The target air-fuel ratio is generated according to a sliding mode control process (specifically, an adaptive sliding mode control process) which is one type of feedback control process.

The air-fuel ratio of the exhaust gas while the output of the oxygen concentration sensor is being converged to the target value is an air-fuel ratio close to a stoichiometric air-fuel ratio.

According to the above technique, the control process of converging the output of the oxygen concentration sensor to the target value can stably be carried out while compensating for the effect of the dead times of the exhaust system and the air-fuel ratio manipulating system, and the good purifying capability of the catalytic converter can be maintained irrespectively of a degraded state of the catalytic converter.

In the above technique, if the exhaust system is regarded as a plant, then the internal combustion engine can be regarded as an actuator for generating the upstream-of-catalyst air-fuel ratio as an input to the plant and the oxygen concentration sensor as a detecting means for detecting the concentration of oxygen as an output of the plant.

Generally, internal combustion engines mounted on automobiles or the like are not always operated at an air-fuel ratio close to a stoichiometric air-fuel ratio in a mode referred to as "stoichiometric operation mode". Depending on the operating conditions, the internal combustion engine may be operated with the fuel supply being cut off or operated in a lean air-fuel ratio range in a mode referred to as "lean operation mode". The control process of converging the output of the oxygen concentration sensor to the target value is carried out in the stoichiometric operation mode.

The output of the oxygen concentration sensor exhibits substantially linear characteristics with respect to the concentration of oxygen in a range close to the target value, i.e., in an air-fuel ratio range close to a stoichiometric air-fuel ratio. However, the output of the oxygen concentration sensor is nonlinear with respect to the concentration of oxygen out of the range close to the target value (see the solid-line curve "a" in FIG. 2 of the accompanying drawings). Therefore, the output of the oxygen concentration sensor is nonlinear with respect to the concentration of oxygen when the internal combustion engine is operated with the fuel supply being cut off or operated in the stoichiometric operation mode immediately after the lean operation mode.

However, when the output of the oxygen concentration sensor varies in the nonlinear range, according to the above technique, the accuracy of the estimated value for the output of the oxygen concentration sensor tends to be lowered, and it is difficult to keep the accuracy of the estimated value at the same level as when the output of the oxygen concentration sensor is in the linear range. In addition, the catalyst has different responses when the catalyst exhibits a reducing action based on its chemical reaction, i.e., when the air-fuel ratio changes from a lean side to a rich side, and when the catalyst exhibits an oxidizing action based on its chemical reaction, i.e., when the air-fuel ratio changes from a rich side to a lean side, and the nonlinearity of the oxygen concentration sensor also increases with the different responses of the catalyst. The sliding mode control process (specifically, the adaptive sliding mode control process) which is a stable control process for generating the target air-fuel ratio may be used to prevent the stability of the process of controlling the output of the oxygen concentration sensor from being impaired. However, the quick response of the control process of converging the output of the oxygen concentration sensor may be impaired due to the reduction in the accuracy of the estimated value for the output of the oxygen concentration sensor.

SUMMARY OF THE INVENTION

It is therefore an object of the present invention to provide an apparatus for and a method of controlling a plant so as to be able to perform, with a highly quick response, a control process of converging an output of a detecting means for detecting the output of the plant to a predetermined target value irrespective of the output state of the detecting means even if the output of the detecting means is nonlinear.

Another object of the present invention is to provide an apparatus for and a method of controlling a plant so as to be able to perform, with a highly quick response, a control process of converging an output of a an exhaust gas sensor (detecting means) such as an oxygen concentration sensor disposed downstream of a catalytic converter in the exhaust passage of an internal combustion engine to a predetermined target value irrespective of the output state of the exhaust gas sensor for thereby increasing the exhaust gas purifying capability of the catalytic converter, even if the output of the exhaust gas sensor is nonlinear.

To achieve the above objects, an apparatus for controlling a plant according to the present invention is available in a first aspect and a second aspect. According to the first aspect, an apparatus for controlling a plant for generating an output from an input applied thereto basically comprises detecting means for detecting the output of the plant, and manipulation variable generating means for sequentially generating a manipulation variable for manipulating the input to the plant in order to converge an output of the detecting means to a predetermined target value.

To achieve the above objects, a method of controlling a plant according to the present invention is available in a first aspect and a second aspect. According to the first aspect, a method of controlling a plant for generating an output from an input applied thereto comprises the steps of detecting the output of the plant with detecting means, and sequentially generating a manipulation variable for manipulating the input to the plant in order to converge an output of the detecting means to a predetermined target value;

The apparatus according to the first aspect performs a control process of converging the output of the detecting means to the target value while compensating for the effect of a dead time of the plant. The apparatus has a plurality of estimating means for sequentially generating data of estimated values of the output of the detecting means after a dead time of the plant, according to respective different algorithms using at least data of the output of the detecting means, the manipulation variable generating means comprising means for generating the manipulation variable using selectively the estimated value represented by either one of the data generated by the plurality of estimating means under a given condition or using an estimated value which comprises the estimated values represented by the data generated by the plurality of estimating means and combined with each other under a given condition.

The method according to the first aspect comprises the steps of sequentially generating data of estimated values of the output of the detecting means after a dead time of the plant, according to a plurality of different estimating algorithms using at least data of the output of the detecting means, and generating the manipulation variable using selectively the estimated value represented by either one of the data generated by the plurality of estimating algorithms under a given condition or using an estimated value which comprises the estimated values represented by the data generated by the plurality of estimating algorithms and combined with each other under a given condition.

With the apparatus and method according to the first aspect, since the plurality of estimating means or estimating algorithms generate the data of the estimated values of the output of the detecting means after the dead time according to the respective different algorithms, it is possible to generate data representing a plurality of estimated values to match a plurality of types of output states (depending on the output state of the plant) of the detecting means. Therefore, even if the output of the detecting means is nonlinear, when the estimated value represented by either one of the data generated by the plurality of estimating means or estimating algorithms is selected under a given condition (e.g., a condition relative to an output state of the detecting means or data correlated thereto) or a combined estimated value produced by combining the estimated values under the given condition is determined, the selected estimated value or the combined estimated value is highly accurate as an estimated value of the dead time of the plant.

The manipulation variable thus generated using the selected estimated value or the combined estimated value is appropriate for use in converging the output of the detecting means to the target value while compensating for the effect of the dead time of the plant irrespectively of the output state of the detecting means or the output state of the plant. As a result, the quick response of the control process of converging the output of the detecting means to the target value can be increased irrespectively of the output state of the detecting means.

The apparatus for and the method of controlling the plant according to the second aspect of the present invention has, in addition to the basic components of the first aspect, an actuator for generating the input to the plant and actuator control means for controlling the actuator depending on the manipulation variable to manipulate the input to the plant.

The apparatus according to the second aspect performs a control process of converging the output of the detecting means to the target value while compensating for the effect of a total dead time which is the sum of a dead time of the plant and a dead time of an input manipulating system comprising the actuator control means and the actuator. The apparatus has a plurality of estimating means for sequentially generating data of estimated values of the output of the detecting means after the total dead time, according to respective different algorithms using at least data of the output of the detecting means, the manipulation variable generating means comprising means for generating the manipulation variable using selectively the estimated value represented by either one of the data generated by the plurality of estimating means under a given condition or using an estimated value which comprises the estimated values represented by the data generated by the plurality of estimating means and combined with each other under the given condition.

The method according to the second aspect comprises the steps of sequentially generating data of estimated values of the output of the detecting means after a total dead time which is the sum of a dead time of the plant and a dead time of an input manipulating system comprising the actuator control means and the actuator, according to a plurality of different estimating algorithms using at least data of the output of the detecting means, and generating the manipulation variable using selectively the estimated value represented by either one of the data generated by the plurality of estimating algorithms under a given condition or using an estimated value which comprises the estimated values represented by the data generated by the plurality of estimating algorithms and combined with each other under the given condition.

With the apparatus and method according to the first aspect, since the plurality of estimating means or estimating algorithms generate the data of the estimated values of the output of the detecting means after the total dead time according to the respective different algorithms, it is possible to generate data representing a plurality of estimated values to match a plurality of types of output states (depending on the output state of the plant) of the detecting means. Therefore, as with the first aspect, even if the output of the detecting means is nonlinear, when the estimated value represented by either one of the data generated by the plurality of estimating means or estimating algorithms is selected under a given condition (e.g., a condition relative to an output state of the detecting means or data correlated thereto) or a combined estimated value produced by combining the estimated values under the given condition is determined, the selected estimated value or the combined estimated value is highly accurate as an estimated value of the total dead time which is the sum of the dead time of the plant and the dead time of the input manipulating system (the system for generating the input to the plant from the manipulation variable) comprising the actuator control means and the actuator.

The manipulation variable thus generated using the selected estimated value or the combined estimated value is appropriate for use in converging the output of the detecting means to the target value while compensating for the effect of the total dead time irrespectively of the output state of the detecting means or the output state of the plant. As a result, as with the first aspect, the response of the control process of converging the output of the detecting means to the target value can be increased irrespectively of the output state of the detecting means.

In the apparatus for controlling the plant, the manipulation variable may be a target input to the plant, a corrective quantity for the operation of the actuator, or the like. If the manipulation variable is a target input to the plant, then it is preferable to provide the detecting means for detecting the input to the plant and manipulate the input to the plant according to a feedback control process in order to converge the output of the detecting means (the detected value of the input to the plant) to the target input. The manipulation variable generating means for generating the manipulation variable using the estimated value may generate the manipulation variable according to a feedback control process in order to converge the estimated value to the target value for the output of the detecting means for thereby generating the manipulation variable capable of appropriately compensating for the effect of the dead time of the plant or the total dead time.

According to the first and second aspects of the present invention, the plant may comprise an exhaust system ranging from a position upstream of a catalytic converter, which is disposed in an exhaust passage of an internal combustion engine for purifying an exhaust gas flowing in the exhaust passage, to a position downstream of the catalytic converter, and including the catalytic converter. The input to the plant comprises an air-fuel ratio of the exhaust gas generated by the internal combustion engine and entering the catalytic converter, and the output from the plant comprises the concentration of a component of the exhaust gas which has passed through the catalytic converter. In the second aspect, the internal combustion engine functions as the actuator.

Since the output of the exhaust system as the plant represents the concentration of a component of the exhaust gas which has passed through the catalytic converter, the detecting means is an exhaust gas sensor disposed downstream of the catalytic converter for detecting the concentration of the component of the exhaust gas. The manipulation variable for manipulating the air-fuel ratio of the exhaust gas (the air-fuel ratio of the exhaust gas entering the catalytic converter) as the input to the plant in order to converge the output of the detecting means (exhaust gas sensor) to the target value, and the air-fuel ratio of the exhaust gas entering the catalytic converter is manipulated according to the manipulation variable. For generating the manipulation variable, the dead time of the exhaust system which is represented by the data generated respectively by the plurality of estimating means or estimating algorithms, or the estimated value of the output of the detecting means (exhaust gas sensor) after the total dead time which is the sum of the dead time and the dead time of the input manipulating system is selectively used. Alternatively, a combined estimated value produced by combining these estimated values is used.

Since the quick response of the control process of converging the output of the detecting means to the target value can be increased irrespectively of the output state of the plant or the output state of the detecting means, the quick response of the control process of converging the output of the exhaust gas sensor to the target value can be increased irrespectively of the exhaust gas state at a downstream end of the exhaust system or the output state of the exhaust gas sensor as the detecting means downstream of the catalytic converter. As a result, a desired gas purifying capability of the catalytic converter can appropriately be achieved.

With the plant comprising the exhaust system of the internal combustion engine, the manipulation variable may be a target air-fuel ratio (a target input to the plant) of the exhaust gas entering the catalytic converter or a corrective quantity for the amount of fuel supplied to the internal combustion engine as the actuator. If the manipulation variable is the target air-fuel ratio of the exhaust gas entering the catalytic converter, then it is preferable to provide a detecting means (air-fuel ratio sensor) for detecting the air-fuel ratio of the exhaust gas (an actual input to the plant) upstream of the catalytic converter, and manipulate the air-fuel ratio of an air-fuel mixture combusted by the internal combustion engine according to a feedback control process in order to converge the output of the air-fuel ratio sensor (the detected value of the air-fuel ratio of the exhaust gas) to a target air-fuel ratio. The feedback control process should preferably be performed by a recursive-type controller such as an adaptive controller or the like.

According to the first and second aspects, the apparatus or the step has means for or the step of determining a combined estimated value by weighting and combining the estimated values represented by the data generated by the plurality of estimating means or estimating algorithms. For determining the combined estimated value, weighting coefficients relative to the estimated values of the respective estimating means or estimating algorithms are variably established under the given condition to determine the combined estimated value including the estimated values of the respective estimating means or estimating algorithms. The manipulation variable should preferably be generated using the determined combined estimated value.

By variably establishing the weighting coefficients under the given condition, either one of the estimated values represented by the data generated respectively by the plurality of estimating means or estimating algorithms may be obtained as the combined estimated value (e.g., the weighting coefficient relative to one estimated value is set to "1", and the weighting coefficient relative to another estimated value is set to "0"), and an estimated value which is a combination of those estimated values may be obtained as the combined estimated value. Therefore, since estimated values for use in generating the manipulation variable can be selected or combined by setting the weighting coefficients, an algorithm for selecting and combining estimated values can be constructed with ease.

According to the present invention, the manipulation variable generating means can generate the manipulation variable according to any of various feedback control processes. However, it is preferable to generate the manipulation variable according to an adaptive control process or a sliding mode control process.

By generating the manipulation variable according to the adaptive control process, it is possible to generate the manipulation variable depending on the behavioral state of the plant, increasing the quick response of the control process of converging the output of the detecting means to the target value. The sliding mode control process generally has such characteristics that its control stability against disturbances and modeling errors of objects to be controlled is high. By generating the manipulation variable according to the sliding mode control process, even if an error of the estimated value used therein is unexpectedly large due to the effect of disturbances or the like, any unstability of the output of the detecting means due to the large error is minimized, thus increasing the control stability in converging the output of the detecting means to the target value.

The sliding mode control process should particularly preferably be an adaptive sliding mode control process which incorporates a control law known as an adaptive law (adaptive algorithm) for minimizing the effect of a disturbance, in a normal sliding mode control process. The adaptive sliding mode control process will be described briefly below. The sliding mode control process generally employs a switching function constructed of the difference between a controlled variable and a target value thereof, and it is important to converge the value of the switching function to "0". The normal sliding mode control process uses a control law known as a reaching law to converge the value of the switching function to "0". However, when affected by a disturbance, it may be difficult to sufficiently achieve a desired level of stability and quick response of the process of converging the value of the switching function only with the reaching law. The adaptive sliding mode control process uses a control law known as an adaptive law (adaptive algorithm) in addition to the reaching law for converging the value of the switching function to "0" while minimizing the effect of the disturbance.

According to the present invention, the given condition which defines estimated values used to generate the manipulation variable, or stated otherwise, the given condition which defines how to select or combine estimated values used to generate the manipulation variable, should preferably be a condition based on the value of the data of the output of the detecting means, for example. The value of the data of the output of the detecting means directly represents the output state of the detecting means. With the given condition being determined based on the value of the data of the output of the detecting means, the condition can be set with ease, and it is possible to select an estimated value matching the output state of the detecting means or obtain a combined estimated value matching the output state of the detecting means.

If the manipulation variable is generated according to the sliding mode control process (including the adaptive sliding mode control process), then the given condition should preferably comprise a combination condition of the value of a given linear function having as variable components time-series data of the output of the detecting means and determined depending on a switching function used in the sliding mode control process, and the value of the data of the output of the detecting means.

Specifically, if the sliding mode control process is used to generate the manipulation variable, then a combination of the value of a given linear function determined depending on a switching function used in the sliding mode control process and having as variable components time-series data of the output of the detecting means, and the value of the data of the output of the detecting means is highly correlated to the output state of the detecting means. Therefore, if this combination condition is used as the given condition, then it is possible to select an estimated value matching the output state of the detecting means or obtain a combined estimated value matching the output state of the detecting means. It is thus possible to appropriately generate the manipulation variable matching the output state of the detecting means, increasing the quick response of the control process of converging the output of the detecting means to the target value.

If the switching function comprises a linear function having as variable components time-series data of the difference between the output of the detecting means and the target value, then the given linear function should preferably comprise a linear function having coefficient values relative to the variable components thereof, the coefficient values being the same as coefficient values relative to the variable components of the switching function.

Using such a linear function, the combination condition which defines how to select or combine estimated values used to generate the manipulation variable can properly be established. The given linear function may be a function of the same form as the switching function.

The combination condition should preferably include a condition as to whether a combination of the value of the linear function and the value of the data of the output of the detecting means is present in a predetermined range on a coordinate plane which has the value of the linear function and the value of the data of the output of the detecting means as coordinate components.

With the above condition included, it is easy to classify and distinguish combinations of the value of the linear function and the value of the data of the output of the detecting means, making it possible to easily and appropriately establish the combination condition.

The algorithms of the estimating means (estimating algorithms) may be constructed depending on the output characteristics of the detecting means and the behavioral characteristics of the output of the plant, and can be selected from various algorithms.

The estimating means or estimating algorithms may be arranged as follows: According to the first aspect which generates the data representing the estimated values after the dead time of the plant, the plurality of estimating means or estimating algorithms comprise first estimating means or a first estimating algorithm for generating the data representing the estimated value according to an algorithm constructed based on a predetermined model of the plant which expresses a behavior of the plant as a system for generating the output of the detecting means from the input via a response delay element and a dead time delay, and second estimating means or a second estimating algorithm for generating the data representing the estimated value according to the algorithm of a fuzzy inference process.

According to the second aspect which generates the data representing the estimated values after the total dead time which is the sum of the dead time of the plant and the dead time of the input manipulating system, the plurality of estimating means or estimating algorithms comprise first estimating means or a first estimating algorithm for generating the data representing the estimated value according to an algorithm constructed based on a predetermined model of the plant which expresses a behavior of the plant as a system for generating the output of the detecting means from the input via a response delay element and a dead time element, and second estimating means or a second estimating algorithm for generating the data representing the estimated value according to the algorithm of a fuzzy inference process.

If the plant comprises an exhaust system including the catalytic converter, then for achieving an optimum gas purifying capability of the catalytic converter, it is preferable to use an oxygen concentration sensor as the detecting means (exhaust gas sensor), and use the target value as a given constant value.

If the plant comprises an exhaust system including the catalytic converter and the detecting means comprises an oxygen concentration sensor, then the plurality of estimating means or estimating algorithms should preferably comprise the first estimating means or the first estimating algorithm, and the second estimating means or the second estimating algorithm.

Specifically, if the plant is the exhaust system and the detecting means is the oxygen concentration sensor, then according to the first aspect, it is possible to appropriately generate the data representing the estimated values after the dead time of the exhaust system in a state where the output of the oxygen concentration sensor varies in a range (close to the target value) in which it varies substantially linearly with respect to the oxygen concentration in the exhaust gas, basically according to the algorithm constructed based on the model of the exhaust system.

According to the second aspect, it is possible to relatively accurately generate the data representing the estimated values after the total dead time in a state where the output of the oxygen concentration sensor varies in a range (close to the target value) in which it varies substantially linearly with respect to the oxygen concentration in the exhaust gas, basically according to the algorithm constructed based on the model of the exhaust system and the model of the input manipulating system (the model in which the input manipulating system is regarded simply as a dead time element).

According to the findings of the inventors of the present invention, in either the first aspect or the second aspect, the data representing the estimated values after the dead time of the exhaust system or the total dead time in a state where the output of the oxygen concentration sensor varies in a range in which it varies nonlinearly with respect to the oxygen concentration in the exhaust gas, can be generated relatively accurately according to the algorithm of a fuzzy inference process.

If the plurality of estimating means or estimating algorithms should preferably comprise the first estimating means or the first estimating algorithm based on the model of the exhaust system, and the second estimating means or the second estimating algorithm based on the fuzzy inference process, the data of the estimated values can appropriately be generated in respective different output states of the oxygen concentration sensor. Using the estimated values selectively or using a combined value of the estimated values, it is possible to generate the manipulation variable which is suitable for converging the output of the oxygen concentration sensor to the target value regardless of the output state of the oxygen concentration sensor.

In the apparatus for and the method of controlling the exhaust system (plant) with the oxygen concentration sensor used as the detecting means, if the plurality of estimating means or estimating algorithms comprise the first and second estimating means or the first and second estimating algorithms, and the manipulation variable is generated according to the sliding mode control process, then the algorithm of the fuzzy inference process relative to the second estimating means or the second estimating algorithm should preferably comprise an algorithm for generating the value of a given linear function having as variable components time-series data of the output of the oxygen concentration sensor and determined depending on a switching function used in the sliding mode control process, and the value of the data of the output of the oxygen concentration sensor, as the parameters of an antecedent part of the algorithm of the fuzzy inference process, and also generating the data representing the estimated value as the parameters of a consequent part of the fuzzy inference process.

If the sliding mode control process is used to generate the sliding mode control process, then, according to the findings of the inventors of the present invention, it is possible to obtain relatively accurately the data representing the estimated values in a state where the output of the oxygen concentration sensor varies in a nonlinear range, by establishing the parameters of the antecedent part and consequent part of the fuzzy inference process as described above. As a result, the quick response of the control process of converging the output of the oxygen concentration sensor to the target value even in the state where the output of the oxygen concentration sensor varies in the nonlinear range.

When the given condition (the given condition which defines how to select or combine estimated values used to generate the manipulation variable) comprises the combination condition of the value of the given linear function determined depending on the switching function used in the sliding mode control process, and the value of the data of the output of the detecting means, the linear function relative to the antecedent part of the fuzzy inference process should preferably be the same as the linear function relative to the combination condition.

It is thus possible to appropriately to determine according to the above combination condition whether the output state of the exhaust gas sensor (oxygen concentration sensor) is a state for selecting, or attaching importance to, the estimated value according to the second estimating means or the second estimating algorithm to generate the manipulation variable, i.e., a state where the estimated value according to the fuzzy inference process is of better accuracy, or a state for selecting, or attaching importance to, the estimated value according to the first estimating means or the first estimating algorithm to generate the manipulation variable, i.e., a state where the estimated value based on the model of the exhaust system, etc. is of better accuracy. Consequently, the estimated values according to the first and second estimating means or the first and second estimating algorithms can be selected or combine in a manner to match the accuracy of the estimated values, and hence the manipulation variable can be generated more appropriately.

The algorithm of the fuzzy inference process should preferably comprise an algorithm constructed based on a min-max-center-of-gravity process, using a plurality of bar-shaped functions as membership functions relative to the parameters of the consequent part. The bar-shaped functions are functions having function values only at one value of their variables (parameters). The min-max-center-of-gravity process is a known process generally used in the fuzzy inference process.

In this manner, the algorithm of the fuzzy inference process can be constructed with ease, reducing the operating load for generating the data representing the estimated values.

In the apparatus for and the method of controlling the exhaust system (plant) with the oxygen concentration sensor used as the detecting means, if the first and second estimating means or the first and second estimating algorithms are employed, then it is preferable to detect the air-fuel ratio of the exhaust gas entering the catalytic converter with an air-fuel sensor, sequentially identify parameters to be set of the model of the exhaust system using the data of respective outputs of the air-fuel sensor and the oxygen concentration sensor, and generate the data representing the estimated value using at least the data of the respective outputs of the air-fuel sensor and the oxygen concentration sensor and identified values of the parameters of the model of the exhaust system.

By thus detecting the air-fuel ratio of the exhaust gas entering the catalytic converter with the air-fuel sensor, and sequentially identifying the parameters of the model of the exhaust system using the data of respective outputs of the air-fuel sensor and the oxygen concentration sensor which detects the oxygen concentration in the exhaust gas as the output of the exhaust system, the parameters of the model are identified on a real-time basis depending on the actual behavioral state, from time to time, of the exhaust system. Therefore, an error of the model of the exhaust system with respect to the actual behavior of the exhaust system is reduced to a minimum. As a consequence, the accuracy of the data of the estimated value according to the first estimating means or the first estimating algorithm in a state where the output of the oxygen concentration sensor varies in a substantially linear range can be increased, and the quick response of the control process of converging the output of the oxygen concentration sensor to the target value can be increased.

According to either one of the first and second aspects, the algorithm of the first estimating means (the first estimating algorithm) is capable of generating the data presenting the estimated value using both or one of the data of the output of the air-fuel ratio sensor and the data of the manipulation variable, the data of the output of the oxygen concentration sensor, and the parameters of the model of the exhaust system.

The model of the exhaust system which serves as a basis for the algorithm of the first estimating means (the first estimating algorithm) should preferably be constructed basically as a discrete-time system. In this case, the model of the exhaust system should preferably be a model expressing the data of the output of the oxygen concentration sensor in each given control cycle with the data of the output of the oxygen concentration sensor in a past control cycle prior to the given control cycle and the data representing the air-fuel ratio of the exhaust gas entering the catalytic converter in a control cycle prior to the dead time of the exhaust system (the data of the output of the air-fuel ratio sensor, the data of the manipulation variable, etc.)

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing fuzzy rules used in the process (fuzzy inference process) carried out by the second estimator shown in FIG. 3;

DETAILED DESCRIPTION OF THE PREFERRED EMBODIMENTS

An apparatus for and a method of controlling a plant according to a first embodiment of the present invention will be described below with reference to FIGS. 1 through 18. The first embodiment corresponds to the first aspect of the present invention. The first embodiment is applied to a system for controlling the output of a plant which comprises an exhaust system including a catalytic converter for purifying an exhaust gas emitted from an internal combustion engine, i.e., a system extending from a region upstream of the catalytic converter to a region downstream of the catalytic converter.

Figure 1:
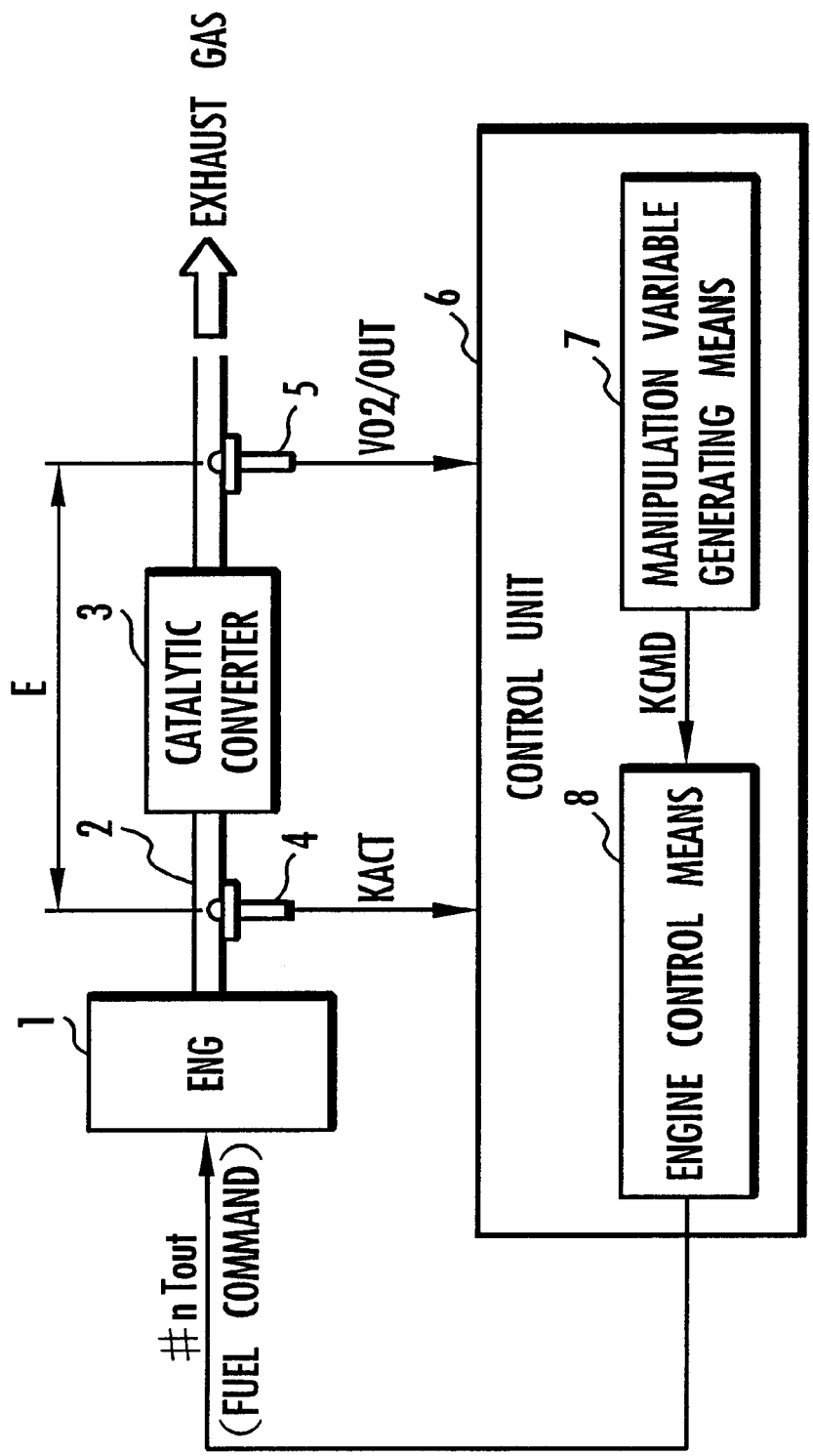
FIG. 1 is a block diagram of an overall system arrangement of an apparatus for controlling a plant according to an embodiment of the present invention.

FIG. 1 shows in block form an overall system arrangement of the apparatus for controlling the plant according to the first embodiment of the present invention. As shown in FIG. 1, an internal combustion engine 1 such as a four-cylinder internal combustion engine is mounted as a propulsion source on an automobile or a hybrid vehicle, for example, or a drive source for drive wheels, not shown. When a mixture of fuel and air is combusted in each cylinder of the internal combustion engine 1, an exhaust gas is generated and emitted from each cylinder into a common discharge pipe 2 (exhaust passage) positioned near the internal combustion engine 1, from which the exhaust gas is discharged into the atmosphere. A catalytic converter 3 comprising a three-way catalyst and an NOx absorbent (nitrogen oxide absorbent) is mounted in the common exhaust pipe 2 for purifying the exhaust gas flowing through the common exhaust pipe 2.

The NOx absorbent of the catalytic converter 3 may comprise either an occlusion-type absorbent made of barium oxide (BaO) or the like or an adsorption-type absorbent made of sodium (Na), titanium (Ti), strontium (Sr), or the like. The internal combustion engine 1 corresponds to an actuator according to the present invention.

The apparatus has an air-fuel ratio sensor 4 mounted on the exhaust pipe 2 upstream of the catalytic converter 3, or more precisely at a position where exhaust gases from the cylinders of the internal combustion engine 1 are put together, and an $O_2$ sensor (oxygen concentration sensor) 5 mounted as an exhaust gas sensor on the exhaust pipe 2 downstream of the catalytic converter 3. An exhaust system (indicated by the reference character E in FIG. 1) ranging from the air-fuel sensor 4 upstream of the catalytic converter 3 to the $O_2$ sensor 5 downstream of the catalytic converter 3 and including the catalytic converter 3 corresponds to a plant according to the present invention, and the $O_2$ sensor 5 corresponds to a detecting means for detecting the output of the exhaust system e.

The $O_2$ sensor 5 comprises an ordinary $O_2$ sensor for generating an output VO2/OUT having a level depending on the oxygen concentration in the exhaust gas that has passed through the catalytic converter 3, i.e., an output VO2/OUT representing a detected value of the oxygen concentration of the exhaust gas. The oxygen concentration in the exhaust gas is commensurate with the air-fuel ratio of an air-fuel mixture which, when combusted, produces the exhaust gas. The output VO2/OUT from the $O_2$ sensor 5 will change linearly with high sensitivity in proportion to the oxygen concentration in the exhaust gas, with the air-fuel ratio corresponding to the oxygen concentration in the exhaust gas being in a range Δ close to a stoichiometric air-fuel ratio, as indicated by the solid-line curve "a" in FIG. 2. At oxygen concentrations corresponding to air-fuel ratios outside of the range Δ, the output VO2/OUT from the $O_2$ sensor 5 is saturated and is of a substantially constant level.

The air-fuel ratio sensor 4 generates an output KACT representing a detected value of the air-fuel ratio which is recognized from the concentration of oxygen in the exhaust gas that enters the catalytic converter 3. The air-fuel ratio sensor 5 comprises a wide-range air-fuel ration sensor disclosed in detail in Japanese laid-open patent publication No. 4-369471 or U.S. Pat. No. 5,391,282. As indicated by the solid-line curve "b" in FIG. 2, the air-fuel ratio sensor 4 generates an output whose level is proportional to the concentration of oxygen in the exhaust gas in a wider range than the $O_2$ sensor 5. Stated otherwise, the air-fuel ratio sensor 4 (hereinafter referred to as "LAF sensor 4") generates a linear output whose level corresponds to the concentration of oxygen in the exhaust gas in a wide range of air-fuel ratios.

The apparatus according to the present invention has a control unit 6, which comprises a microcomputer, for controlling the air-fuel ratio of an air-fuel mixture to be combusted by the internal combustion engine 1. For controlling the air-fuel ratio, the control unit 6 is supplied with the output KACT from the LAF sensor 4, the output VO2/OUT from the $O_2$ sensor 5, the rotational speed, intake pressure, coolant temperature, throttle valve opening, etc. of the internal combustion engine 1, and the outputs from various sensors (not shown) for detecting operating states of the internal combustion engine 1.

The control unit 6 has, as its basic processing functions, a manipulation variable generating means 7 for sequentially performing a process of determining, as a manipulation variable to define an upstream-of-catalyst air-fuel ratio, a target air-fuel ratio KCMD which is a target value for the air-fuel ratio of the exhaust gas that enters the catalytic converter (hereinafter referred to "upstream-of-catalyst air-fuel ratio") in order to achieve an optimum purifying capability of the catalytic converter 3, and an engine control means 8 as an actuator control means for sequentially performing a process of adjusting the amount of fuel supplied to the internal combustion engine 1 depending on the target air-fuel ratio KCMD, etc. thereby to manipulate the upstream-of-catalyst air-fuel ratio.

The manipulation variable generating means 7 and the engine control means 8 perform their control processes in respective given control cycles. Specifically, the control cycles of the control process performed by the manipulation variable generating means 7 are of a predetermined period, e.g., 30 to 100 ms, in view of the operating load imposed thereon and the relatively long dead time of the exhaust system E, and the control cycles of the control process performed by the engine control means 8 are in held in synchronism with the crankshaft angle period (so-called TDC) of the internal combustion engine 1 because the process of adjusting the amount of fuel to be supplied to the internal combustion engine 1 needs to be in synchronism with the combustion cycles of the internal combustion engine 1. The period of the control cycles of the manipulation variable generating means 7 is longer than the crankshaft angle period (TDC) of the internal combustion engine 1.

In the present embodiment, operation modes of the internal combustion engine 1 include a stoichiometric operation mode for operating the internal combustion engine 1 while the air-fuel ratio of an air-fuel mixture combusted by the internal combustion engine 1 and the upstream-of-catalyst air-fuel ratio are set to an air-fuel ratio close to the stoichiometric air-fuel ratio, and a lean operation mode for operating the internal combustion engine 1 while the air-fuel ratio of the air-fuel mixture is set to an air-fuel ratio in a lean state (the amount of fuel is less than that with the stoichiometric air-fuel ratio). The target air-fuel ratio generated by the manipulation variable generating means 7 is used by the engine control means 8 as a target value for the upstream-of-catalyst air-fuel ratio when the internal combustion engine 1 is operating in the stoichiometric operation mode.

The manipulation variable generating means 7 and the engine control means 8 will be described below in greater detail.

Figure 2:
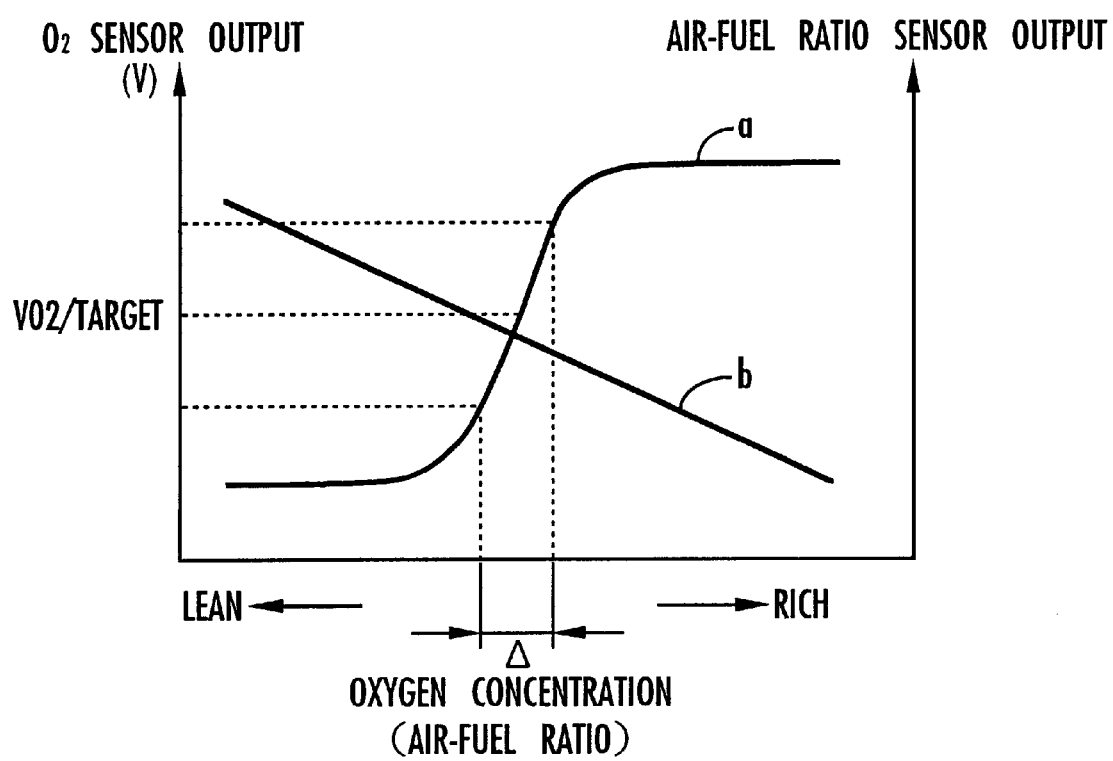
FIG. 2 is a diagram showing output characteristics of sensors of the apparatus shown in FIG. 1.

With respect to the manipulation variable generating means 7, the purifying capability of the catalytic converter 3 (specifically, the purifying rates for NOx, HC, CO, etc. in the exhaust gas) is optimized regardless of the deteriorated state of the three-way catalyst in the catalytic converter 3 when the air-fuel ratio of the exhaust gas flowing through the catalytic converter 3 is of an air-fuel ratio state which is close to the stoichiometric air-fuel ratio and which allows the output VO2/OUT of the $O_2$ sensor 5 to be settled on a certain value VO2/TARGET (see FIG. 2). The manipulation variable generating means 7 uses the certain value VO2/TARGET as a target value for the output VO2/OUT of the $O_2$ sensor 5, and sequentially generates the target air-fuel ratio KCMD as a target value for the upstream-of-catalyst air-fuel ratio to converge the output VO2/OUT of the $O_2$ sensor 5 to the target air-fuel ratio KCMD.

The manipulation variable generating means 7 sequentially determines the target air-fuel ratio KCMD in control cycles thereof (predetermined periods) according to a sliding mode control process (particularly, an adaptive sliding mode control process) which is one of feedback control processes, in view of the dead time of the exhaust system E including the catalytic converter 3, the dead time of a system comprising the internal combustion engine 1 and the engine control means 8, and behavioral changes of the exhaust system E.

In order to perform the above processing sequence of the manipulation variable generating means 7, the behavior of the exhaust system E is modeled as a discrete-time system on the assumption that the exhaust system E is a system (plant) for generating the output VO2/OUT of the $O_2$ sensor 5 from the output KACT of the LAF sensor 4 (the upstream-of-catalyst air-fuel ratio detected by the LAF sensor 4) via a dead-time element and a response delay element. The behavior of an air-fuel ratio manipulating system which is the system comprising the internal combustion engine 1 and the engine control means 8 is modeled on the assumption that the air-fuel ratio manipulating system is a system for generating the output KACT of the LAF sensor 4 (the upstream-of-catalyst air-fuel ratio detected by the LAF sensor 4) from the target air-fuel ratio KCMD via the dead-time element. The air-fuel ratio manipulating system corresponds to an input manipulating system in the second aspect of the present invention.

With respect to the model of the exhaust system E, the difference between the output KACT of the LAF sensor 4 and a predetermined reference value FLAF/BASE therefor (=KACT−FLAF/BASE, hereinafter referred to as "differential output kact" of the LAF sensor 4) is regarded as an input quantity to the exhaust system E, and the difference between the output VO2/OUT of the $O_2$ sensor 5 and the target value VO2/TARGET (=VO2/OUT−VO2/TARGET, hereinafter referred to as "differential output VO2" of the $O_2$ sensor 5) is regarded as an output quantity from the exhaust system E, and the behavior of the exhaust system E is expressed by an autoregressive model according the equation (1) shown below (specifically, an autoregressive model having a dead time in the differential output kact of the LAF sensor 4 as an input quantity to the exhaust system E). The reference value FLAF/BASE for the differential output kact of the LAF sensor 4 (hereinafter referred to as "air-fuel ratio reference value FLAF/BASE") is set to the stoichiometric air-fuel ratio in the present embodiment.

$$VO2(k+1) = a1 \cdot VO2(k) + a2 \cdot VO2(k-1) + b1 \cdot kact(k-d1) \quad (1)$$

In the equation (1), "k" represents the ordinal number of a discrete-time control cycle of the manipulation variable generating means 7, and "d1" the dead time of the exhaust system E as represented by the number of control cycles (more specifically, the dead time required until the upstream-of-catalyst air-fuel ratio detected at each point of time by the LAF sensor 4 is reflected in the output VO2/OUT of the $O_2$ sensor 5). The dead time of the exhaust system E is generally equal to the time of 3–10 control cycles (d1=3–10) if the period of control cycles of the manipulation variable generating means 7 ranges from 30 to 100 ms. In the present embodiment, a preset constant value (d1=7, for example) which is equal to or slightly longer than the actual dead time of the exhaust system E is used as the dead time d1 in the model of the exhaust system E as represented by the equation (1).

The first and second terms of the right side of the equation (1) correspond to a response delay element of the exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients a1, a2 are relative to the differential output VO2 of the $O_2$ sensor 5 as an output of the exhaust system E.

The third term of the right side of the equation (1) represents the differential output kact of the LAF sensor 4 as an input quantity to the exhaust system E, including the dead time d1 of the exhaust system E. In the third term, "b1" represents a gain coefficient relative to the input quantity to the object exhaust system E. These gain coefficients "a1", "a2", "b1" are parameters which are to be set to certain values for defining the behavior of the exhaust system model, and are sequentially identified by an identifier which will be described later on.

The exhaust system model determined by the equation (1) expresses a differential output VO2(k+1) of the $O_2$ sensor 5 in each control cycle of the manipulation variable generating means 7 with differential outputs VO2(k), VO2(k−1) of the $O_2$ sensor 5 in control cycles before that each control cycle, and a differential output kact(k−1) of the LAF sensor 4 in a control cycle before the dead time d of the exhaust system E.

Since the exhaust system model is a linear model as is apparent from the equation (1), it basically well approximates the behavior of the exhaust system E in a state where the output VO2/OUT of the $O_2$ sensor 5 varies in a range which is substantially linear with respect to the oxygen concentration in the exhaust gas, i.e., the air-fuel ratio of the exhaust gas varies in the range Δ close to the stoichiometric air-fuel ratio.

With respect to the model of the air-fuel ratio manipulating system, the difference kcmd between the target air-fuel ratio KCMD and the air-fuel ratio reference value FLAF/BASE (=KCMD−FLAF/BASE, hereinafter referred to as "target differential air-fuel ratio kcmd") is regarded as an input quantity to the air-fuel ratio manipulating system, and the differential output kact of the LAF sensor 5 is regarded as an output quantity from the air-fuel ratio manipulating system, and the behavior of the air-fuel ratio manipulating system is expressed by a model (hereinafter referred to as "air-fuel ratio manipulating system model") according to the following equation (2):

$$kact(k) = kcmd(k-d2) \quad (2)$$

In the equation (2), "d2" represents the dead time of the air-fuel ratio manipulating system in terms of the number of control cycles of the manipulation variable generating means 7 ((more specifically, the time required until the target air-fuel ratio KCMD at each point of time is reflected in the output KACT of the LAF sensor 5). The air-fuel ratio manipulating system model expressed by the equation (2) represents the air-fuel ratio manipulating system expressed as a discrete-time system where the differential output kact of the LAF sensor 5 as an output quantity from the air-fuel ratio manipulating system is in conformity with the target differential air-fuel ratio kcmd as an input quantity to the air-fuel ratio manipulating system at a point of time before the dead time t2 of the air-fuel ratio manipulating system.

The dead time of the air-fuel ratio manipulating system varies with the rotational speed of the internal combustion engine 1 included in the air-fuel ratio manipulating system, and is longer as the rotational speed of the internal combustion engine 1 is lower. In the present embodiment, in view of the above characteristics of the dead time of the air-fuel ratio manipulating system, a preset constant value (for example, d2=3) which is equal to or slightly longer than the actual dead time of the air-fuel ratio manipulating system at an idling rotational speed of the internal combustion engine 1, which is a rotational speed in a low speed range of the internal combustion engine 1 (the actual dead time is a maximum dead time which can be taken by the air-fuel ratio manipulating system at an arbitrary rotational speed of the internal combustion engine 1), is used as the value of the dead time d2 in the air-fuel ratio manipulating system model expressed by the equation (2).

The air-fuel ratio manipulating system actually includes a response delay element of the internal combustion engine 1 in addition to the dead time element. Since a response delay of the upstream-of-catalyst air-fuel ratio with respect to the target air-fuel ratio KCMD is basically compensated for by the feedback control process (particularly the process of an adaptive controller 24, described later on) of the engine control means 8 to be described in detail later on, there will arise no problem if a response delay element of the internal combustion engine 1 is not taken into account in the air-fuel ratio manipulating system as viewed from the manipulation variable generating means 7.

Figure 3:
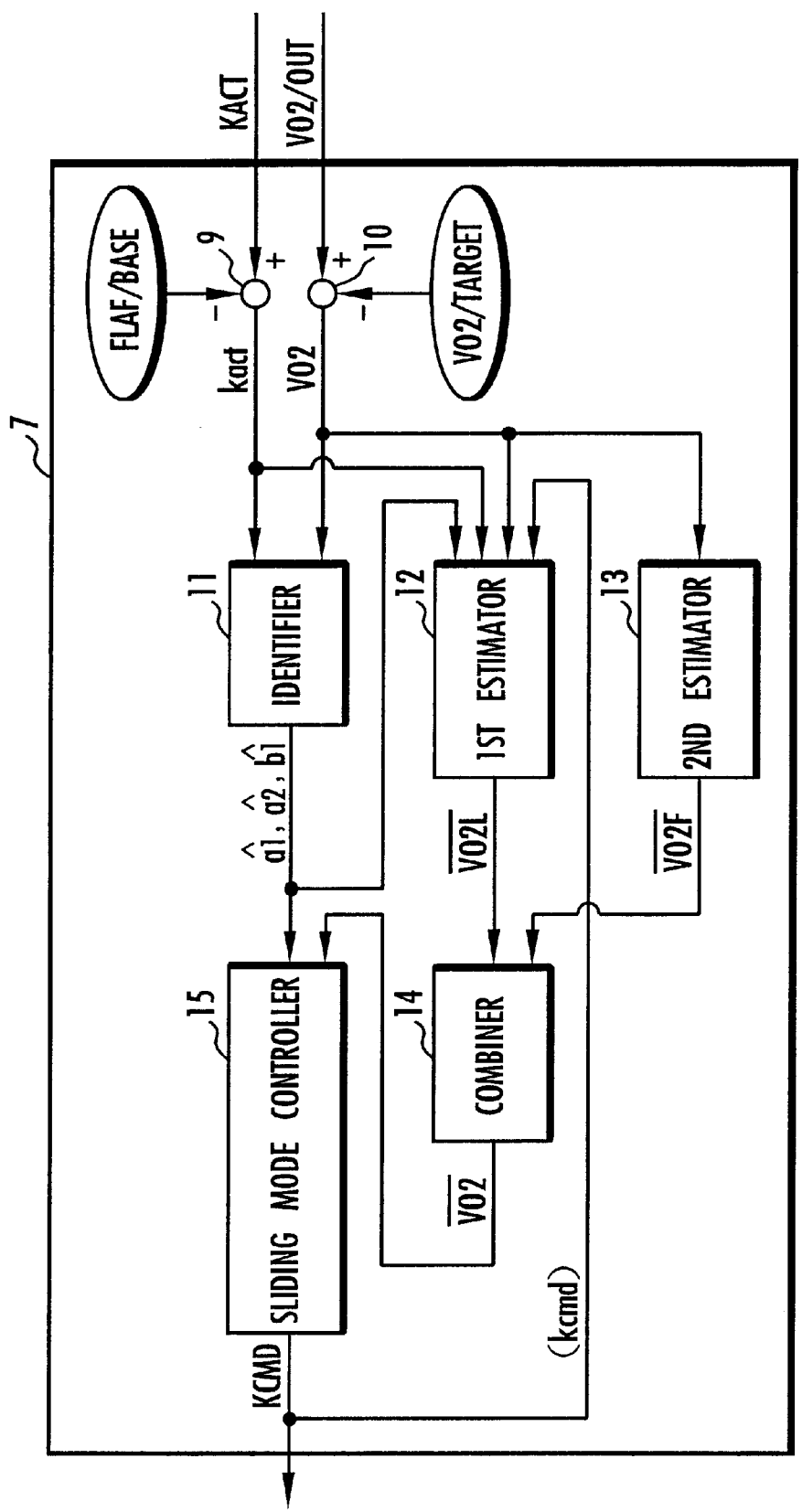
FIG. 3 is a block diagram showing an arrangement of a manipulation variable generating means of the apparatus shown in FIG. 1.

In order to perform a process of generating the target air-fuel ratio KCMD based on the exhaust system model and the air-fuel ratio manipulating system model according to the equations (1), (2), the manipulation variable generating means 7 has its functions as shown in FIG. 3.

As shown in FIG. 3, the manipulation variable generating means 7 has a subtractor 9 for sequentially determining in each control system a differential output kact by subtracting the air-fuel ratio difference value FLAF/BASE from the output KACT from the LAF sensor 5 and a subtractor 10 for sequentially determining in each control cycle a differential output VO2 of the O$_2$ sensor 5 by subtracting the target value VO2/TARGET from the output VO2/OUT of the O$_2$ sensor 5.

The manipulation variable generating means 7 also has an identifier 11 (identifying means) for sequentially determining in each control cycle identified values a1 hat, a2 hat, b1 hat of the gain coefficients a1, a2, b1 (hereinafter referred to as "identified gain coefficients a1 hat, a2 hat, b1 hat") that are parameters to be established for the exhaust system model (the equation (1)), a first identifier (first identifying means) 12 and a second identifier (second identifying means) 13 for sequentially determining in each control cycle two types of estimated values (predicted values) VO2L bar, VO2F bar of the differential output VO2of the O$_2$ sensor 5 (hereinafter referred to as "estimated differential outputs VO2L bar, VO2F bar") after a total dead time d (=d1+d2) which is the sum of the dead time d1 of the exhaust system E and the dead time d2 of the air-fuel ratio manipulating system, according to respective different algorithms, a combiner 14 for sequentially determining in each control cycle a combined estimated differential output VO2 bar which is a combination of the estimated differential outputs VO2L bar, VO2F bar determined respectively by the first and second estimators 12, 13, and a sliding mode controller 15 for sequentially calculating in each control cycle the target air-fuel ratio KCMD according to an adaptive slide mode control process.

The algorithms of processing operations to be carried out respectively by the identifier 11, the first estimator 12, the second estimator 13, the combiner 14, and the sliding mode controller 15 is constructed as follows:

The identifier 11 serves to identify the gain coefficients a1, a2, b1 sequentially on a real-time basis for the purpose of minimizing a modeling error of the exhaust system model expressed by the equation (1) with respect to the actual exhaust system E. The identifier 11 carries out its identifying process as follows:

In each control cycle, the identifier 11 determines an identified value VO2(k) hat of the differential output VO2 (the output of the exhaust system model) of the O$_2$ sensor 5 (hereinafter referred to as "identified differential output VO2(k) hat") on the exhaust system model, using the data of the present values of the identified gain coefficients a1 hat, a2 hat, b1 hat of the exhaust system model, i.e., the values of identified gain coefficients a1(k−1) hat, a2(k−1) hat, b1(k−1) hat determined in a preceding control cycle, and the data kact(k−d1−1), VO2(k−1), VO2(k−2) of the past values of the differential output kact of the LAF sensor 5 and the differential output VO2 from the O$_2$ sensor 5, according to the following equation (3):

$$V\hat{O}2(k)=\hat{a}1(k-1)\cdot VO2(k-1)+\hat{a}2(k-1)\cdot VO2(k-2)+\hat{b}1(k-1)\cdot kact(k-d1-1)=\Theta^T(k-1)\xi(k) \quad (3)$$

The equation (3) corresponds to the equation (1) expressing the exhaust system model as it is shifted into the past by one control cycle with the gain coefficients a1, a2, b1 being replaced with the respective identified gain coefficients a1(k−1) hat, a2(k−1) hat, b1(k−1) hat. The constant value (d1=7) established as described above is used as the value of the dead time d1 of the exhaust system E in the third term of the equation (3).

In the equation (3), $\Theta$, $\xi$ represent vectors defined above with respect to the equation (3). The letter T in the equation (3) represents a transposition.

The identifier 11 also determines a difference id/e(k) between the identified differential output VO2(k) hat of the O$_2$ sensor 5 which is determined by the equation (3) and the present differential output VO2(k) of the O$_2$ sensor 5, as representing a modeling error of the exhaust system model with respect to the actual exhaust system E (hereinafter the difference id/e will be referred to as "identified error id/e"), according to the following equation (4):

$$id/e(k)=VO2(k)-V\hat{O}2(k) \quad (4)$$

The identifier 11 further determines new identified gain coefficients a1(k) hat, a2(k) hat, b1(k) hat, stated otherwise, a new vector ←(k) having these identified gain coefficients as elements (hereinafter the new vector $\Theta(k)$ will be referred to as "identified gain coefficient vector $\Theta$"), in order to minimize the identified error id/e, according to the equation (5) given below. That is, the identifier 11 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k) = \Theta(k-1) + K\theta(k) \cdot id/e(k) \quad (5)$$

where $K\theta$ represents a cubic vector determined by the following equation (6), i.e., a gain coefficient vector for determining a change depending on the identified error id/e of the identified gain coefficients a1 hat, a2 hat, b1 hat):

$$K\theta(k) = \frac{P(k-1) \cdot \xi(k)}{1 + \xi^T(k) \cdot P(k-1) \cdot \xi(k)} \quad (6)$$

where P represents a cubic square matrix determined by a recursive formula expressed by the following equation (7):

$$P(k) = \frac{1}{\lambda_1(k)} \cdot \left[ I - \frac{\lambda_2(k) \cdot P(k-1) \cdot \xi(k) \cdot \xi^T(k)}{\lambda_1(k) + \lambda_2(k) \cdot \xi^T(k) \cdot P(k-1) \cdot \xi(k)} \right] \cdot P(k-1) \quad (7)$$

where I represents a unit matrix.

In the equation (7), $\lambda_1$, $\lambda_2$ are established to satisfy the conditions $0 < \lambda_1 \leq 1$ and $0 \leq \lambda_2 < 2$, and an initial value $P(0)$ of P represents a diagonal matrix whose diagonal components are positive numbers.

Depending on how $\lambda_1$, $\lambda_2$ in the equation (7) are established, any one of various specific algorithms including a fixed gain method, a degressive gain method, a method of weighted least squares, a method of least squares, a fixed tracing method, etc. may be employed. According to the present embodiment, a method of least squares ($\lambda_1 = \lambda_2 = 1$), for example, is employed.

Basically, the identifier 11 sequentially determines in each control cycle the identified gain coefficients a1 hat, a2 hat, b1 hat in order to minimize the identified error id/e according to the above algorithm (calculating operation). Through this operation, it is possible to sequentially obtain the identified gain coefficients a1 hat, a2 hat, b1 hat which match the actual exhaust system E.

The algorithm described above is the basic algorithm that is carried out by the identifier 11.

The first estimator 12 sequentially determines in each control cycle the estimated differential output VO2L bar which is an estimated value of the differential output VO2 of the $O_2$ sensor 5 after the total dead time d (=d1+d2) in order to compensate for the effect of the dead time d1 of the exhaust system E and the effect of the dead time d2 of the air-fuel ratio manipulating system for the calculation of the target air-fuel ratio KCMD with the sliding mode controller 15 as described in detail later on. The algorithm for the first estimator 12 to determine the estimated differential output VO2L bar is constructed as described below.

If the equation (2) expressing the model of the air-fuel ratio manipulating system is applied to the equation (1) expressing the model of the exhaust system E, then the equation (1) can be rewritten as the following equation (8):

$$VO2(k+1) = a1 \cdot VO2(k) + a2 \cdot VO2(k-1) + \quad (8)$$
$$b1 \cdot kcmd(k - d1 - d2)$$
$$= a1 \cdot VO2(k) + a2 \cdot VO2(k-1) +$$
$$b1 \cdot kcmd(k-d)$$

The equation (11) expresses a system which is a combination of the exhaust system E and the air-fuel manipulating system as the model of a discrete time system, regarding such a system as a system for generating the differential output VO2 of the $O_2$ sensor 5 from the target differential air-fuel ratio kcmd via dead time elements of the exhaust system E and the air-fuel manipulating system and a response delay element of the exhaust system E.

By using the equation (8), the estimated differential output VO2(k+d) bar which is an estimated value of the differential output VO2(k+d) of the $O_2$ sensor 5 after the total dead time d in each control cycle can be expressed using time-series data VO2(k), VO2(k-1) of the present and past values of the differential output VO2 of the $O_2$ sensor 5 and time-series data kcmd(k-j) (j=1, 2, ..., d) of the past values of the target differential air-fuel ratio kcmd (=KCMD-FLAF/BASE) determined by the sliding mode controller 15 as described later on, according to the following equation (9):

$$\overline{VO2L}(k+d) = \alpha 1 \cdot VO2(k) + \alpha 2 \cdot VO2(k-1) + \sum_{j=1}^{d} \beta j \cdot kcmd(k-j) \quad (9)$$

where
$\alpha 1$ = the first-row, first-column element of $A^d$,
$\alpha 2$ = the first-row, second-column element of $A^d$,
$\beta j$ = the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

In the equation (9), "$\alpha 1$", "$\alpha 2$" represent the first-row, first-column element and the first-row, second-column element, respectively, of the dth power $A^d$ (d: total dead time) of the matrix A defined as described above with respect to the equation (9), and "$\beta j$" (j=1, 2, ..., d) represents the first-row elements of the product $A^{j-1} \cdot B$ of the (j-1)th power $A^{j-1}$ of the matrix A and the vector B defined as described above with respect to the equation (9).

Of the time-series data kcmd(k-j) (j=1, 2, ..., d) of the past values of the target combined differential air-fuel ratio kcmd according to the equation (9), the time-series data kcmd(k-d2), kcmd(k-d2-1), ..., kcmd(k-d) from the present prior to the dead time d2 of the air-fuel manipulating system can be replaced respectively with data kact(k), kact(k-1), ..., kact(k-d+d2) obtained prior to the present time of the differential output kact of the LAF sensor 4 according to the equation (2). When the time-series data are thus replaced, the following equation (10) is obtained:

$$\overline{VO2L}(k+d) = \alpha 1 \cdot VO2(k) + \alpha 2 \cdot VO2(k-1) + \quad (10)$$
$$\sum_{j=1}^{d2-1} \beta j \cdot kcmd(k-j) + \sum_{i=0}^{d-d2} \beta i +$$
$$d2 \cdot kact(k-i)$$
$$= \alpha 1 \cdot VO2(k) + \alpha 2 \cdot VO2(k-1) +$$
$$\sum_{j=1}^{d2-1} \beta j \cdot kcmd(k-j) + \sum_{i=0}^{d1} \beta i + d2 \cdot kact(k-i)$$

The equation (10) is a basic formula for the first estimator 12 to determine the estimated differential output VO2L(k+d) bar. Stated otherwise, the first estimator 12 determines, in each control cycle, the estimated differential output VO2L(k+d) bar of the $O_2$ sensor 5 according to the equation (10), using the time-series data VO2(k), VO2(k−1) of the present and past values of the differential output VO2 of the $O_2$ sensor 5, the time-series data kcmd(k−j) (j=1, . . . , d2−1) of the past values of the target differential air-fuel ratio kcmd determined in the past by the sliding mode controller 15, and the time-series data kact(k−i) (i=0, . . . , d1) of the present and past values of the differential output kact of the LAF sensor 4.

In the present embodiment, the values of the coefficients $\alpha1, \alpha2, \beta j$ (j=1, 2, . . . , d) required to calculate the estimated differential output VO2L(k+d) bar according to the equation (10) are basically calculated using the identified gain coefficients a1 hat, a2 hat, b1 hat which are the identified values of the gain coefficients a1, a2, b1 (which are elements of the vectors A, B defined with respect to the equation (9)). The values of the dead times d1, d2 required in the equation (10) comprise the preset values as described above.

The estimated differential output VO2L(k+d) bar thus determined according to the equation (10) is in conformity with the differential output VO2(k+d) of the $O_2$ sensor 5 with relatively high accuracy basically in a state where the output VO2/OUT of the $O_2$ sensor 5 varies in a range which is substantially linear with respect to the oxygen concentration in the exhaust gas, i.e., in a state where the air-fuel ratio of the exhaust gas varies in the vicinity of the stoichiometric air-fuel ratio, because the equation (10) and the exhaust system model as a basis for the equation (10) are linear.

The estimated differential output VO2L(k+d) bar may be determined according to the equation (9) without using the data of the differential output kact of the LAF sensor 4. For increasing the reliability of the estimated differential output VO2L(k+d) bar, however, it is preferable to determine the estimated differential output VO2L(k+d) bar according to the equation (10) using the data of the differential output kact of the LAF sensor 4 which reflects the actual behavior of the internal combustion engine 1. If the dead time d2 of the air-fuel ratio manipulating system can be set to "1", then all the time-series data kcmd(k−j) (j=1, 2, . . . , d) of the past values of the target differential air-fuel ratio kcmd in the equation (9) may be replaced with the time-series data kact(k), kact(k−1), . . . , kact(k−d+d2), respectively, which are obtained prior to the present, of the differential output kact of the LAF sensor 4. In this case, the estimated differential output VO2L(k+d) bar in each control cycle can be determined according to the following equation (11) which does not include the data of the target differential air-fuel ratio kcmd:

$$\overline{VO2L}(k+d) = \alpha 1 \cdot VO2(k) + \alpha 2 \cdot VO2(k-1) + \sum_{j=0}^{d-1} \beta j + 1 \cdot kact(k-j) \quad (11)$$

Prior to describing the second estimator 13 and the combiner 14, the processing operation of the sliding mode controller 15 will first be described below.

The sliding mode controller 15 determines an input quantity to be given to the exhaust system E to be controlled (which is specifically a target value for the difference between the upstream-of-catalyst air-fuel ratio and the air-fuel ratio reference value FLAF/BASE, which target value is equal to the target differential air-fuel ratio kcmd) (the input quantity will be referred to as "SLD manipulating input Usl") in order to converge the output VO2/OUT of the $O_2$ sensor 5 to the target value VO2/TARGET thereof, i.e., to converge the differential output VO2 of the $O_2$ sensor 5 to "0" according to an adaptive sliding mode control process which incorporates an adaptive control law for minimizing the effect of a disturbance, in a normal sliding mode control process, and determines the target air-fuel ratio KCMD from the determined SLD manipulating input Usl. An algorithm for carrying out the adaptive sliding mode control process is constructed as follows:

A switching function required for the algorithm of the adaptive sliding mode control process carried out by the sliding mode controller 15 and a hyperplane defined by the switching function (also referred to as a slip plane) will first be described below.

According to a basic concept of the sliding mode control process in the present embodiment, the differential output VO2(k) of the $O_2$ sensor 5 obtained in each control cycle and the differential output VO2(k−1) obtained in a preceding control cycle are used as a state quantity (controlled variable) to be controlled, and a switching function a for the sliding mode control process is defined as a linear function having the differential outputs VO2(k), VO2(k−1) as variable components, according to the following equation (12):

$$\sigma(k) = s1 \cdot VO2(k) + s2 \cdot VO2(k-1) \quad (12)$$
$$= S \cdot X$$

where $$S = [s1 \ s2],$$
$$X = \begin{bmatrix} VO2(k) \\ VO2(k-1) \end{bmatrix}$$

$$X = \begin{bmatrix} VO2(k) \\ VO2(k-1)^A \end{bmatrix}$$

vector X defined above with respect to the equation (12) as a vector whose elements are represented by the differential outputs VO2(k), VO2(k−1) will hereinafter be referred to as a state quantity X.

The coefficients s1, s2 of the switching function σ is set in order to meet the condition of the following equation (13):

$$-1 < \frac{s2}{s1} < 1 \quad (13)$$

(when s1=1, −1<s2<1)

In the present embodiment, for the sake of brevity, the coefficient s1 is set to s1=1 (s2/s1=s2), and the coefficient s2 is established to satisfy the condition: −1<s2<1.

Figure 4:
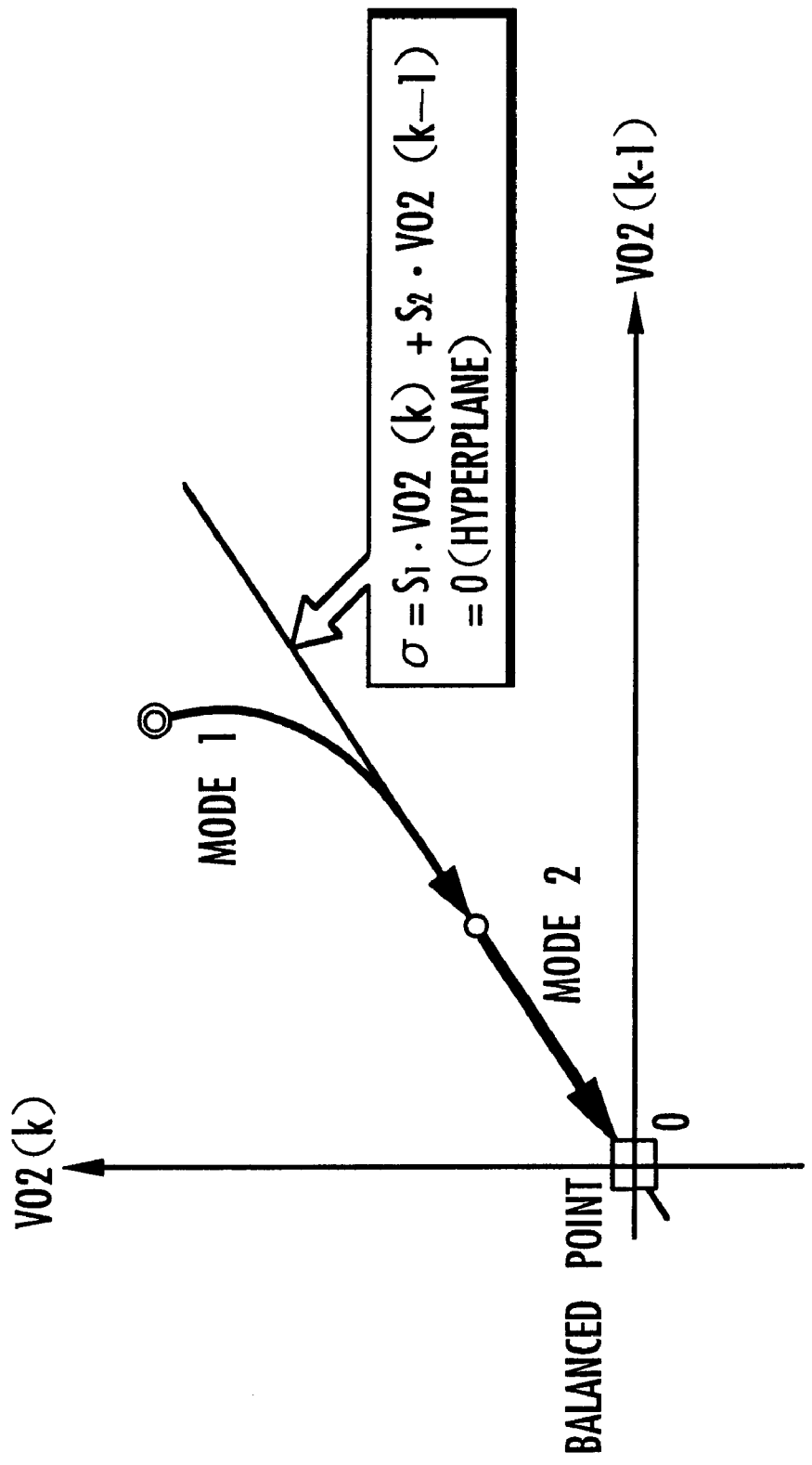
FIG. 4 is a diagram illustrative of a sliding mode control process carried out by a sliding mode controller shown in FIG. 3.

With the switching function σ thus defined, the hyperplane for the sliding mode control process is defined by the equation σ=0. Since the state quantity X is of the second degree, the hyperplane σ=0 is represented by a straight line as shown in FIG. 4. At this time, the hyperplane is called a switching line or a switching plane depending on the degree of a topological space.

In the present embodiment, the time-series data of the combined estimated differential output VO2 bar determined by the combiner 14, which will be described in detail later on, is actually used as the state quantity which represents the variable components of the switching function for the sliding mode control process, as described later on.

The adaptive sliding mode control process serves to converge the state quantity X onto the hyperplane σ=0 according to a reaching control law which is a control law for converging the state quantity X (=VO2(k), VO2(k−1)) onto the hyperplane σ=0, and an adaptive control law (adaptive algorithm) which is a control law for compensating for the effect of a disturbance in converging the state quantity X onto the hyperplane σ=0 (mode 1 in FIG. 4). While holding the state quantity X onto the hyperplane σ=0 according to an equivalent control input, the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the $O_2$ sensor 5 are equal to the target value VO2/TARGET (mode 2 in FIG. 4).

The SLD manipulating input Usl (=the target differential air-fuel ratio kcmd) to be generated by the sliding mode controller 15 for converging the state quantity X toward the balanced point on the hyperplane σ=0 is given as the sum of an equivalent control input Ueq to be applied to the exhaust system E according to the control law for converging the state quantity X onto the hyperplane σ=0, an input Urch (hereinafter referred to as "reaching control law input Urch") to be applied to the exhaust system E according to the reaching control law, and an input Uadp (hereinafter referred to as "adaptive control law Uadp") to be applied to the exhaust system E according to the adaptive control law (see the following equation (14)).

$$Usl = Ueq + Urch + Uadp \quad (14)$$

In the present embodiment, the equivalent control input Ueq, the reaching control law input Urch, and the adaptive control law input Uadp are determined on the basis of the model of the discrete time system expressed by the equation (8), i.e., the model which is a combination of the model of the exhaust system and the model of the air-fuel ratio manipulating system, as follows:

The equivalent control input Ueq which is an input component to be applied to the exhaust system E for converging the state quantity X onto the hyperplane σ=0 is the target differential air-fuel ratio kcmd which satisfies the condition: σ((k+1))=σ(k)=0. Using the equations (8), (12), the equivalent control input Ueq which satisfies the above condition is given by the following equation (15):

$$Ueq(k) = -(S \cdot B)^{-1} \cdot \{S \cdot (A-1)\} \cdot X(k+d) \quad (15)$$

$$= \frac{-1}{s1 \cdot b1} \cdot \{[s1 \cdot (a1-1) + s2] \cdot VO2(k+d) + (s1 \cdot a2 - s2) \cdot VO2(k+d-1)\}$$

The equation (15) is a basic formula for determining the equivalent control law input Ueq(k) in each control cycle.

According to the present embodiment, the reaching control law input Urch is basically determined according to the following equation (16):

$$Urch(k) = -(S \cdot B)^{-1} \cdot F \cdot \sigma(k+d) \quad (16)$$

$$= \frac{-1}{s1b1} \cdot F \cdot \sigma(k+d)$$

Specifically, the reaching control law input Urch is determined in proportion to the value σ(k+d) of the switching function σ after the total dead time d, in view of the effect of the total dead time d.

The coefficient F in the equation (16) which determines the gain of the reaching control law is established to satisfy the condition expressed by the following equation (17):

$$0 < F < 2 \text{ (Preferably, } 0 < F < 1\text{)} \quad (17)$$

The condition in the parentheses of the equation (17) is a condition of the coefficient F suitable for suppressing an oscillating change (so-called chattering) of the value of the switching function a with respect to the hyperplane σ=0.

In the present embodiment, the adaptive control law input Uadp is basically determined according to the following equation (18) (ΔT in the equation (18) represents the period of the control cycles of the manipulation variable generating means 7):

$$Uadp(k) = -(S \cdot B)^{-1} \cdot G \cdot \sum_{i=0}^{k+d}(\sigma(i) \cdot \Delta T) \quad (18)$$

$$= \frac{-1}{s1b1} \cdot G \cdot \sum_{i=0}^{k+d}(\sigma(i) \cdot \Delta T)$$

The adaptive control law input Uadp is determined so as to be proportional to an integrated value (which corresponds to an integral of the values of the switching function σ) over control cycles of the product of values of the switching function σ and the period ΔT of the manipulation variable generating means 7 until after the total dead time d, in view of the total dead time d.

The coefficient G (which determines the gain of the adaptive control law) in the equation (18) is established to satisfy the condition of the following equation (19):

$$G = J \cdot \frac{2-F}{\Delta T} \quad (19)$$

$$(0 < J < 2)$$

A specific process of deriving conditions for establishing the equations (13), (17), and (19) is described in detail in Japanese patent laid-open publication No. 11-93741 and U.S. Pat. No. 6,082,099, and will not be described in detail below.

The sliding mode controller 15 according to the present embodiment determines the sum (Ueq+Urch+Uadp) of the equivalent control input Ueq, the reaching control law input Urch, and the adaptive control law Uadp determined according to the respective equations (15), (16), (18) as the SLD manipulating input Usl to be applied to the exhaust system E. However, the differential outputs VO2(K+d), VO2(k+d−1) of the $O_2$ sensor 5 and the value σ(k+d) of the switching function σ, etc. used in the equations (15), (17), (19) cannot directly be obtained as they are values in the future.

According to the present embodiment, therefore, the sliding mode controller 15 actually uses the present value VO2(k+d) bar and the preceding value VO2(k+d−1) bar of the combined estimated differential output VO2bar determined in each control cycle by the combiner 14 as corresponding to the estimated value of the differential output VO2 of the $O_2$ sensor 5 after the total dead time d, instead of the differential outputs VO2(K+d), VO2(k+d−1) of the $O_2$ sensor 5 for determining the equivalent control input Ueq according to the equation (15), and calculates the equivalent control input Ueq in each control cycle according to the following equation (20):

$$Ueq(k) = \frac{-1}{s1 \cdot b1}\{[s1 \cdot (a1-1) + s2] \cdot \overline{VO2}(k+d) + \qquad (20)$$
$$(s1 \cdot a2 - s2) \cdot \overline{VO2}(k+d-1)\}$$

According to the present embodiment, furthermore, the sliding mode controller 15 actually uses time-series data of the combined estimated value VO2 bar determined by the combiner 14 as described later on as a state quantity to be controlled, and defines a switching function a bar for the sliding mode control process according to the following equation (21) (the switching function σ bar corresponds to time-series data of the differential output VO2 in the equation (12) which is replaced with time-series data of the combined estimated differential output VO2 bar), in place of the switching function σ established according to the equation (12):

$$\overline{\sigma(k)} = s1 \cdot \overline{VO2}(k) + s2 \cdot \overline{VO2}(k-1) \qquad (21)$$

The sliding mode controller 15 calculates the reaching control law input Urch in each control cycle according to the following equation (22), using the switching function a bar represented by the equation (21), rather than the value of the switching function a for determining the reaching control law input Urch according to the equation (16):

$$Urch(k) = \frac{-1}{s1 \cdot b1} \cdot F \cdot \overline{\sigma}(k+d) \qquad (22)$$

Similarly, the sliding mode controller 15 calculates the adaptive control law input Uadp in each control cycle according to the following equation (23), using the value of the switching function σ bar represented by the equation (21), rather than the value of the switching function σ for determining the adaptive control law input Uadp according to the equation (18):

$$Uadp(k) = \frac{-1}{s1 \cdot b1} \cdot G \cdot \sum_{i=0}^{k+d} (\overline{\sigma}(i) \cdot \Delta T) \qquad (23)$$

The latest identified gain coefficients a1(k) hat, a2(k) hat, b1(k) hat which have been determined by the identifier 11 are basically used as the gain coefficients a1, a1, b1 that are required to calculate the equivalent control input Ueq, the reaching control law input Urch, and the adaptive control law input Uadp according to the equations (20), (21), (22).

The sliding mode controller 15 determines the sum of the equivalent control input Ueq, the reaching control law input Urch, and the adaptive control law input Uadp determined according to the equations (20), (21), (22), as the SLD manipulating input Usl to be applied to the exhaust system E (see the equation (14)). The conditions for establishing the coefficients s1, s2, F, G used in the equations (20), (21), (22) are as described above.

The above process is a basic processing operation (algorithm) for determining in each control cycle the SLD manipulating input Usl (=target differential air-fuel ratio kcmd) to be applied to the exhaust system E with the sliding mode controller 15. According to the above algorithm, the SLD manipulating input Usl is determined to converge the combined estimated differential output VO2 bar of the $O_2$ sensor 5 toward "0", and as a result, to convert the output VO2/OUT of the $O_2$ sensor 5 toward the target value VO2/TARGET.

The sliding mode controller 15 eventually sequentially determines the target air-fuel ratio KCMD in each control cycle. The SLD manipulating input Usl determined as described above signifies a target value for the difference between the upstream-of-catalyst air-fuel ratio and the air-fuel ratio reference value FLAF/BASE, i.e., the target differential air-fuel ratio kcmd. Consequently, the sliding mode controller 15 eventually determines the target air-fuel ratio KCMD by adding the air-fuel ratio reference value FLAF/BASE to the determined SLD manipulating input Usl in each control cycle according to the following equation (24):

$$KCMD(k) = Usl(k) + FLAF/BASE \qquad (24)$$
$$= Ueq(k) + Urch(k) + Uadp(k) + FLAF/BASE$$

The above process is a basic algorithm for determining the target air-fuel ratio KCMD with the sliding mode controller 25 according to the present embodiment.

In the present embodiment, since the sliding mode controller 15 uses in its processing operation the identified gain coefficients a1 hat, a2 hat, b1 hat determined by the identifier 11, the processing operation of a combination of the sliding mode controller 15 and the identifier 11 is one form of an adaptive control process. Therefore, the SLD manipulating input Usl and the target air-fuel ratio KCMD as a manipulation variable can be described as being generated by the adaptive control process.

The second estimator 13 will now be described below. The second estimator 13 serves to sequentially determine in each control cycle the estimated differential output VO2F bar which is an estimated value for the differential output VO2 of the $O_2$ sensor 5 after the total dead time d (=d1+d2) according to an algorithm which is different from the algorithm of the first estimator 12, in order to make up for a reduction in the accuracy of the estimated differential output VO2L bar of the first estimator 12 in a state where the output VO2/OUT of the $O_2$ sensor 5 varies in a nonlinear range. The algorithm of the estimating process carried out by the second estimator 13 is constructed as follows:

When the target air-fuel ratio KCMD is generated by the sliding mode controller 15 and the air-fuel ratio of the air-fuel mixture combusted by the internal combustion engine 1 is manipulated by the engine control means 8, which will be described in detail later on, for converging the output KACT of the LAF sensor 4 to the target air-fuel ratio KCMD, if the air-fuel ratio of the exhaust gas that has passed through the catalytic converter 3 changes relatively largely from a lean side to a rich side or from a rich side to a lean side (such a change occurs in a range including the nonlinear range of the output VO2/OUT of the $O_2$ sensor 5), then the state quantity X=(VO2(k), VO2(k-1) composed of the time-series data of the present value VO2(k) and the past value VO2(k-1) of the differential output VO2 of the $O_2$ sensor 5 exhibits a characteristic change with respect to the hyperplane σ=0 relative to the switching function σ according to the equation (12).

Figure 5:
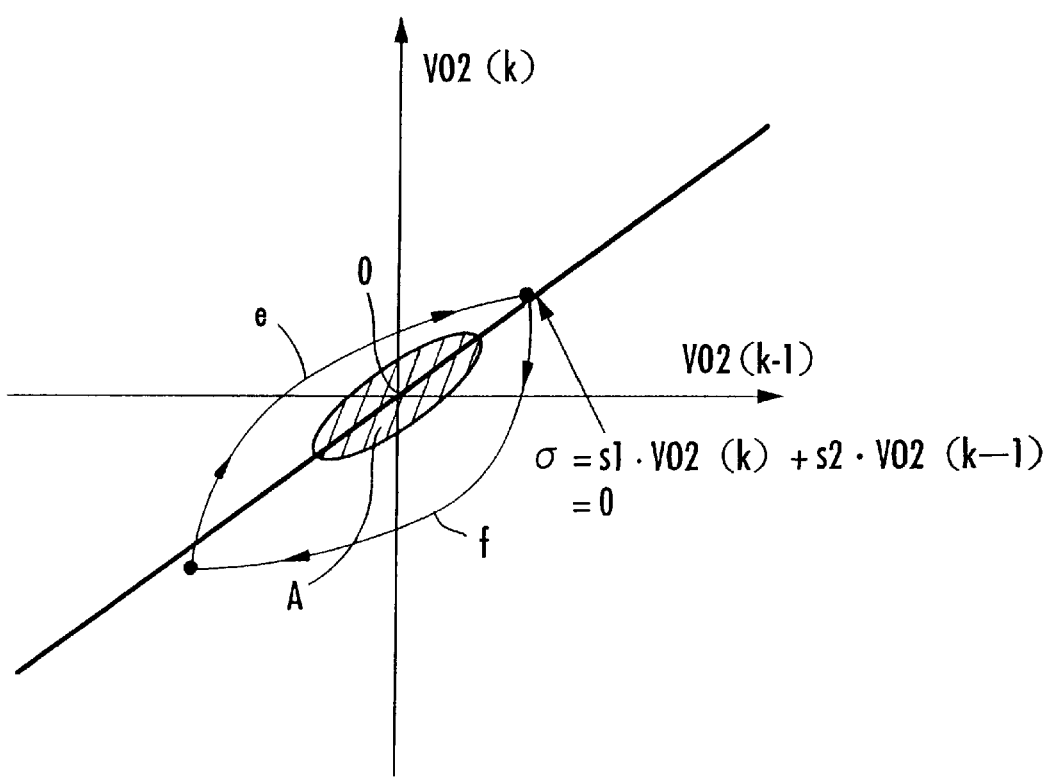
FIG. 5 is a diagram illustrative of a process carried out by a second estimator shown in FIG. 3.
Figure 6:
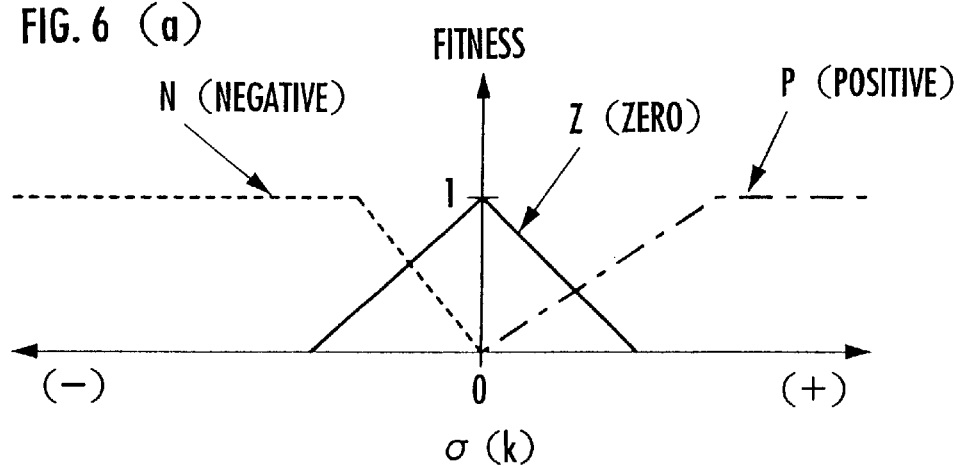
FIGS. 6(*a*) through 6(*c*) are diagrams showing membership functions used in the process (fuzzy inference process) carried out by the second estimator shown in FIG. 3.
Figure 6:
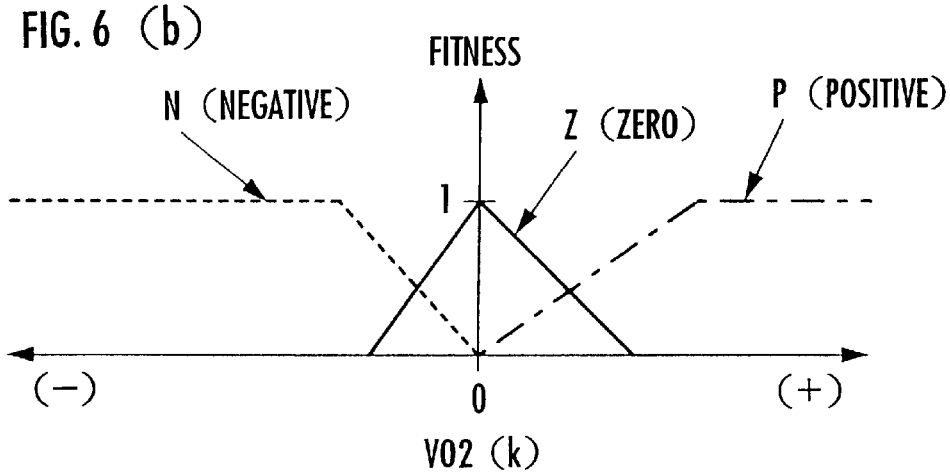
Figure 6:
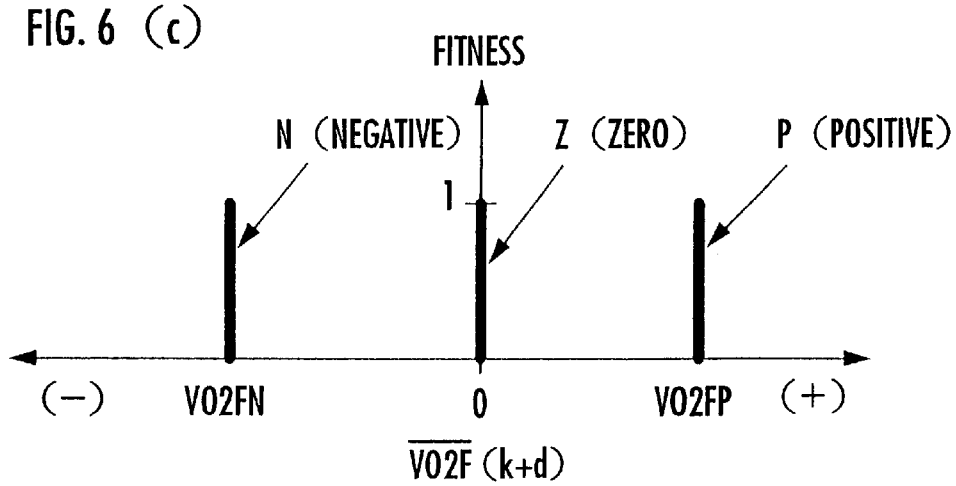

Specifically, as shown in FIG. 5, when the air-fuel ratio of the exhaust gas at the $O_2$ sensor 5 changes largely from a lean side to a rich side, the state quantity X=(VO2(k), VO2(k-1) changes from the hyperplane σ=0 along a path spaced upwardly therefrom (a region where σ>0), as indicated by the solid-line curve "e", and when the air-fuel ratio of the exhaust gas at the $O_2$ sensor 5 changes largely from a rich side to a lean side, the state quantity X=(VO2(k), VO2(k-1) changes from the hyperplane σ=0 along a path spaced downwardly therefrom (a region where σ<0), as indicated by the solid-line curve "f". The change of the state quantity X remains substantially constant irrespectively of the operating state of the internal combustion engine 1.

In view of the above characteristics of the behavior in the nonlinear range of the output VO2/OUT of the $O_2$ sensor 5, the second estimator 13 determines the estimated differential output VO2F bar which is an estimated value for the differential output VO2 of the $O_2$ sensor 5 after the total dead time according to a fuzzy inference process. The second estimator 13 uses the value σ(k) of the switching function σ of the equation (12) in each control cycle and the present value VO2(k) of the differential output VO2 of the $O_2$ sensor 5 as parameters (input parameters) of the antecedent part of the fuzzy inference process, and the estimated differential output VO2F(k+d) in each control cycle as a parameter (output parameter) of the consequent part of the fuzzy inference process.

Since the switching function actually used by the sliding mode controller 15 in the present embodiment is the switching function σ bar defined according to the equation (21), the switching function σ according to the equation (12) is not the switching function for the sliding mode control process. In the description which follows, therefore, the function σ according to the equation (12) is referred to as the linear function σ for fuzzy control. The linear function σ for fuzzy control is of the same form as the switching function σ bar for the sliding mode control process, but differs therefrom only as to its variable components.

According to the fuzzy inference process of the present embodiment, as shown in FIG. 6(a), three membership functions N (negative), Z (zero), and P (positive) are established with respect to the value σ(k) of the linear function σ for fuzzy control which is a parameter of the antecedent part. The membership functions N (negative), z (zero) are functions of trapezoidal shape, and the membership function P (positive) is a function of triangular shape.

Similarly, as shown in FIG. 6(b), three membership functions N (negative), Z (zero), and P (positive) are established with respect to the value VO2(k) of the differential output VO2 of the $O_2$ sensor 5 which is the other parameter of the antecedent part. These membership functions N (negative), Z (zero), and P (positive) are functions of trapezoidal shape, triangular shape, and trapezoidal shape, respectively.

As shown in FIG. 6(c), three membership functions N (negative), Z (zero), and P (positive) are established with respect to the estimated differential output VO2F(k+d) which is a parameter of the consequent part. Each of these membership functions N (negative), Z (zero), and P (positive) is a bar-shaped function (bar-shaped singleton function) whose fitness (the function value of a membership function) is maximum (=1) only at a single particular value VO2FN (<0), "0", or VO2FP (>0) of the estimated differential output VO2F bar. The particular values VO2Fn, VO2FP of the membership functions N (negative), P (positive) are values corresponding to the output VO2/OUT (constant value) in a state where the output VO2/OUT of the $O_2$ sensor 5 is saturated (see FIG. 2).

As shown in FIG. 7, there are nine rules of the fuzzy inference process established with respect to the membership functions shown in FIGS. 6(a) through 6(c). According to these fuzzy rules, the estimated differential output VO2F(k+d) of the consequent part is determined to be negative, zero, or positive depending on whether the value σ(k) of the linear function σ for fuzzy control of the antecedent part is negative, zero, or positive.

With the membership functions and the fuzzy rules thus established, the second estimator 13 determines the estimated differential output VO2F(k+d) from the value σ(k) of the linear function σ for fuzzy control and the value VO2(k) of the differential output VO2 of the $O_2$ sensor 5, which are obtained in each control cycle, according to an algorithm of a min-max-center-of-gravity process which is known in the fuzzy inference technology.

Specifically, the second estimator 13 determines fitnesses with respect to respective parameters σ(k), VO2(k) of the antecedent part (those fitnesses are denoted by respective reference characters Wσ(i), Wv(i)) in the fuzzy rules of the rule numbers i (i=1, 2, . . . , 9), from the values of the parameters σ(k), VO2(k) and the corresponding membership functions of the antecedent parts of the fuzzy rules. For example, at the rule number 1 shown in FIG. 7, the fitness Wσ(1) with respect to the parameter σ(k) is determined as the function value of the membership function N (negative) shown in FIG. 6(a) at the value of the parameter σ(k), and the fitness Wv(1) with respect to the parameter VO2(k) is determined as the function value of the membership function N (negative) shown in FIG. 6(b) at the value of the parameter VO2(k). The fitnesses are similarly determines for the other fuzzy rules.

The second estimator 13 then determines a smaller one of the fitnesses Wσ(i), Wv(i) with respect to the respective parameters σ(k), VO2(k) of the antecedent part, i.e., min (Wσ(i), Wv(i)), as an overall fitness Wpre(i) of the antecedent part of each of the fuzzy rules of the rule numbers i (i=1, 2, . . . , 9). The second estimator 13 calculates the estimated differential output VO2F(k+d) as an estimated value after the total dead time d of the differential output VO2 of the $O_2$ sensor 5, using the fitnesses Wpre(i) (i=1, 2, . . . , 9) of the respective fuzzy rules, according to the following equation (25):

$$\overline{VO2F}(k+d) = \frac{\sum_{i=1}^{9} Wpre(i) \cdot Wwpre(i) \cdot Wppre(i)}{\sum_{i=1}^{9} Wpre(i) \cdot Wwpre(i)} \quad (25)$$

where Wwpre(i) represents the function values of the membership functions (bar-shaped functions) shown in FIG. 6(c) corresponding to the consequent parts in the fuzzy rules of the rule numbers i (i=1, 2, . . . , 9), and Wppre(i) represents the particular value VO2Fn, or "0", or VO2FP relative to those membership functions. In the present embodiment, the function values of the membership functions N (negative), Z (zero), and P (positive) of the consequent part are "1", and hence Wwpre(i)=1 (i=1, 2, . . . , 9). As is apparent from the fuzzy rules shown in FIG. 7 and the membership functions shown in FIG. 6(c), Wppre(i)=VO2FN with respect to the fuzzy rules of the rule numbers 1 through 3, Wppre(i)=0 with respect to the fuzzy rules of the rule numbers 4 through 6, and Wppre(i)=VO2FP with respect to the fuzzy rules of the rule numbers 7 through 9.

The above algorithm is an algorithm for the second estimator 13 to determine the estimated differential output VO2F(k+d) according to the fuzzy inference process in each control cycle. The estimated differential output VO2F(k+d) thus determined by the second estimator 13 serves, with relatively high accuracy, as an estimated value for the differential output VO2(k+d) of the $O_2$ sensor 5 in a state where the output VO2/OUT of the $O_2$ sensor 5 varies in a nonlinear range.

The combiner 14 will be described below.

According to the findings of the inventors of the present invention, whether the output of the $O_2$ sensor 5 is in a state for the first estimator 12 to be able to calculate the estimated differential output VO2L(k+d) bar with relatively high accuracy, i.e., in a state where the output of the O₂ sensor 5 varies in a linear range close to the target value VO2/TARGET, or in a state for the second estimator 13 to be able to calculate the estimated differential output VO2F(k+d) bar with relatively high accuracy, i.e., in a state where the output of the O₂ sensor 5 varies in a linear range close to the target value VO2/TARGET, is closely related to the switching function for the sliding mode control process (the σ bar according to the equation (21) in the present embodiment). If attention is directed to the linear function σ for fuzzy control (see the equation (12)) which is of a linear function of the same type as the switching function σ bar, then when the state quantity X=(VO2(k), VO2(k−1)) is present in an elliptical range A shown hatched in FIG. 5 with respect to the hyperplane σ=0 relative to the linear function σ, the output of the O₂ sensor 5 is in a state where the estimated differential output VO2L(k+d) of the first estimator 12 is accurate, and when the state quantity X=(VO2(k), VO2(k−1)) is present outside of the elliptical range A, the output of the O₂ sensor 5 is in a state where the estimated differential output VO2F(k+d) of the second estimator 12 is accurate (the range A will hereinafter be referred to as "linear behavior range A").

Therefore, basically, the estimated differential output VO2L(k+d) bar or the estimated differential output VO2F(k+d) bar may be selected for use in the sliding mode controller 15 depending on whether the state quantity X=(VO2(k), VO2(k−1)) is present in the linear behavior range A or not. However, in a state where the state quantity X moves in the vicinity of the boundary of the linear behavior range Δ, then the value of the estimated differential output that is used may tend to vary discontinuously if the estimated differential outputs VO2L bar, VO2F bar of the estimators 12, 13 are alternatively used in the processing operation of the sliding mode controller 15.

When orthogonal coordinate axes representing the value σ(k) of the linear function σ for fuzzy control and the differential output VO2(k) of the O₂ sensor 5 as coordinate components, the linear behavior range A is converted into a simple elliptical range B (hereinafter referred to as "elliptical range") on the coordinate plane shown in FIG. 8, and the fact that the state quantity X is present in the linear behavior range A shown in FIG. 5 is equivalent to the fact that the point on the coordinate plane which is determined by the set of the value σ(k) of the linear function a for fuzzy control and the differential output VO2(k) of the O₂ sensor 5 is present in the elliptical range B.

According to the present embodiment, as indicated by the following equation (26), the combiner 14 applies weighting coefficients Cw, (1−Cw) respectively to the estimated differential outputs VO2L(k+d) bar, VO2F(k+d) bar determined by the estimators 12, 13 in each control cycle, and combines (adds) them, thus sequentially calculating in each control cycle the combined estimated differential output VO2(k+d) bar for use by the sliding mode controller 15.

$$\overline{VO2}(k+d) = Cw \cdot \overline{VO2L}(k+d) + (1-Cw) \cdot \overline{VO2F}(K+d) \qquad (26)$$

Figure 8:
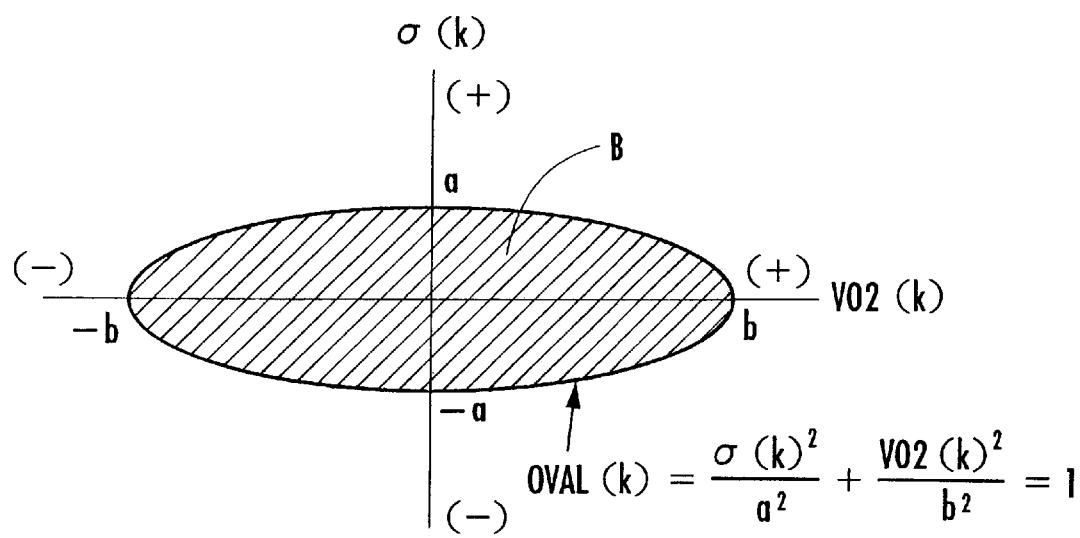
FIG. 8 is a diagram illustrative of a process carried out by a combiner shown in FIG. 3.

At this time, the combiner 14 establishes the value of the weighting coefficient Cw from a data table shown in FIG. 9 depending on the value of an elliptical function OVAL(k) defined by the equation (27) shown below, and calculates the equation (26) using the value of the weighting coefficient Cw.

$$OVAL(k) = \frac{\sigma(k)^2}{a^2} + \frac{VO2(k)^2}{b^2} \qquad (27)$$

where "a", "b" represent positive values at points of intersection between the boundary of the elliptical range B and the coordinate axes σ (k), VO2(k), as shown in FIG. 8.

Figure 9:
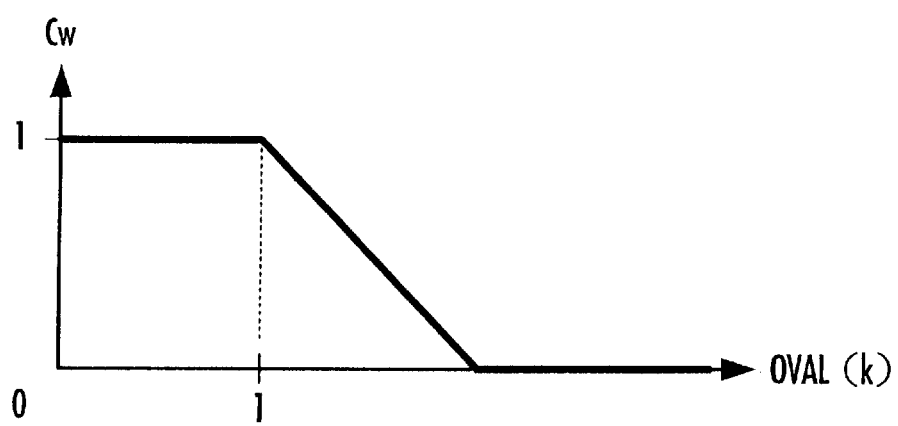
FIG. 9 is a diagram illustrative of the process carried out by the combiner shown in FIG. 3.

In the data table shown in FIG. 9, when OVAL(k)≦1 (meaning that the state quantity X is in the linear behavior range A (including its boundary) shown in FIG. 5, the weighting coefficient Cw is set to "1", and when 1<OVAL(k)<1+δ (where δ is a small positive value) (meaning that the state quantity X is present outside of the linear behavior range A but in the vicinity of the linear behavior range A), the weighting coefficient Cw is set such that the value of the weighting coefficient Cw is progressively reduced from "1" to "0" as the value of the elliptical function OVAL(k) increases. When 1+δ≦OVAL(k) (meaning that the state quantity X is present completely outside of the linear behavior range A), the weighting co-efficient Cw is set to "0".

Therefore, when the state quantity X is in the linear behavior range A, VO2(k+d) bar=VO2L(k+d) bar according to the equation (26), and the combiner 14 selectively outputs the estimated differential output VO2L(k+d) bar from the first estimator 12 as the combined estimated differential output VO2bar for use in the processing operation of the sliding mode controller 15. When the state quantity X is present completely outside of the linear behavior range A, VO2(k+d) bar=VO2F(k+d), and the combiner 14 selectively outputs the estimated differential output VO2F(k+d) bar from the second estimator 13 as the combined estimated differential output VO2bar for use in the processing operation of the sliding mode controller 15. When the state quantity x is present outside of the linear behavior range A but in the vicinity of the linear behavior range A, the combiner 14 outputs a weighted mean value of the estimated differential outputs VO2L(k+d) bar, VO2F(k+d) bar from the estimators 12, 13 as the combined estimated differential output VO2 bar.

The above process is the processing operation carried out by the combiner 14.

The engine control means 8 will be described below with reference to FIGS. 10 and 11.

Figure 10:
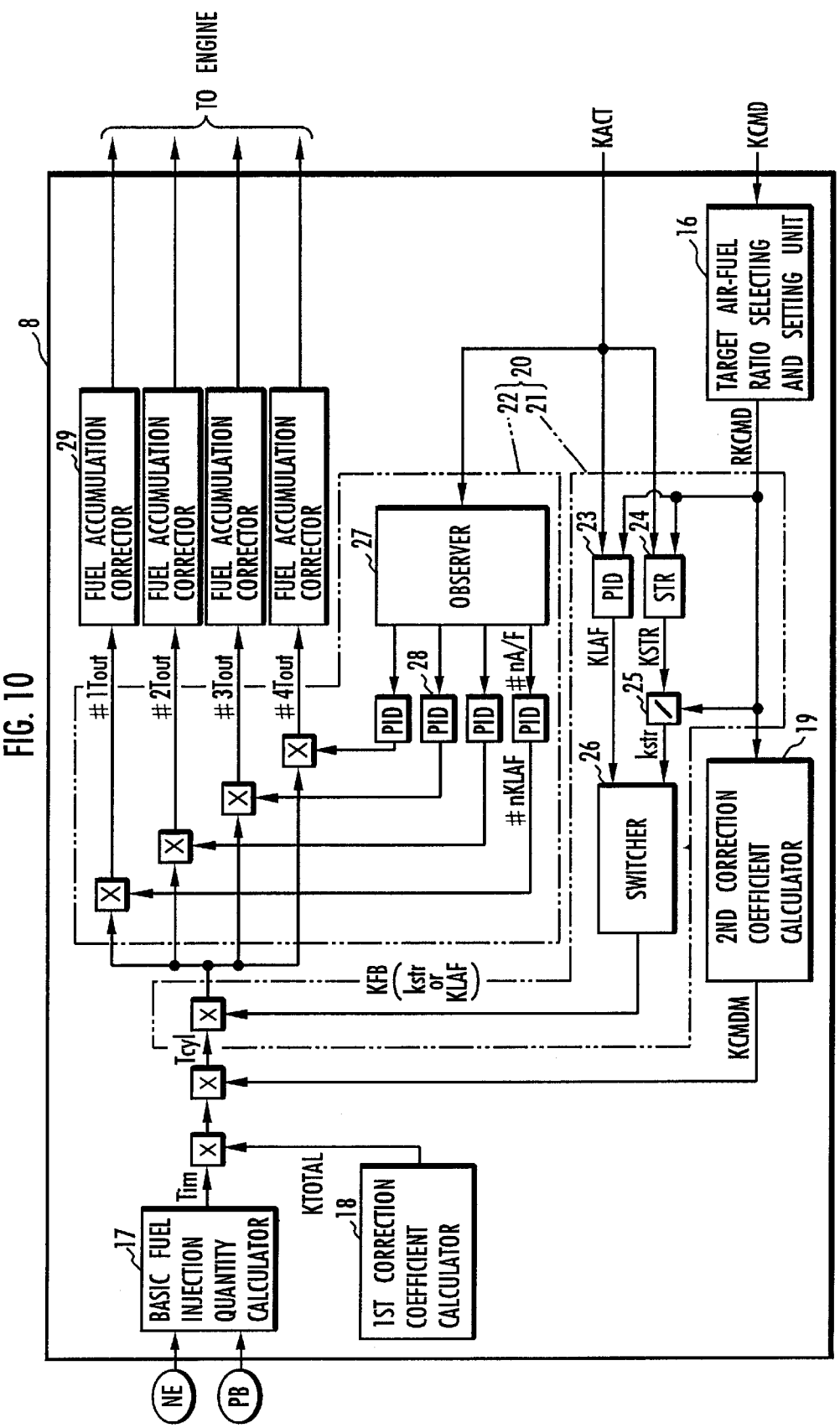
FIG. 10 is a block diagram of an engine control means shown in FIG. 1.

As shown in FIG. 10, the engine control means 8 has, as a function thereof, a target air-fuel ratio selecting and setting unit 16 for determining an actually used target air-fuel ratio RKCMD as a target value for the upstream-of-target air-fuel ratio that is actually used to manipulate the air-fuel ratio of an air-fuel mixture combusted by the internal combustion engine 1.

In the stoichiometric operation mode, the target air-fuel ratio selecting and setting unit 16 determines the target air-fuel ratio generated by the sliding mode controller 15 of the manipulation variable generating means 7 as the actually used target air-fuel ratio RKCMD. In an operation other than the stoichiometric operation mode, e.g., the lean operation mode, the target air-fuel ratio selecting and setting unit 16 determines a lean air-fuel ratio which is determined from the rotational speed NE and intake pressure PB, etc., of the internal combustion engine 1, using a map or a data table, as the actually used target air-fuel ratio RKCMD.

The engine control means 8 also has a basic fuel injection quantity calculator 17 for determining a basic fuel injection quantity Tim to be injected into the internal combustion engine 1, a first correction coefficient calculator 18 for determining a first correction coefficient KTOTAL to correct the basic fuel injection quantity Tim, and a second correction coefficient calculator 19 for determining a second correction coefficient KCMDM to correct the basic fuel injection quantity Tim.

The basic fuel injection quantity calculator 17 determines a reference fuel injection quantity (fuel supply quantity) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim. The basic fuel injection quantity Tim is such a fuel injection quantity that the air-fuel ratio of an air-fuel mixture combusted by the internal combustion engine 1 is a stoichiometric air-fuel ratio.

The first correction coefficient KTOTAL determined by the first correction coefficient calculator 18 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc. of the internal combustion engine 1.

The second correction coefficient KCMDM determined by the second correction coefficient calculator 19 serves to correct the basic fuel injection quantity Tim in view of the charging efficiency of an air-fuel mixture due to the cooling effect of fuel flowing into the internal combustion engine 1 depending on an actually used target air-fuel ratio RKCMD determined by the target air-fuel ratio selecting and setting unit 16.

The engine control means 8 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The engine control means 8 also has, in addition to the above functions, a feedback controller 20 for adjusting a fuel injection quantity of the internal combustion engine 1 according to a feedback control process so as to converge the output signal KACT of the LAF sensor 4 (the detected value of the upstream-of-catalyst air-fuel ratio) to the actually used target air-fuel ratio RKCMD, thus manipulating the air-fuel ratio of an air-fuel mixture combusted by the internal combustion engine 1.

The feedback controller 20 comprises a general feedback controller 21 for feedback-controlling a total air-fuel ratio for all the cylinders of the internal combustion engine 1 and a local feedback controller 22 for feedback-controlling an air-fuel ratio for each of the cylinders of the internal combustion engine 1.

The general feedback controller 21 sequentially determines a feedback correction coefficient KFB to correct the demand fuel injection quantity Tcyl (by multiplying the demand fuel injection quantity Tcyl) so as to converge the output KACT of the LAF sensor 4 to the actually used target air-fuel ratio RKCMD.

The general feedback controller 21 comprises a PID controller 23 for generating a feedback manipulation variable KLAF as the feedback correction coefficient KFB depending on the difference between the output KACT of the LAF sensor 4 and the actually used target air-fuel ratio RKCMD according to a known PID control process, and an adaptive controller 24 (indicated by "STR" in FIG. 10) for adaptively determining a feedback manipulation variable KSTR for determining the feedback correction coefficient KFB in view of changes in operating conditions of the internal combustion engine 1 or characteristic changes thereof from the output signal KACT from the LAF sensor 4 and the actually used target air-fuel ratio RKCMD.

In the present embodiment, the feedback manipulation variable KLAF generated by the PID controller 23 is of "1" and can be used directly as the feedback correction coefficient KFB when the output KACT (the detected air-fuel ratio) of the LAF sensor 4 is equal to the actually used target air-fuel ratio RKCMD. The feedback manipulation variable KSTR generated by the adaptive controller 24 becomes the actually used target air-fuel ratio RKCMD when the output KACT of the LAF sensor 4 is equal to the actually used target air-fuel ratio RKCMD. A feedback manipulation variable kstr (=KSTR/RKCMD) which is produced by dividing the feedback manipulation variable KSTR by the actually used target air-fuel ratio RKCMD with a divider 25 can be used as the feedback correction coefficient KFB.

The feedback manipulation variable KLAF generated by the PID controller 23 and the feedback manipulation variable kstr which is produced by dividing the feedback manipulation variable KSTR generated by the adaptive controller 24 by the actually used target air-fuel ratio RKCMD are selected one at a time by a switcher 26. A selected one of the feedback manipulation variable KLAF and the feedback manipulation variable KSTR is used as the feedback correction coefficient KFB. The demand fuel injection quantity Tcyl is corrected by being multiplied by the feedback correction coefficient KFB. Details of the general feedback controller 21 (particularly, the adaptive controller 24) will be described later on.

The local feedback controller 22 comprises an observer 27 for estimating real air-fuel ratios #nA/F (n=1, 2, 3, 4) of the respective cylinders from the output KACT of the LAF sensor 4, and a plurality of PID controllers 28 (as many as the number of the cylinders) for determining respective feedback correction coefficients #nKLAF for fuel injection quantities for the cylinders from the respective real air-fuel ratios #nA/F of the cylinders estimated by the observer 27 according to a PID control process so as to eliminate variations of the air-fuel ratios of the cylinders.

Briefly stated, the observer 27 estimates a real air-fuel ratio #nA/F of each of the cylinders as follows: A system from the internal combustion engine 1 to the LAF sensor 4 (where the exhaust gases from the cylinders are combined) is considered to be a system for generating an upstream-of-catalyst air-fuel ratio detected by the LAF sensor 4 from a real air-fuel ratio #nA/F of each of the cylinders, and is modeled in view of a detection response delay (e.g., a time lag of first order) of the LAF sensor 4 and a chronological contribution of the air-fuel ratio of each of the cylinders to the upstream-of-catalyst air-fuel ratio detected by the LAF sensor 4. Based on the modeled system, a real air-fuel ratio #nA/F of each of the cylinders is estimated from the output KACT of the LAF sensor 4.

Details of the observer 27 are disclosed in Japanese laid-open patent publication No. 7-83094 and U.S. Pat. No. 5,531,208, and will not be described below.

Each of the PID controllers 28 of the local feedback controller 22 divides the output KACT of the LAF sensor 4 by an average value of the feedback correction coefficients #nKLAF determined by the respective PID controllers 28 in a preceding control cycle to produce a quotient value, and uses the quotient value as a target value for the air-fuel ratio of the corresponding cylinder. Each of the PID controllers 28 then determines a feedback correction coefficient #nKLAF in a present control cycle so as to eliminate any difference between the target value and the corresponding real air-fuel ratio #nA/F determined by the observer 27.

The local feedback controller 22 multiplies a value, which has been produced by multiplying the demand fuel injection quantity Tcyl by the feedback correction coefficient KFB produced by the general feedback controller 21, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 29 in the engine control means 8. The corrected output fuel injection quantity #nTout is applied to each of fuel injectors (not shown) of the internal combustion engine 1, which injects fuel into each of the cylinders according to the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, and will not be described in detail below.

The general feedback controller 21, particularly, the adaptive controller 24, will further be described below.

The general feedback controller 21 effects a feedback control process to converge the output KACT (the detected value of the actually used air-fuel ratio) of the LAF sensor 4 to the actually used target air-fuel ratio RKCMD as described above. If such a feedback control process were carried out under the known PID control only, it would be difficult to keep stable controllability against dynamic behavioral changes including changes in the operating conditions of the internal combustion engine 1, characteristic changes due to aging of the internal combustion engine 1, etc.

The adaptive controller 24 is a recursive-type controller which makes it possible to carry out a feedback control process while compensating for dynamic behavioral changes of the internal combustion engine 1. As shown in FIG. 11, the adaptive controller 24 comprises a parameter adjuster 30 for establishing a plurality of adaptive parameters using the parameter adjusting law proposed by I. D. Landau, et al., and a manipulation variable calculator 31 for calculating the feedback manipulation variable KSTR using the established adaptive parameters.

The parameter adjuster 30 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (28), (29), given below, an adaptive parameter θ hat (j) (j indicates the ordinal number of a control cycle) established by the parameter adjuster 30 is represented by a vector (transposed vector) according to the equation (30) given below. An input ζ(j) to the parameter adjuster 30 is expressed by the equation (31) given below. In the present embodiment, it is assumed that the internal combustion engine 1, which is an object to be controlled by the general feedback controller 21, is considered to be a plant of a first-order system having a dead time dp corresponding to the time of three combustion cycles of the internal combustion engine 1, and m=n=1, dp=3 in the equations (28)–(31), and five adaptive parameters s0, r1, r2, r3, b0 are established (see FIG. 11). In the upper and middle expressions of the equation (31), us, ys generally represent an input (manipulation variable) to the object to be controlled and an output (controlled variable) from the object to be controlled. In the present embodiment, the input is the feedback manipulation variable KSTR and the output from the object (the internal combustion engine 1) is the output KACT (the detected value of the upstream-of-catalyst air-fuel ratio) of the LAF sensor 4, and the input ζ(j) to the parameter adjuster 30 is expressed by the lower expression of the equation (31) (see FIG. 11).

$$A(Z^{-1}) = 1 + a1Z^{-1} + \ldots + anZ^{-n} \tag{28}$$

$$B(Z^{-1}) = b0 + b1Z^{-1} + \ldots + bmZ^{-m} \tag{29}$$

$$\begin{aligned}\hat{\theta}^T(j) &= [\hat{b}0(j), \hat{B}R(Z^{-1}, j), \hat{S}(Z^{-1}, j)] \\ &= [b0(j), r1(j), \ldots, rm+dp-1(j), s0(j), \ldots, sn-1(j)] \\ &= [b0(j), r1(j), r2(j), r3(j), s0(j)]\end{aligned} \tag{30}$$

$$\begin{aligned}\zeta^T(j) &= [us(j), \ldots, us(j-m-dp+1), ys(j), \ldots, ys(j-n+1)] \\ &= [us(j), us(j-1), us(j-2), us(j-3), ys(j)] \\ &= [KSTR(j), KSTR(j-1), KSTR(j-2), \\ &\qquad KSTR(j-3), KACT(j)]\end{aligned} \tag{31}$$

Figure 11:
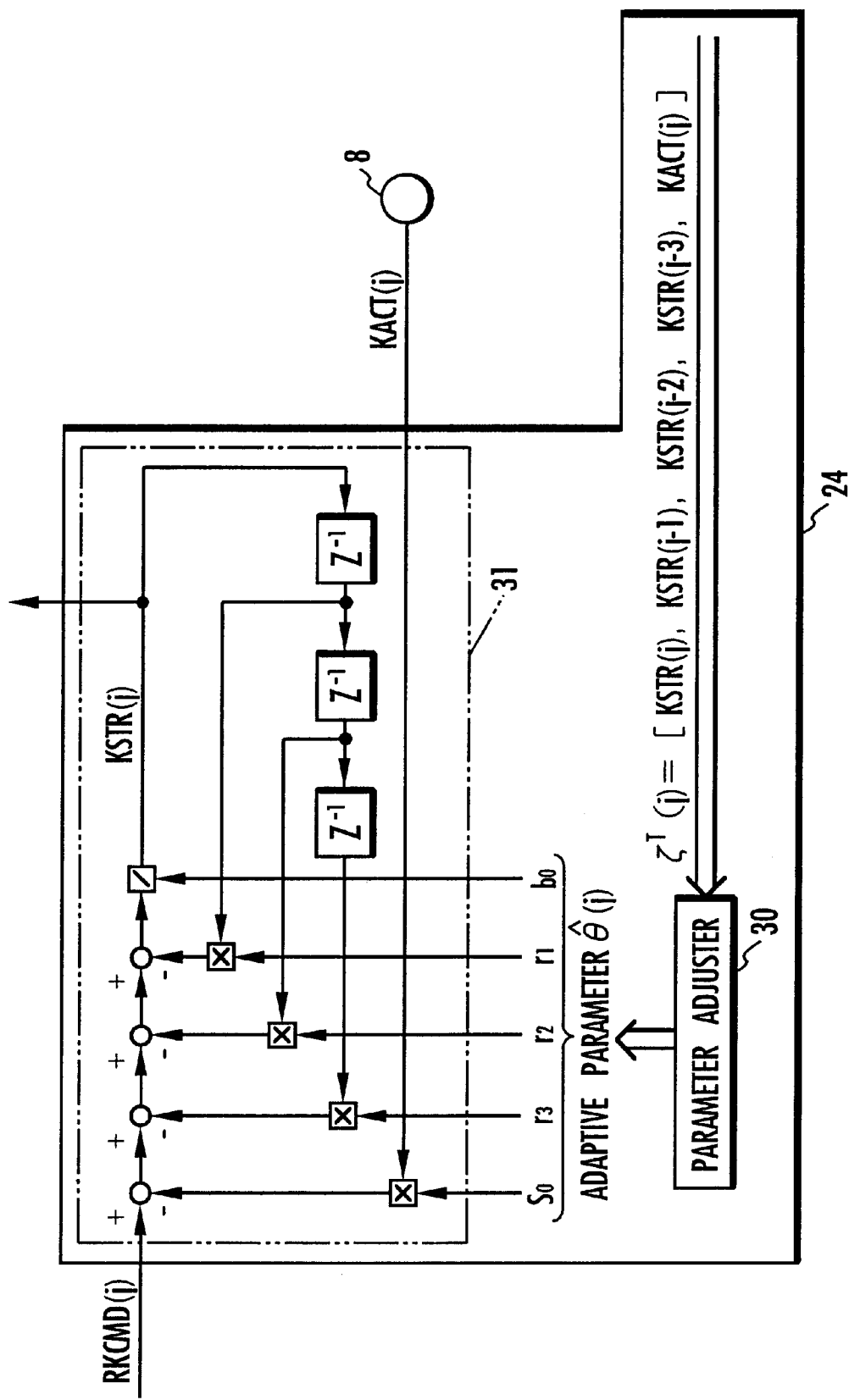
FIG. 11 is a block diagram of an adaptive controller in the engine control means shown in FIG. 10.

The adaptive parameter θ hat expressed by the equation (30) is made up of a scalar quantity element b0 hat$^{-1}$ (j) for determining the gain of the adaptive controller 24, a control element BR hat $(Z^{-1},j)$ expressed using a manipulation variable, and a control element S $(Z^{-1},j)$ expressed using a controlled variable, which are expressed respectively by the following equations (32) through (34) (see the block of the manipulation variable calculator 31 shown in FIG. 11):

$$\hat{b}0^{-1}(j) = \frac{1}{b0} \tag{32}$$

$$\begin{aligned}\hat{B}R(Z^{-1}, j) &= r1Z^{-1} + r2Z^{-2} + \ldots + rm+dp-1Z^{-(m+dp-1)} \\ &= r1Z^{-1} + r2Z^{-2} + r3Z^{-3}\end{aligned} \tag{33}$$

$$\begin{aligned}\hat{S}(Z^{-1}, j) &= s0 + s1Z^{-1} + \ldots + sn-1Z^{-(n-1)} \\ &= s0\end{aligned} \tag{34}$$

The parameter adjuster 30 establishes coefficients of the scalar quantity element and the control elements, described above, and supplies them as the adaptive parameter θ hat expressed by the equation (30) to the manipulation variable calculator 31. The parameter adjuster 30 calculates the adaptive parameter θ hat so that the output KACT of the LAF sensor 4 will agree with the actually used target air-fuel ratio RKCMD, using time-series data of the feedback manipulation variable KSTR from the present to the past and the output KACT of the LAF sensor 4.

Specifically, the parameter adjuster 30 calculates the adaptive parameter θ hat according to the following equation (35):

$$\hat{\theta}(j) = \hat{\theta}(j-1) + \Gamma(j-1) \cdot \zeta(j-dp) \cdot e^*(j) \tag{35}$$

where Γ(j) represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (36), (37):

$$\Gamma(j) = \frac{1}{\lambda 1(j)} \cdot \left[ \Gamma(j-1) - \frac{\lambda 2(j) \cdot \Gamma(j-1) \cdot \zeta(j-dp) \cdot \zeta^T(j-dp) \cdot \Gamma(j-1)}{\lambda 1(j) + \lambda 2(j) \cdot \zeta^T(j-dp) \cdot \Gamma(j-1) \cdot \zeta(j-dp)} \right] \quad (36)$$

where $0 < \lambda 1(j) \leq 1$, $0 \leq \lambda 2(j) < 2$, $\Gamma(0) > 0$.

$$e^*(j) = \frac{D(Z^{-1}) \cdot KACT(j) - \hat{\theta}^T(j-1) \cdot \zeta(j-dp)}{1 + \zeta^T(j-dp) \cdot \Gamma(j-1) \cdot \zeta(j-dp)} \quad (37)$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed tracing algorithm, and the fixed gain algorithm are obtained depending on how $\lambda 1(j)$, $\lambda 2(j)$ in the equation (36) are selected. For a time-dependent plant such as a fuel injection process, an air-fuel ratio, or the like of the internal combustion engine 1, either one of the degressive gain algorithm, the variable gain algorithm, the fixed gain algorithm, and the fixed tracing algorithm is suitable.

Using the adaptive parameter θ hat (s0, r1, r2, r3, b0) established by the parameter adjuster 30 and the actually used target air-fuel ratio RKCMD determined by the target air-fuel ratio selecting and setting unit 16, the manipulation variable calculator 31 determines the feedback manipulation variable KSTR according to a recursive formula expressed by the following equation (38):

$$KSTR(j) = \frac{1}{b0} \cdot [RKCMD(j) - s0 \cdot KACT(j) - r1 \cdot KSTR(j-1) - r2 \cdot KSTR(j-2) - r3 \cdot KSTR(j-3)] \quad (38)$$

The manipulation variable calculator 31 shown in FIG. 11 represents a block diagram of the calculations according to the equation (38).

The feedback manipulation variable KSTR determined according to the equation (38) becomes the actually used target air-fuel ratio RKCMD insofar as the output KACT of the LAF sensor 4 agrees with the actually used target air-fuel ratio RKCMD. Therefore, the feedback manipulation variable KSTR is divided by the actually used target air-fuel ratio RKCMD by the divider 25 for thereby determining the feedback manipulation variable kstr that can be used as the feedback correction coefficient KFB.

As is apparent from the foregoing description, the adaptive controller 24 thus constructed is a recursive-type controller taking into account dynamic behavioral changes of the internal combustion engine 1 which is an object to be controlled. Stated otherwise, the adaptive controller 24 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 24 constructed as described above is suitable for compensating for dynamic behavioral changes of the internal combustion engine 1.

The details of the adaptive controller 24 have been described above.

The PID controller 23, which is provided together with the adaptive controller 24 in the general feedback controller 21, calculates a proportional term (P term), an integral term (I term), and a derivative term (D term) from the difference between the output KACT of the LAF sensor 4 and the actually used target air-fuel ratio RKCMD, and calculates the total of those terms as the feedback manipulation variable KLAF, as is the case with the general PID control process. In the present embodiment, the feedback manipulation variable KLAF is set to "1" when the output KACT of the LAF sensor 4 agrees with the actually used target air-fuel ratio RKCMD by setting an initial value of the integral term (I term) to "1", so that the feedback manipulation variable KLAF can be used as the feedback correction coefficient KFB for directly correcting the fuel injection quantity. The gains of the proportional term, the integral term, and the derivative term are determined from the rotational speed NE and intake pressure PB of the internal combustion engine 1 using a predetermined map.

The switcher 26 of the general feedback controller 21 outputs the feedback manipulation variable KLAF determined by the PID controller 23 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 4 is not reliable due to a response delay of the LAF sensor 4 as immediately after the air-fuel ratio feedback control process has started. Otherwise, the switcher 26 outputs the feedback manipulation variable kstr which is produced by dividing the feedback manipulation variable KSTR determined by the adaptive controller 24 by the actually used target air-fuel ration RKCMD, as the feedback correction coefficient KFB for correcting the fuel injection quantity. This is because the adaptive controller 24 effects a high-gain control process and functions to converge the output KACT of the LAF sensor 4 quickly to the actually used target air-fuel ratio RKCMD, and if the feedback manipulation variable KSTR determined by the adaptive controller 18 is used when the combustion in the internal combustion engine 1 is unstable or the output KACT of the LAF sensor 4 is not reliable, then the air-fuel ratio control process tends to be unstable.

Such operation of the switcher 26 is disclosed in detail in Japanese laid-open patent publication No. 8-105345 or U.S. Pat. No. 5,558,075, and will not be described in detail below.

Operation of the apparatus according to the present embodiment will be described below.

Figure 12:
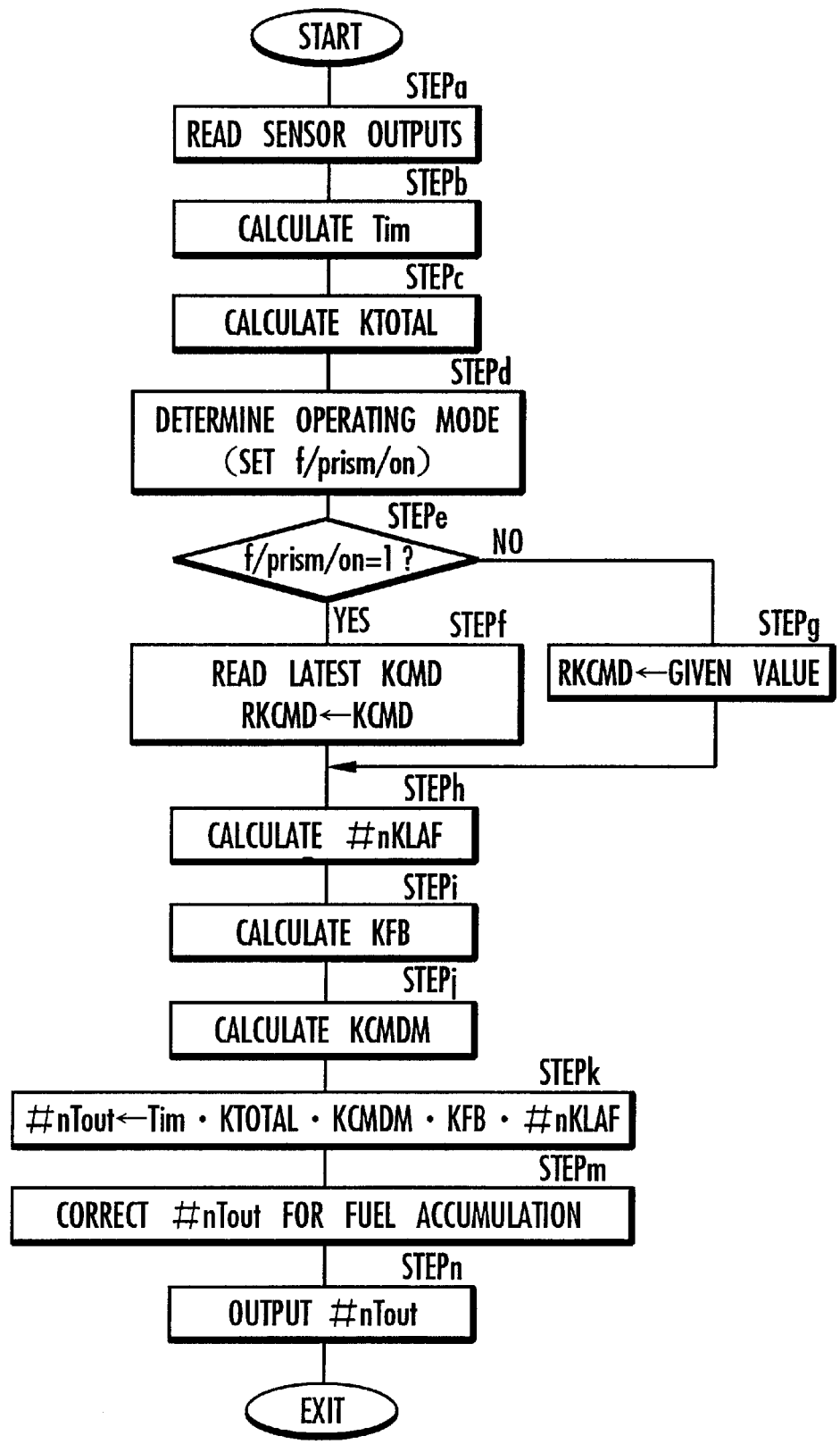
FIG. 12 is a flowchart of a main routine of a processing sequence carried out by the engine control means shown in FIG. 1.

First, a process, carried out by the engine control means 7, of calculating an output fuel injection quantity #nTout (n=1, 2, 3, 4) for each of the cylinders of the internal combustion engine 1 for controlling the air-fuel ratio of the internal combustion engine 1 will be described below with reference to FIG. 12. The engine control means 7 calculates an output fuel injection quantity #nTout (n=1, 2, 3, 4) for each of the cylinders in synchronism with a crankshaft angle period (TDC) of the internal combustion engine 1 as follows:

In FIG. 12, the engine control means 8 reads outputs from various sensors including the LAF sensor 4 and the $O_2$ sensor 5 in STEPa. At this time, the output KACT of the LAF sensor 4 and the output VO2/OUT of the $O_2$ sensor 5, including data obtained in the past, are stored in a time-series fashion in a memory (not shown).

Then, the basic fuel injection quantity calculator 17 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 18 calculates a first correction coefficient KTOTAL depending on the coolant temperature and the amount by which the canister is purged in STEPc.

The engine control means 8 decides whether the operation mode of the internal combustion engine 1 is the stoichiometric operation mode for adjusting the fuel injection quantity using the target air-fuel ratio KCMD generated by the manipulation variable generating means 7 or not, and sets a value of a flag f/prism/on in STEPd. When the value of the flag f/prism/on is "0", it means that the operation mode of the internal combustion engine 1 is not the stoichiometric operation mode, and when the value of the flag f/prism/on is "1", it means that the operation mode of the internal combustion engine 1 is the stoichiometric operation mode.

Figure 13:
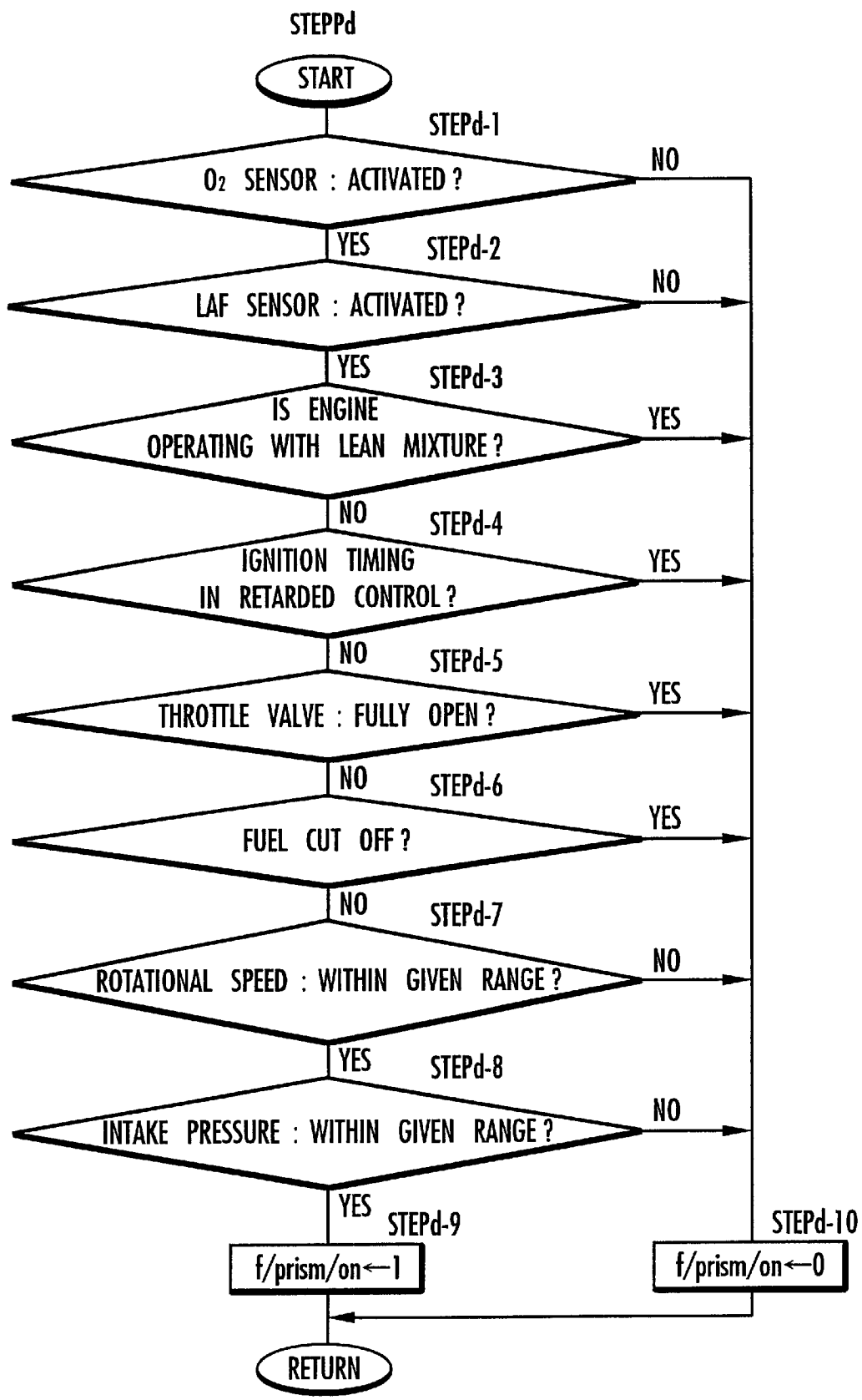
FIG. 13 is a flowchart of a subroutine of the main routine shown in FIG. 12.

In the above deciding step, it is determined whether the $O_2$ sensor 5 and the LAF sensor 4 are activated or not in STEPd-1, STEPd-2, as shown in FIG. 13. If neither one of the $O_2$ sensor 5 and the LAF sensor 4 is activated, since detected data from the $O_2$ sensor 5 or the LAF sensor 4 for use by the manipulation variable generating means 7 is not accurate enough, then the operation mode of the internal combustion engine 1 is not the stoichiometric operation mode and the value of the flag f/prism/on is set to "0" in STEPd-10.

Then, the engine control means 8 decides whether the internal combustion engine 1 is operating with a lean air-fuel mixture or not in STEPd-3. The engine control means 8 decides whether the ignition timing of the internal combustion engine 1 is retarded for early activation of the catalytic converter 3 immediately after the start of the internal combustion engine 1 or not in STEPd-4. The engine control means 8 decides whether the throttle valve of the internal combustion engine 1 is fully open or not in STEPd-5. The engine control means 8 decides whether the supply of fuel to the internal combustion engine 1 is being stopped or not in STEPd-6. If either one of the conditions of these steps is satisfied, then the operation mode of the internal combustion engine 1 is not the stoichiometric operation mode and the value of the flag f/prism/on is set to "0" in STEPd-10.

The engine control means 8 then decides whether the rotational speed NE and intake pressure PB of the internal combustion engine 1 fall within respective given ranges or not respectively in STEPd-7, STEPd-8. If either one of the rotational speed NE and the intake pressure PB does not fall within its given range, then the operation mode of the internal combustion engine 1 is not the stoichiometric operation mode and the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied, then the operation mode of the internal combustion engine 1 is determined as the stoichiometric operation mode and the value of the flag f/prism/on is set to "1" in STEPd-9.

In FIG. 12, after the value of the flag f/prism/on has been set, the target air-fuel ratio selecting and setting unit 16 of the engine control means 8 determines the value of the flag f/prism/on in STEPe, and sets the actually used target air-fuel ratio RKCMD depending on the value of the flag f/prism/on. Specifically, if f/prism/on=1 (the operation mode of the internal combustion engine 1 is the stoichiometric operation mode), then the target air-fuel ratio selecting and setting unit 16 reads the latest target air-fuel ratio KCMD generated by the manipulation variable generating means 7 and sets the read latest target air-fuel ratio KCMD as the actually used target air-fuel ratio RKCMD in STEPf. If f/prism/on=0 as when the operation mode of the internal combustion engine 1 is the lean operation mode, then the target air-fuel ratio selecting and setting unit 16 sets the actually used target air-fuel ratio RKCMD to a predetermined value in STEPg. The predetermined value to be established as the really used target air-fuel ratio RKCMD is determined from the rotational speed NE and intake pressure PB of the internal combustion engine 1 using a predetermined map, for example.

In the local feedback controller 22, the PID controllers 28 calculates respective feedback correction coefficients #nKLAF in order to eliminate variations between the cylinders, based on actual air-fuel ratios #nA/F of the respective cylinders which have been estimated from the output KACT of the LAF sensor 4 by the observer 27, in STEPh. Then, the general feedback controller 21 calculates a feedback correction coefficient KFB in STEPi.

Depending on the operating conditions of the internal combustion engine 1, the switcher 26 selects either the feedback manipulation variable KLAF determined by the PID controller 23 or the feedback manipulation variable kstr which has been produced by dividing the feedback manipulation variable KSTR determined by the adaptive controller 24 by the target air-fuel ratio KCMD (normally, the switcher 26 selects the feedback manipulation variable kstr from the adaptive controller 24). The switcher 26 then outputs the selected feedback manipulation variable KLAF or kstr as a feedback correction coefficient KFB for correcting a fuel injection quantity.

When switching the feedback correction coefficient KFB from the feedback manipulation variable KLAF from the PID controller 23 to the feedback manipulation variable kstr from the adaptive controller 24, the adaptive controller 24 determines a feedback manipulation variable KSTR in a manner to hold the correction coefficient KFB to the preceding correction coefficient KFB (=KLAF) as long as in the control cycle for the switching in order to avoid an abrupt change in the correction coefficient KFB. When switching the feedback correction coefficient KFB from the feedback manipulation variable kstr from the adaptive controller 24 to the feedback manipulation variable KLAF from the PID controller 23, the PID controller 23 calculates a present correction coefficient KLAF in a manner to regard the feedback manipulation variable KLAF determined by itself in the preceding cycle time as the preceding correction coefficient KFB (=kstr).

After the feedback correction coefficient KFB has been calculated, the second correction coefficient calculator 19 calculates in STEPj a second correction coefficient KCMDM depending on the actually used target air-fuel ratio RKCMD determined in STEPf or STEPg.

Then, the engine control means 8 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation correctors 29 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycles synchronous with the crankshaft angle period of the internal combustion engine 1 for controlling the air-fuel ratio of the internal combustion engine 1 in order to converge the output KACT of the LAF sensor 4 (the detected value of the air-fuel ratio) to the target air-fuel ratio KCMD. While the feedback manipulation variable kstr from the adaptive controller 24 is being used as the feedback correction coefficient KFB, the output KACT of the LAF sensor 4 is quickly converged to the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 14:
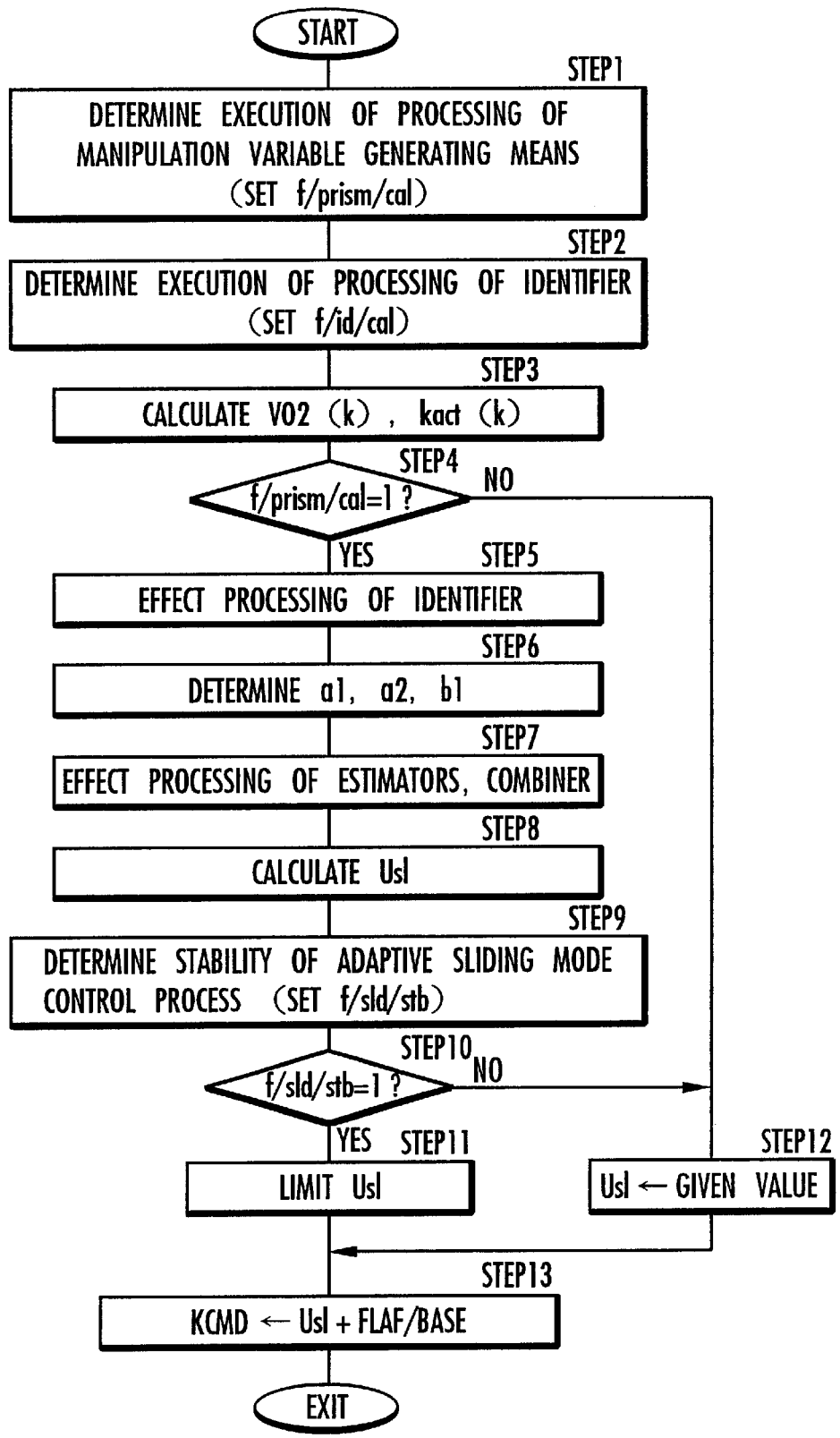
FIG. 14 is a flowchart of a main routine of a processing sequence carried out by the manipulation variable generating means shown in FIG. 3.

Concurrent with the above fuel supply control for the internal combustion engine 1, the manipulation variable generating means 7 of the control unit 6 executes a main routine shown in FIG. 14 in control cycles of a constant period.

As shown in FIG. 4, the manipulation variable generating means 7 decides whether the processing thereof (the process of generating the target air-fuel ratio KCMD) is to be executed or not, and sets a value of a flag f/prism/cal indicative of whether the processing is to be executed or not in STEP1. When the value of the flag f/prism/cal is "0", it means that the processing of the manipulation variable generating means 7 is not to be executed, and when the value of the flag f/prism/cal is "1", it means that the processing of the manipulation variable generating means 7 is to be executed.

Figure 15:
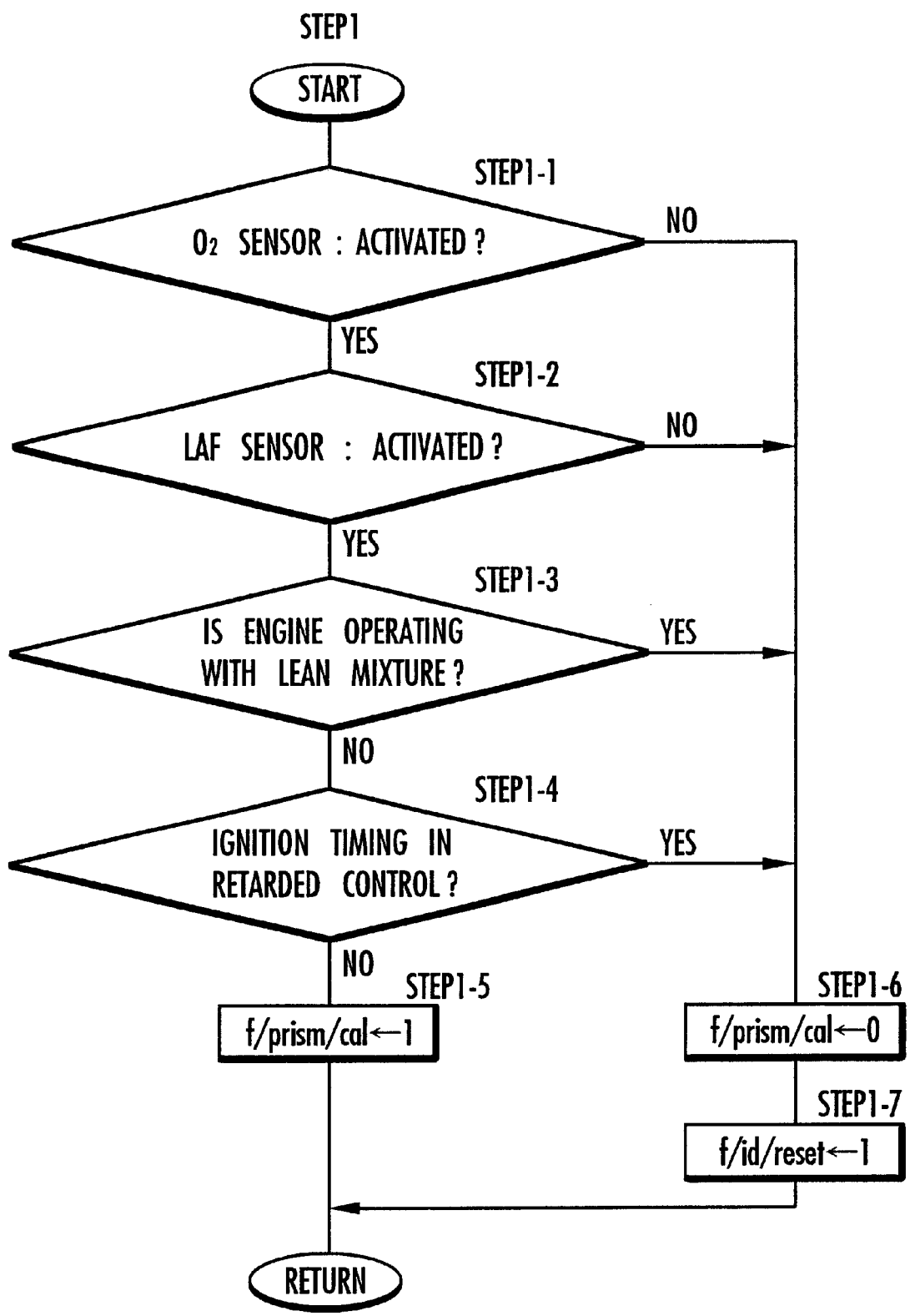
FIG. 15 is a flowchart of a subroutine of the main routine shown in FIG. 14.

The deciding subroutine in STEP1 is shown in detail in FIG. 15. As shown in FIG. 15, the manipulation variable generating means 7 decides whether the $O_2$ sensor 5 and the LAF sensor 4 are activated or not respectively in STEP1-1, STEP1-2. If neither one of the 0 sensor 5 and the LAF sensor 4 is activated, since detected data from the $O_2$ sensor 5 and the LAF sensor 4 for use by the manipulation variable generating means 7 are not accurate enough, the value of the flag f/prism/cal is set to "0" in STEP1-6. Then, in order to initialize the identifier 11 as described later on, the value of a flag f/id/reset indicative of whether the identifier 11 is to be initialized or not is set to "1" in STEP1-7. When the value of the flag f/id/reset is "1", it means that the identifier 11 is to be initialized, and when the value of the flag f/id/reset is "0", it means that the identifier 11 is not to be initialized.

The manipulation variable generating means 7 decides whether the internal combustion engine 1 is operating with a lean air-fuel mixture or not in STEP1-3. The manipulation variable generating means 7 decides whether the ignition timing of the internal combustion engine 1 is retarded for early activation of the catalytic converter 3 immediately after the start of the internal combustion engine 1 or not in STEP1-4. If the conditions of these steps are satisfied, then since the control process of converging the output VO2/OUT of the $O_2$ sensor 6 to the target value VO2/TARGET is not carried out, the value of the flag f/id/cal is set to "0" in STEP1-6, and the value of the flag f/id/reset is set to "1" in order to initialize the identifier 11 in STEP1-7.

Only if the conditions of STEP1-1, STEP1-2 are satisfied and the conditions of STEP1-3, STEP1-4 are not satisfied, then the manipulation variable generating means 7 sets the value of the flag f/prism/cal to "1" STEP1-5.

In FIG. 14, after the above deciding subroutine, the manipulation variable generating means 7 decides whether a process of identifying (updating) the gain coefficients a1, a1, b1 with the identifier 11 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 with the identifier 11 is not to be executed, and when the value of the flag f/id/cal is "1", it means that the process of identifying (updating) the gain coefficients a1, a1, b1 is to be executed.

In the deciding process in STEP2, the manipulation variable generating means 7 decides whether the throttle valve of the internal combustion engine 1 is fully open or not and whether the supply of fuel to the internal combustion engine 1 is being stopped or not. If either one of these conditions is satisfied, then since it is difficult to identify the gain coefficients a1, a1, b1 appropriately, the value of the flag f/id/cal is set to "0". If neither one of these conditions is satisfied, then the value of the flag f/id/cal is set to "1" to identify (update) the gain coefficients a1, a1, b1 with the identifier 11.

The manipulation variable generating means 7 calculates the latest differential outputs kact(k) (=KACT−FLAF/BASE), VO2(k) (=VO2/OUT−VO2/TARGET) respectively with the subtractors 9, 10 in STEP3. Specifically, the subtractors 9, 10 select latest ones of the time-series data read and stored in the non-illustrated memory in STEPa shown in FIG. 12, and calculate the differential outputs kact(k), VO2(k). The differential outputs kact(k), VO2(k), as well as data given in the past, are stored in a time-series manner in a memory (not shown).

Then, in STEP4, the manipulation variable generating means 7 determines the value of the flag f/prism/cal set in STEP1. If the value of the flag f/prism/cal is "0", i.e., if the processing of the manipulation variable generating means 7 is not to be executed, then the manipulation variable generating means 7 forcibly sets the SLD manipulating input Usl (the target differential air-fuel ratio kcmd) to be determined by the sliding mode controller 15, to a predetermined value in STEP12. The predetermined value may be a fixed value (e.g., "0") or the value of the SLD manipulating input Usl determined in a preceding control cycle.

After the SLD manipulating input Usl is set to the predetermined value in STEP12, the manipulation variable generating means 7 adds the air-fuel ratio reference value FLAF/BASE to the SLD manipulating input Usl for thereby determining a target air-fuel ratio KCMD in the present control cycle in STEP13. Then, the processing in the present control cycle is finished.

If the value of the flag f/prism/cal is "1" in STEP4, i.e., if the processing of the manipulation variable generating means 7 is to be executed, then the manipulation variable generating means 7 effects the processing of the identifier 11 in STEP5.

Figure 16:
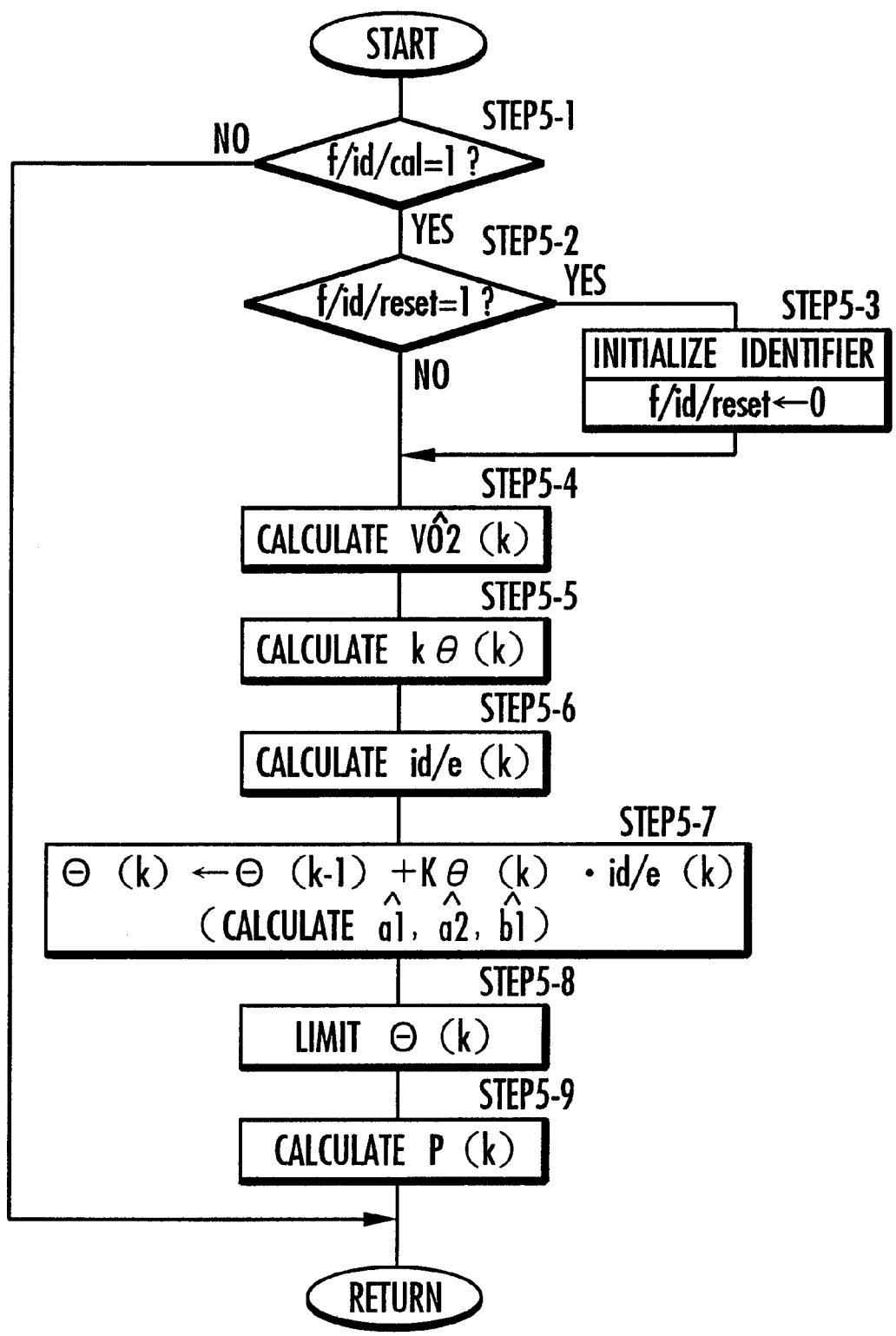
FIG. 16 is a flowchart of a subroutine of the main routine shown in FIG. 14.
Figure 17:
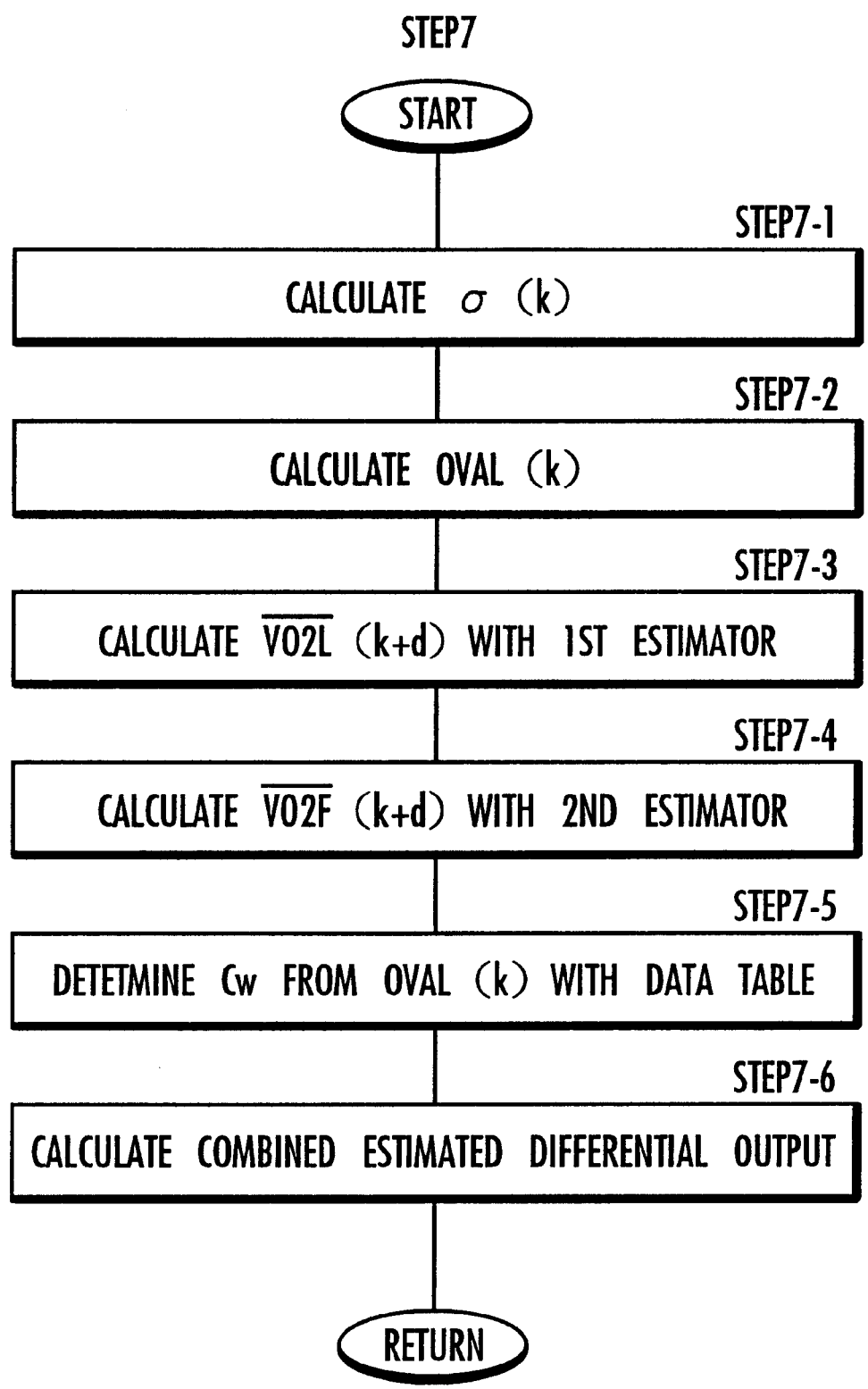
FIG. 17 is a flowchart of a subroutine of the main routine shown in FIG. 14.

The processing subroutine of STEP5 is shown in detail in FIG. 16.

The identifier 11 determines the value of the flag f/id/cal set in STEP2 in STEP5-1. If the value of the flag f/id/cal is "0", then since the process of identifying the gain coefficients a1, a1, b1 with the identifier 11 is not carried out, control immediately goes back to the main routine shown in FIG. 14.

If the value of the flag f/id/cal is "1", then the identifier 11 determines the value of the flag f/id/reset set in STEP1 with respect to the initialization of the identifier 11 in STEP5-2. If the value of the flag f/id/reset is "1", the identifier 11 is initialized in STEP5-3. When the identifier 11 is initialized, the identified gain coefficients a1 hat, a2 hat, b1 hat are set to predetermined initial values (the identified gain coefficient vector Θ according to the equation (3) is initialized), and the elements of the matrix P (diagonal matrix) according to the equation (6) are set to predetermined initial values. The value of the flag f/id/reset is reset to "0".

Then, the identifier 11 calculates the identified differential output VO2(k) hat using the present identified gain coefficients a1(k−1) hat, a2(k−1) hat, b1(k−1) hat, and the past data VO2(k−1), VO2(k−2), kact(k−d−1) of the differential outputs VO2, kact calculated in each control cycle in STEP3, according to the equation (3) in STEP5-4.

The identifier 11 then calculates the vector Kθ(k) to be used in determining the new identified gain coefficients a1 hat, a2 hat, b1 hat according to the equation (6) in STEP5-5. Thereafter, the identifier 11 calculates the identified error id/er(k) (the difference between the identified differential output VO2 hat and the actual differential output VO2, see the equation (4)), in STEP5-6.

The identified error id/er(k) may basically be calculated according to the equation (4). In the present embodiment, however, a value (=VO2−VO2 hat) calculated according to the equation (4) from the differential output VO2 calculated in each control cycle in STEP3 (see FIG. 14), and the identified differential output VO2 hat calculated in each control cycle in STEP5-4 is filtered with predetermined low-ass characteristics to calculate the identified error id/er (k).

The above filtering is carried out because since the behavior of the exhaust system E including the catalytic converter 3 generally has low-pass characteristics, it is preferable to attach importance to the low-frequency behavior of the exhaust system E in appropriately identifying the gain coefficients a1, a2, b1 of the exhaust system model.

Both the differential output VO2 and the identified differential output VO2 hat may be filtered with the same low-pass characteristics. For example, after the differential output VO2 and the identified differential output VO2 hat have separately been filtered, the equation (4) may be calculated to determine the identified error id/er(k). The above filtering is carried out by a moving average process which is a digital filtering process.

Then, the identifier 11 calculates a new identified gain coefficient vector Θ(k), i.e., new identified gain coefficients a1(k) hat, a2(k) hat, b1(k) hat, according to the equation (5) using the identified error id/e(k) determined in STEP5-6 and Kθ(k) calculated in STEP5-5 in STEP5-7.

After having calculated the new identified gain coefficients a1(k) hat, a2(k) hat, b1(k) hat, the identifier 11 limits the values of the identified gain coefficients a1 hat, a2 hat, b1 hat (elements of the identified gain coefficient vector Θ) to meet predetermined conditions in STEP5-8. The identifier 11 updates the matrix P(k) according to the equation (7) for the processing of a next control cycle in STEP5-9, after which control returns to the main routine shown in FIG. 14.

The process of limiting the identified gain coefficients a1 hat, a2 hat, b1 hat in STEP5-8 comprises a process of limiting the combination of the values of the identified gain coefficients a1 hat, a2 hat to a certain combination, i.e., a process of limiting a point (a1 hat, a2 hat) to a predetermined region on a coordinate plane having the identified gain coefficients a1 hat, a2 hat as components thereof, and a process of limiting the value of the identified gain coefficient b1 hat to a predetermined range. According to the former process, if the point (a1(k) hat, a2(k) hat) on the coordinate plate determined by the identified gain coefficients a1(k) hat, a2(k) hat calculated in STEP5-7 deviates from the predetermined region on the coordinate plane, then the values of the identified gain coefficients a1(k) hat, a2(k) hat are forcibly limited to the values of a point in the predetermined region. According to the latter process, if the value of the identified gain coefficient b1 hat calculated in STEP5-7 exceeds the upper or lower limit of the predetermined range, then the value of the identified gain coefficient b1 hat is forcibly limited to the upper or lower limit of the predetermined range.

The above process of limiting the identified gain coefficients a1 hat, a2 hat, b1 hat serves to keep stable the SLD manipulating input Usl (the target differential air-fuel ratio kcmd) and the target air-fuel ratio KCMD calculated by the sliding mode controller 15.

Specific details of the process of limiting the identified gain coefficients a1 hat, a2 hat, b1 hat are disclosed in Japanese laid-open patent publication No. 11-153051 and U.S. patent application Ser. No. 6,112,517, and hence will not be described below.

The preceding values a1(k−1) hat, a2(k−1) hat, b1(k−1) hat of the identified gain coefficients used for determining the new identified gain coefficients a1(k) hat, a2(k) hat, b1(k) hat in STEP5-7 shown in FIG. 16 are the values of the identified gain coefficients limited in STEP5-8 in the preceding control cycle.

The details of the processing operation of the identifier 11 in STEP5 shown in FIG. 14 have been described above.

Referring back to FIG. 14, after having carried out the processing operation of the identifier 11, the manipulation variable generating means 7 determines the values of the gain coefficients a1, a2, b1 in STEP6. In this process, if the value of the flag f/id/cal set in STEP2 is "1", i.e., if the gain coefficients a1, a2, b1 have been identified by the identifier 11, then the gain coefficients a1, a2, b1 are set to the latest identified gain coefficients a1(k) hat, a2(k) hat, b1(k) hat that have been determined by the identifier 11 in STEP5. If the value of the flag f/id/cal is "0", i.e., if the gain coefficients a1, a2, b1 have not been identified by the identifier 11, then the gain coefficients a1, a2, b1 are set to respective predetermined values (e.g., values determined in the preceding control cycle).

Then, the manipulation variable generating means 7 carries out a processing operation of the first and second estimators 12, 13 and the combiner 14, i.e., a process of calculating the combined estimated differential output VO2 bar in STEP7. This processing operation is carried out as shown in a flowchart shown in FIG. 17.

The manipulation variable generating means 7 calculates the value σ(k) of the linear function σ for fuzzy control according to the equation (12) using the present value VO2(k) and the preceding value VO2(k−1) of the differential output VO2 of the $O_2$ sensor 5 in STEP7-1.

The manipulation variable generating means 7 calculates the value OVAL(k) of the elliptical function according to the equation (27) using the calculated value σ(k) of the linear function θ for fuzzy control and the present value VO2(k) of the differential output VO2 in STEP7-2.

Then, the first estimator 12 of the manipulation variable generating means 7 calculates the estimated differential output VO2L(k+d) bar of the $O_2$ sensor 5 in STEP7-3. At this time, the first estimator 12 first calculates the coefficient values α1, α2, βj (j=1, ..., d) to be used in the equation (9) according to the definition given with respect to the equation (9), using the gain coefficients a1, a2, b1 determined in STEP6 (these values are basically the identified gain coefficients a1 hat, a2 hat, b1 hat).

Then, the first estimator 12 calculates the estimated differential output VO2L(k+d) bar as the estimated value of the differential output VO2 after the total dead time d from the time of the present control cycle according to the equation (9), using the time-series data VO2(k), VO2(k−1), from before the present control cycle, of the differential output VO2 of the $O_2$ sensor 5, the time-series data kact(k−j) (j=0, ..., d1), from before the present control cycle, of the differential output kact of the LAF sensor 4, the time-series data kcmd(k−j) (=Usl(k−j), j=1, ..., d2−1), from before the preceding control cycle, of the target differential air-fuel ratio kcmd (=the SLD manipulating input Usl) given in each control cycle from the sliding mode controller 15, and the coefficients α1, α2, βj calculated as described above.

After the above processing operation of the first estimator 12, the second estimator 13 calculates the estimated differential output VO2F(k+d) of the $O_2$ sensor 5 in STEP7-4. At this time, the second estimator 13 determines fitnesses Wpre(i) (i=1, 2, ..., 9) relative to the antecedent parts of the respective fuzzy rules, as described above, using the present value VO2(k) of the differential output VO2 of the $O_2$ sensor 5 and the present value σ(k) of the linear function σ for fuzzy control calculated in STEP7-1, and calculates the estimated differential output VO2F(k+d) bar as the estimated value of the differential output VO2 after the total dead time d from the time of the present control cycle according to the equation (25).

Then, the manipulation variable generating means 7 determines the weighting coefficient Cw from the data table shown in FIG. 9 depending on the value of the elliptical function OVAL(k) determined in STEP7-2 in STEP7-5. Thereafter, the manipulation variable generating means 7 calculates the combined estimated differential output VO2 (k+d) bar, which is a combination of the estimated differential outputs VO2L(k+d) bar, VO2F(k+d) bar which have been determined by the respective first and second estimators 12, 13 respectively in STEP7-3, STEP7-4, according to the equation (26) using the weighting coefficient Cw in STEP7-6.

The manipulation variable generating means 7 limits the value of the combined estimated differential output VO2(k+ d) bar in STEP7-7. Thereafter, control returns to the main routine shown in FIG. 14. Specifically, in the limiting process in STEP7-7, if the value of the combined estimated differential output VO2(k+d) bar exceeds the predetermined upper or lower limit, then the manipulation variable generating means 7 forcibly limits the value of the combined estimated differential output VO2(k+d) bar to the upper or lower limit.

According to the processing in STEP7 described above, the combined estimated differential output VO2(k+d) bar is calculated as the estimated value of the differential output VO2 after the total dead time d in each control cycle.

Referring back to FIG. 14, the manipulation variable generating means 7 calculates the SLD manipulating input Usl (=the target differential air-fuel ratio kcmd) with the sliding mode controller 15 in STEP9.

Specifically, the sliding mode controller 15 calculates a value σ(k+d) bar (corresponding to an estimated value, after the total dead time d, of the linear function σ defined according to the equation (12)), after the total dead time d from the present control cycle, of the switching function σ bar defined according to the equation (21), using the time-series data VO2(k+d) bar, VO2(k+d−1) bar of the present and preceding values of the combined estimated differential output VO2 bar determined by the combiner 14 in STEP7.

Then, the sliding mode controller 15 accumulatively adds values σ(k+d) bar·ΔT, produced by multiplying the value σ(k+d) bar of the switching function σ bar by the period ΔT (constant period) of the control cycles of the manipulation variable generating means 7. That is, the sliding mode controller 15 adds the product σ(k+d) bar·ΔT of the value σ(k+d) bar and the period ΔT calculated in the present control cycle to the sum determined in the preceding control cycle, thus calculating an integrated value σ bar (hereinafter represented by "Σσbar") which is the calculated result of the term Σ(σbar·T) of the equation (23).

Then, the sliding mode controller 15 calculates the equivalent control input Ueq, the reaching control law input Urch, and the adaptive control law Uadp according to the respective equations (20), (22), (23), using the present value VO2(k+d)bar and the preceding value VO2(k+d−1) bar of the combined estimated differential output VO2 bar determined by the combiner 14 in STEP7, the value σ(k+d) bar of the switching function σ and its integrated value Σσ bar which are determined as described above, and the gain coefficients a1, a1, b1 determined in STEP6 (these values are basically the latest identified gain coefficients a1(k) hat, a2(k) hat, b1(k) hat).

The sliding mode controller 15 then adds the equivalent control input Ueq, the reaching control law input Urch, and the adaptive control law Uadp to calculate the SLD manipulating input Usl, i.e., the input quantity (=the target differential air-fuel ratio kcmd) required to be applied to the exhaust system E for converging the output signal VO2/OUT of the $O_2$ sensor 5 to the target value VO2/TARGET.

After the SLD manipulating input Usl has been calculated, the sliding mode controller 15 determines the stability of the adaptive sliding mode control process, or more specifically, the stability of the controlled state of the output VO2/OUT of the $O_2$ sensor 5 based on the adaptive sliding mode control process (hereinafter referred to as "SLD controlled state"), and sets a value of a flag f/sld/stb indicative of whether the SLD controlled state is stable or not in STEP9. The value of the flag f/sld/stb is "1" if the SLD controlled state is stable, and "0" otherwise.

Figure 18:
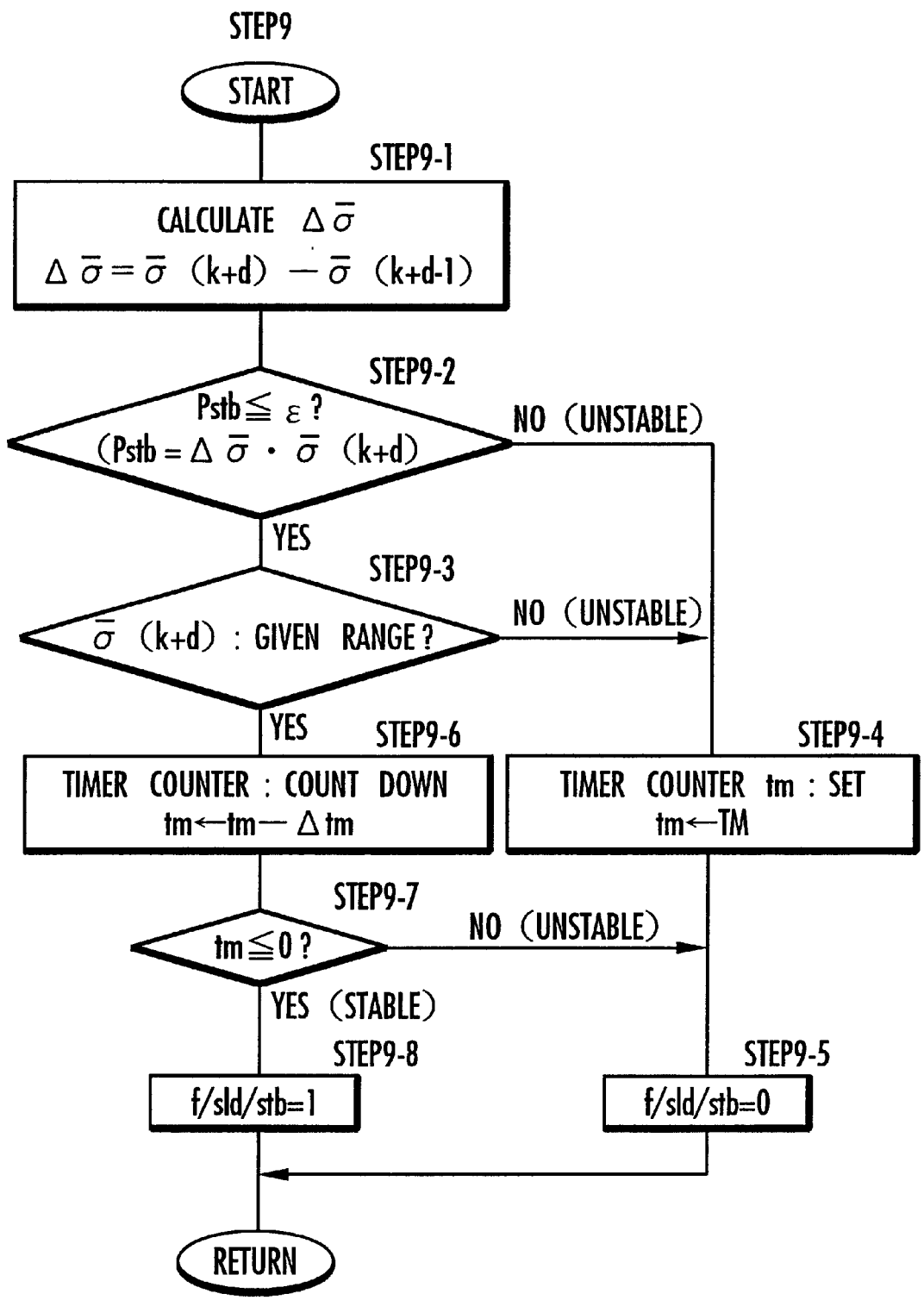
FIG. 18 is a flowchart of a subroutine of the main routine shown in FIG. 14.

The stability determining subroutine of STEP9 is shown in detail in FIG. 18.

As shown in FIG. 23, the sliding mode controller 15 calculates a difference Δσ bar (corresponding to a rate of change of the switching function σ bar) between the present value σ(k+d) bar of the switching function σ bar calculated in STEP9 and a preceding value σ(k+d−1) bar thereof in STEP9-1.

Then, the sliding mode controller 15 decides whether or not a product Δσ·σ(k+d) bar (corresponding to the time-differentiated function of a Lyapunov function σ $bar^2/2$ relative to the σ bar) of the difference Δσ bar and the present value σ(k+d) bar is equal to or smaller than a predetermined value ε (≧0) in STEP9-2.

The difference Δσ·σ(k+d) bar (hereinafter referred to as "stability determining parameter Pstb") will be described below. If the stability determining parameter Pstb is greater than 0 (Pstb>0), then the value of the switching function σ bar is basically changing away from "0". If the stability determining parameter Pstb is equal to or smaller than 0 (Pstb≦0), then the value of the switching function σ bar is basically converged or converging to "0". Generally, in order to converge a controlled variable to its target value according to the sliding mode control process, it is necessary that the value of the switching function be stably converged to "0". Basically, therefore, it is possible to determine whether the SLD controlled state is stable or unstable depending on whether or not the value of the stability determining parameter Pstb is equal to or smaller than 0.

If, however, the stability of the SLD controlled state is determined by comparing the value of the stability determining parameter Pstb with "0", then the determined result of the stability is affected even by slight noise contained in the value of the switching function σ bar. According to the present embodiment, therefore, the predetermined value ε with which the stability determining parameter Pstb is to be compared in STEP9-2 is of a positive value slightly greater than "0".

If Pstb>ε in STEP9-2, then the SLD controlled state is judged as being unstable, and the value of a timer counter tm (count-down timer) is set to a predetermined initial value $T_M$ (the timer counter tm is started) in order to inhibit the determination of the target air-fuel ratio KCMD using the SLD manipulating input Usl calculated in STEP8 for a predetermined time in STEP9-4. Thereafter, the value of the flag f/sld/stb is set to "0" in STEP9-5, after which control returns to the main routine shown in FIG. 14.

If Pstb≦ε in STEP9-2, then the sliding mode controller 15 decides whether the present value σ(k+d) bar of the switching function σ bar falls within a predetermined range or not in STEP9-3.

If the present value σ(k+d) bar of the switching function σ bar does not fall within the predetermined range, then since the present value σ(k+d) bar is spaced widely apart from "0", the SLD controlled state is considered to be unstable. Therefore, if the present value σ(k+d) bar of the switching function σ bar does not fall within the predetermined range in STEP9-3, then the SLD controlled state is judged as being unstable, and the processing of STEP9-4 and STEP9-5 is executed to start the timer counter tm and set the value of the flag f/sld/stb to "0".

If the present value σ(k+d) bar of the switching function a bar falls within the predetermined range in STEP9-3, then the sliding mode controller 15 counts down the timer counter tm for a predetermined time Δtm in STEP9-6. The sliding mode controller 15 then decides whether or not the value of the timer counter tm is equal to or smaller than "0", i.e., whether a time corresponding to the initial value $T_M$ has elapsed from the start of the timer counter tm or not, in STEP9-7.

If tm>0, i.e., if the timer counter tm is still measuring time and its set time has not yet elapsed, then since no substantial time has elapsed after the SLD controlled state is judged as unstable in STEP9-2 or STEP9-3, the SLD controlled state tends to become unstable. Therefore, if tm>0 in STEP9-7, then the value of the flag f/sld/stb is set to "0" in STEP9-5.

If tm≦0 in STEP9-7, i.e., if the set time of the timer counter tm has elapsed, then the SLD controlled stage is judged as being stable, and the value of the flag f/sld/stb is set to "1" in STEP9-8.

According to the above processing, if the SLD controlled state is judged as being unstable, then the value of the flag f/sld/stb is set to "0", and if the SLD controlled state is judged as being stable, then the value of the flag f/sld/stb is set to "1".

The above process of determining the stability of the SLD controlled state is by way of illustrative example only. The stability of the SLD controlled state may be determined by any of various other processes. For example, in each given period longer than the control cycle, the frequency with which the value of the stability determining parameter Pstb in the period is greater than the predetermined value ε is counted. If the frequency is in excess of a predetermined value, then the SLD controlled state is judged as unstable. Otherwise, the SLD controlled state is judged as stable.

Referring back to FIG. 14, after a value of the flag f/sld/stb indicative of the stability of the SLD controlled state has been set, the sliding mode controller 15 determines the value of the flag f/sld/stb in STEP10. If the value of the flag f/sld/stb is "1", i.e., if the SLD controlled state is judged as being stable, then the sliding mode controller 15 limits the SLD manipulating input Usl calculated in STEP8 in STEP11. Specifically, the sliding mode controller 15 determines whether the present value Usl(k) of the SLD manipulating input Usl calculated in STEP8 falls in a predetermined allowable range or not. If the present value Usl(k) exceeds the upper or lower limit of the allowable range, then the sliding mode controller 15 forcibly limits the present value Usl(k) of the SLD manipulating input Usl to the upper or lower limit of the allowable range.

The SLD manipulating input Usl (=the target differential air-fuel ratio kcmd) limited in STEP11 is stored in a memory (not shown) in a time-series fashion, and will be used in the above processing operation of the first estimator 12.

Then, the sliding mode controller 15 adds the air-fuel ratio reference value FLAF/BASE to the SLD manipulating input Usl which has been limited in STEP11 for thereby determining a target air-fuel ratio KCMD in STEP 13. Then, the processing in the present control cycle is finished.

If f/sld/stb=0 in STEP10, i.e., if the SLD controlled state is judged as unstable, then the sliding mode controller 15 forcibly sets the SLD manipulating input Usl in the present control cycle to a predetermined value (the fixed value or the preceding value of the SLD manipulating input Usl) in STEP12. The sliding mode controller 15 calculates the target air-fuel ratio KCMD according to the equation (24) in STEP 13. Then, the processing in the present control cycle is finished.

The target air-fuel ratio KCMD finally determined in STEP13 is stored in a memory (not shown) in a time-series fashion in each control cycle. When the general feedback controller 21, etc. is to use the target air-fuel ratio KCMD determined by the sliding mode controller 15 (see STEPf in FIG. 12), the latest one of the time-series data of the target air-fuel ratio KCMD thus stored is selected.

With the apparatus according to the above embodiment, in the stoichiometric operation mode of the internal combustion engine 1, the manipulation variable generating means 7 sequentially determines the target air-fuel ratio KCMD (the target value for the upstream-of-catalyst air-fuel ratio) for the internal combustion engine 1 according to the adaptive sliding mode control process so as to converge (adjust) the output VO2/OUT of the $O_2$ sensor 5 downstream of the catalytic converter 3 to the target value VO2/TARGET therefor. The engine control means 8 adjusts the amount of fuel injected into the internal combustion engine 1 to converge the output KACT of the LAF sensor 4 to the target air-fuel ratio KCMD for thereby feedback-controlling the upstream-of-catalyst air-fuel ratio at the target air-fuel ratio KCMD. The output VO2/OUT of the $O_2$ sensor 5 is thus converged to the target value VO2/TARGET therefor, making it possible to achieve an optimum exhaust gas purifying capability of the catalytic converter 3 regardless of aging thereof.

When the state quantity X=(VO2(k), VO2(k−1)) of the differential output VO2 of the $O_2$ sensor 5 is present in the linear behavior range A shown in FIG. 5, i.e., when the output VO2/OUT of the $O_2$ sensor 5 varies substantially linearly with respect to the oxygen concentration or the air-fuel ratio of the exhaust gas, the combined estimated differential output $VO_2$ bar of the $O_2$ sensor 5 which is to be used by the sliding mode controller 15 to calculate the target air-fuel ratio KCMD is an estimated differential output VO2L which is calculated by the first estimator 12 according to the algorithm based on the exhaust system model. When the state quantity X=(VO2(k), VO2(k−1)) is present outside of the linear behavior range Δ, i.e., when the output VO2/OUT of the O$_2$ sensor 5 varies nonlinearly with respect to the oxygen concentration or the air-fuel ratio of the exhaust gas, the combined estimated differential output VO2 bar is basically an estimated differential output VO2F which is calculated by the second estimator 13 according to the fuzzy inference algorithm.

Consequently, the accuracy of the combined estimated differential output VO2 bar as an estimated value of the differential output VO2 of the O$_2$ sensor 5 after the total dead time d in each control cycle can be kept at a high level irrespectively of the output state of the O$_2$ sensor 5 or the air-fuel ratio of the exhaust gas. In the stoichiometric operation mode of the internal combustion engine 1, the effect of the dead time d1 of the exhaust system E and the dead time d2 of the air-fuel ratio manipulating system is appropriately compensated for to converge the output VO2/OUT of the O$_2$ sensor 5 to the target value VO2/TARGET stably with a highly quick response. For example, even if the output VO2/OUT of the O$_2$ sensor 5 deviates widely from the target value VO2/TARGET immediately after the internal combustion engine 1 has changed from the lean operation mode to the stoichiometric operation mode or the immediately after the fuel supply to the internal combustion engine 1 has been cut off, the output VO2/OUT of the O$_2$ sensor 5 can be converged to the target value VO2/TARGET stably and quickly.

The condition for selecting the estimated differential outputs VO2L bar, VO2F bar of the estimators 12, 13 individually as the combined estimated differential output VO2 bar or the combination of the estimated differential outputs VO2L bar, VO2F bar as the combined estimated differential output VO2 bar is determined by whether or not the state quantity X=(VO2(k), VO2(k−1) is present in the linear behavior range A (see FIG. 5) which is determined in relation to the linear function σ for fuzzy control which corresponds to the switching function σ bar used in the processing operation of the sliding mode controller 15, i.e., whether or not the value OVAL of the elliptical function is equal to or smaller than "1". Therefore, the estimated differential outputs VO2L bar, VO2F bar of the estimators 12, 13 can be used as the combined estimated differential output VO2 bar in the processing operation of the sliding mode controller 15, i.e., the process of calculating the target air-fuel ratio KCMD, under optimum conditions matching their accuracy characteristics. As a result, the target air-fuel ratio KCMD generated by the sliding mode controller 15 is optimized for converging the output VO2/OUT of the O$_2$ sensor 5 to the target value VO2/TARGET.

The combined estimated differential output VO2 bar determined by the combiner 14 is basically either one of the estimated differential outputs VO2L bar, VO2F bar of the estimators 12, 13. When the state quantity X is present in the vicinity of the boundary of the linear behavior range Δhowever, the combined estimated differential output VO2 bar is a combination of the estimated differential outputs VO2L bar, VO2F bar with weighting coefficient Cw being variably set depending on the value OVAL of the elliptical function. Therefore, when the state quantity X varies in the vicinity of the boundary of the linear behavior range Δ, the value of the combined estimated differential output VO2 bar does not change abruptly, making highly stable the process of controlling the output VO2/OUT of the O$_2$ sensor 5.

The fuzzy inference process of the second estimator 13 employs the min-max-center-of-gravity process, and membership functions relative to the parameter VO2F bar of the consequent part are established by bar-shaped functions. Therefore, the estimated differential output VO2F bar can be determined according to a simple fuzzy inference algorithm.

With respect to the algorithm of the first estimator 12, the gain coefficients a1, a2, b1 which are parameters of the exhaust system model are identified on a realtime basis by the identifier 11 depending on the behavioral state of the exhaust system E, and the estimated differential output VO2L bar is calculated using their identified gain coefficients a1 hat, a2 hat, b1 hat. Therefore, the accuracy of the estimated differential output VO2L bar is increased in the linear range of the O$_2$ sensor 5. As a result, the stability of the control process of converting the output VO2/OUT of the O$_2$ sensor 5 to the target value VO2/TARGET.

A second embodiment of the present invention will be described below. The second embodiment has the same system arrangement as the first embodiment, but differs from the first embodiment with respect to part of the processing that is carried out by the first estimator 12. Those parts of the second embodiment which are identical to those of the first embodiment are denoted by identical reference characters, and will not be described in detail below.

In the first embodiment described above, the first estimator 12 and the second estimator 23 calculate the estimated differential outputs VO2L bar, VO2F bar, respectively, of the O$_2$ sensor 5 after the total dead time d in order to compensate for the effect of the total dead time d which is the sum of the dead time d1 of the exhaust system E and the dead time d2 of the air-fuel ratio manipulating system (a system composed of the internal combustion engine 1 and the engine control means 8).

However, if the dead time d2 of the air-fuel ratio manipulating system is sufficiently small as compared with the dead time d1 of the exhaust system E, then only the dead time d1 of the exhaust system E may be taken into account, and estimated values VO2L(k+d1) bar, VO2F(k+d1) bar of the differential output VO2 of the O$_2$ sensor 5 after the dead time d1 may be sequentially determined in each control cycle by the first and second estimators 12, 13, and the target air-fuel ratio KCMD may be determined by the sliding mode controller 15 using a combined estimated differential output VO2(k+d1) bar which is a combination of the estimated values (hereinafter referred to as "second estimated differential outputs) VO2L(k+d1) bar, VO2F(k+d1) bar that is produced by the combiner 14 as with the first embodiment. In the present embodiment, the second estimated differential outputs VO2L(k+d1) bar, VO2F(k+d1) bar are determined, and the output VO2/OUT of the O$_2$ sensor 5 is converted to the target value VO2/TARGET.

The first estimator 12 sequentially determines in each control cycle the second estimated differential output VO2 (k+d1) bar as an estimated value after the dead time d1 of the differential output VO2 of the O$_2$ sensor 5 in the same manner as with the preceding embodiment, according to the following equation (39) which is similar to the equation (9) except that "kcmd" and "d" are replaced respectively with "kact" and "d1":

$$\overline{VO2L}(k+d1) = a1 \cdot VO2(k) + a2 \cdot VO2(k-1) + \sum_{j=1}^{d} \beta j \cdot kact(k-j) \tag{39}$$

where
α1=the first-row, first-column element of $A^{d1}$, $\alpha 2$=the first-row, second-column element of $A^{d1}$,
$\beta j$=the first-row elements of $A^{j-1} \cdot B$ $$A = \begin{bmatrix} a1 & a2 \\ 1 & 0 \end{bmatrix}$$

$$B = \begin{bmatrix} b1 \\ 0 \end{bmatrix}$$

The equation (39) is an equation that can be obtained from the equation (1) of the exhaust system model. As with the first embodiment, the identified gain coefficients a1 hat, a2 hat, b1 hat determined by the identifier 11 are used as the gain coefficients a1, a2, b1 required to calculate the equation (39).

With respect to the second estimator 13, the algorithm of the fuzzy inference process thereof (the algorithm of the min-max-center-of-gravity process), the fuzzy rules, and the membership functions (see FIG. 6(c)) manipulating relative to the consequent part may be the same as those of the first embodiment. However, the membership functions (the three functions N (negative), Z (zero), P (positive)) relative to the parameters $\sigma(k)$, VO2(k) of the antecedent part have their shapes (specifically, the positions of the membership functions, the trapezoidal shapes thereof, and the gradients of the slanted sides of the triangular shape) slightly different from those of the first embodiment. These membership functions may specifically be established based on experimentation and simulation such that the second estimated differential output VO2F(k+d1) bar according to the fuzzy inference process is in highly accurate conformity with the actual differential output VO2(k+d1) after the dead time d1 upon the behavior of the $O_2$ sensor 5 in the nonlinear range.

According to the present embodiment, as with the first embodiment, the combiner 14 calculates a combined estimated differential output VO2(k+d1) from the second estimated differential outputs VO2L(k+d1) bar, VO2F(k+d1) bar that are determined respectively by the first and second estimators 12, 13 according to the above algorithms. Specifically, the combiner 14 calculates the combined estimated differential output VO2(k+d1) according to an equation which is similar to the equation (26) except that "d" in the equation (26) is replaced with "d1".

The sliding mode controller 15 determines in each control cycle the equivalent control input Ueq, the reaching control law input Urch, and the adaptive control law input Uadp according to equations similar to the equations (20) through (23) except that "d" in the equations (20) through (23) is replaced with "d1 ", and adds the air-fuel ratio reference value FLAF/BASE to the target differential air-fuel ratio kcmd (=the SLD manipulating input Usl) which is the sum of the equivalent control input Ueq, the reaching control law input Urch, and the adaptive control law input Uadp, thus determining the target air-fuel ratio KCMD. In this manner, the target air-fuel ratio KCMD where the effect of the dead time d1 of the exhaust system E is compensated for can be determined.

Other processing details may be identical to those of the first embodiment. The apparatus according to the present embodiment offers the same advantages as those of the fist embodiment.

The present invention is not limited to the first and second embodiments described above, but they may be modified in various ways.

For example, the first and second estimators 12, 13 for determining estimated values of the output or differential output of the $O_2$ sensor 5 after the total dead time d or estimated values of the output or differential output of the $O_2$ sensor 5 after the dead time d1 of the exhaust system E may determine those estimated values according to algorithms different from those of the first and second embodiments. The algorithms of the estimators 12, 13 may be such that they can basically determine estimated values of relatively good accuracy in certain different output states of the $O_2$ sensor 5.

Estimated values after the total dead time d or the dead time d1 may be calculated using a greater number of estimators (e.g., three or four estimators), and may alternatively be selected to determine the target air-fuel ratio KCMD or the combination of those estimated values may be used to determine the target air-fuel ratio KCMD.

The process of calculating the target air-fuel ratio KCMD using the estimated values after the total dead time d or the dead time d1 may be carried out according to an ordinary sliding mode control process which does not include an adaptive control law (adaptive algorithm), or according to a feedback control process other than the sliding mode control process.

The exhaust gas sensor downstream of the catalytic converter 3 may be any of various other exhaust gas sensors than the $O_2$ sensor (e.g., an NOx sensor, an HC sensor, or a CO sensor). If such another exhaust gas sensor is employed, then the algorithms and the number of estimators for determining estimated value data of the output of the exhaust gas sensor after the total dead time d or the dead time d1 may be selected and established in view of the output characteristics of the exhaust gas sensor.

In the first and second embodiment, the system where the exhaust system E of the internal combustion engine 1 serves as a plant has been described by way of example. However, an apparatus for and a method of controlling a plant according to the present invention is not limited to the above embodiments.

An apparatus for and a method of controlling a plant according to a third embodiment of the present invention will be described below with reference to FIG. 19.

Figure 19:
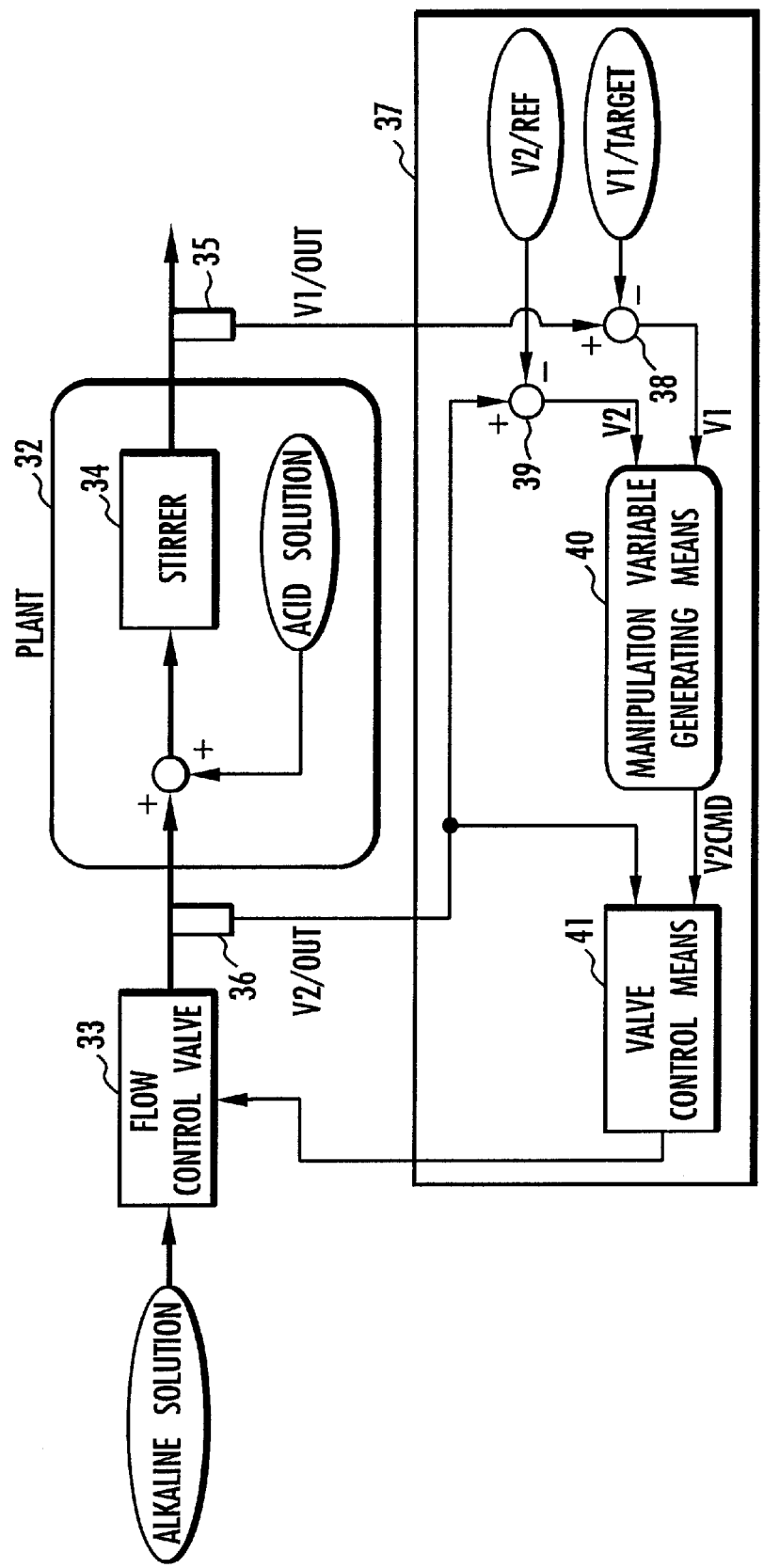
FIG. 19 is a block diagram of an overall system arrangement of an apparatus for controlling a plant according to another embodiment of the present invention.

As shown in FIG. 19, a plant 32 is supplied with an alkaline solution at a flow rate which can be regulated by a flow rate control valve (actuator) 33. The plant 32 mixes the supplied alkaline solution with an acid solution, and stirs them into a mixed solution with a stirrer 34.

The plant control apparatus according to the embodiment serves to control the flow rate of the alkaline solution supplied to the plant 32 for adjusting the pH of the mixed solution (the mixture of the alkaline solution and the acid solution) discharged from the plant 32 to a desired pH, i.e., a pH corresponding to a neutral value.

The plant control apparatus has a pH sensor 35 as a detecting means disposed at the outlet of the plant 32 for detecting the pH of the mixed solution discharged from the plant 32, a flow rate sensor 36 disposed at the inlet of the plant 32 for detecting a flow rate of the alkaline solution supplied to the plant 32, and a control unit 37 for performing a processing operation (described later on) based on respective outputs V1/OUT, V2/OUT of the pH sensor 35 and the flow rate sensor 36.

As with the oxygen concentration sensor in the first and second embodiments described above, the pH sensor 35 has such output characteristics that the output V1/OUT thereof varies substantially linearly with respect to a relatively small range of pH values including a pH value as a target value, and is saturated and of a substantially constant output level at pH values outside of the relatively small range.

The control unit 37 comprises a microcomputer or the like. The control unit 37 comprises, as its functions, a subtractor 38 for calculating the difference V1(=V1/OUT−V1/TARGET) between the output V1/OUT of the pH sensor 35 and its target value V1/TARGET (corresponding to the target pH of the mixed solution) (the difference V1will hereinafter be referred to as "differential output V1" of the pH sensor 35) as data representative of the output of the pH sensor 35, a subtractor 39 for calculating the difference V2 (=V2/OUT−V2/REF) between the output V2/OUT of the flow rate sensor 36 and a predetermined reference value V2/REF (which may be set to any desired value) as data representative of the output of the flow rate sensor 36, a manipulation variable generating means 40 for determining a target flow rate V2CMD for the alkaline solution to be given to the plant 32 for converging the output V1/OUT of the pH sensor 35 to the target value V1/TARGET, as a manipulation variable for defining an input to the plant 32, based on the differential outputs V1, V2, and a valve control means 41 (actuator control means) for feedback-controlling the operation of the flow rate control valve 33 for converging the output V2/OUT (detected flow rate) of the flow rate sensor 36 to the target flow rate V2CMD.

In the description which follows, the difference (=V2CMD−V2/REF) between the target flow rate V2CMD and the reference value V2/REF is referred to as a target differential flow rate v2cmd (corresponding to the target differential air-fuel ratio kcmd in the above embodiments). A system including the flow rate control valve 33 and the valve control means 41, i.e., a system for generating an alkaline solution at a flow rate detected by the flow rate sensor 36 from the target flow rate V2CMD is referred to as a flow rate manipulating system. The flow rate manipulating system corresponds to the air-fuel ratio manipulating system in the above embodiments, and corresponds to an input manipulating system according to the second aspect of the present invention.

The manipulation variable generating means 40 has, as its functions, an identifier, first and second estimators, a combiner, and a sliding mode controller (not shown), as with the manipulation variable generating means 7 according to the first embodiment. The identifier and the first estimator of the manipulation variable generating means 40 employs a model of the plant 32 where VO2, kact of the equation (1) are replaced respectively with the differential outputs V1, V2 and a model of the flow rate manipulating system where kact, kcmd of the equation (2) are replaced respectively with the differential output V2 and the target differential flow rate v2cmd, and perform the same processing operations as the identifier 11 and the estimator 12 of the manipulation variable generating means 7 according to the first embodiment.

Specifically, the manipulation variable generating means 40 calculates identified values (corresponding to the identified gain coefficients a1 hat, a2 hat, b1 hat in the above embodiments) of the parameters of the model of the plant 32, and also calculates an estimated value (corresponding to the estimated differential output VO2L bar in the above embodiments) of the differential output V1of the pH sensor 35 after a total dead time which is a combination of the dead time present in the plant 32 and the dead time present in the flow rate manipulating system. A set value for the dead time in the model of the plant 32 may be determined experimentally or otherwise to be a time (e.g., a constant value) that is equal to or longer than the actual dead time of the plant 32. A set value for the dead time in the model of the flow rate manipulating system may be determined experimentally or otherwise to be a time (e.g., a constant value) that is equal to or longer than the actual dead time of the flow rate manipulating system in view of the operating characteristics of the flow rate control valve 33.

The second estimator of the manipulation variable generating means 40 calculates an estimated value (corresponding to the estimated differential output VO2F bar in the first embodiment) of the differential output V1 of the pH sensor 35 after the total dead time according to a fuzzy inference algorithm (the algorithm of the min-max-center-of-gravity process) constructed in the same manner as with the second estimator 13 in the above embodiments. The fuzzy rules of the fuzzy inference algorithm may be the same as those of the above embodiments, and the membership functions relative to the parameters (the estimated value of the differential output V10 of the pH sensor 35) of the consequent part may be established by three types of bar-shaped functions N (negative), Z (zero), P (positive) as with the above embodiments. The membership functions relative to the parameters (the value of the linear function corresponding to the linear function σ for fuzzy control and the value of the differential output V1in the first embodiment) of the antecedent part may basically be established by three types of triangular or trapezoidal functions N (negative), Z (zero), P (positive). The specific shapes of these membership functions may be established experimentally or otherwise in view of the output characteristics of the pH sensor 35.

The combiner of the manipulation variable generating means 40 generates a combined value of estimated values (corresponding to the combined estimated differential output VO2 bar in the above embodiments) produced by weighting and combining the estimated values with the estimators, as with the above embodiments.

The sliding mode controller of the manipulation variable generating means 40 calculates the target flow rate V2CMD (corresponding to the target air-fuel ratio KCMD in the above embodiments) according to the same processing operation (the adaptive sliding mode control process) as with the first embodiment.

The valve control means 41 feedback-controls the operation of the flow rate control valve 33 to bring the output V2/OUT (detected flow rate) of the flow rate sensor 36 into conformity with the target flow rate V2CMD with a PID controller or adaptive controller, not shown, as with the general feedback controller 21 according to the first embodiment, for example.

With the apparatus according to the present embodiment, the output V1/OUT of the pH sensor 35, i.e., the pH of the mixed solution generated by the plant 32, can be controlled at a desired pH with a quick response irrespectively of the effect of disturbances, the effect of the dead time of the plant 32 and the dead time of the flow rate manipulating system, and the output state of the pH sensor 35, without the need to recognize the pH of the alkaline solution given to the plant 32, the pH of the acid solution mixed with the alkaline solution in the plant 32, and the flow rate of the acid solution.

The plant control apparatus according to the present embodiment compensates for the effect of both the dead time of the plant 32 and the dead time of the flow rate manipulating system. However, if the latter dead time is sufficiently smaller than the former dead time, then as with the second embodiment, estimated values of the differential output V1of the pH sensor 35 after the dead time of the plant 32 may be determined by two estimators, and the target value V2CMD may be generated by the sliding mode controller using a combined value of the estimated values which is produced by the combiner.

The plant control apparatus according to the present embodiment may be modified in various ways similar to the modifications described above with respect to the first and second embodiments.

With respect to the plant control apparatus according to the present embodiment, a system including the plant 32 and the flow rate control valve 33 may be regarded as a plant, and a control system may be constructed for controlling such a system.

Although certain preferred embodiments of the present invention have been shown and described in detail, it should be understood that various changes and modifications may be made therein without departing from the scope of the appended claims.

What is claimed is:

1. An apparatus for controlling a plant for generating an output from an input applied thereto, comprising:

detecting means for detecting the output of said plant;

manipulation variable generating means for sequentially generating a manipulation variable for manipulating the input to said plant in order to converge an output of said detecting means to a predetermined target value; and a plurality of estimating means for sequentially generating data of estimated values of the output of said detecting means after a dead time of said plant, according to respective different algorithms using at least data of the output of said detecting means;

said manipulation variable generating means comprising means for generating said manipulation variable using selectively the estimated value represented by either one of the data generated by said plurality of estimating means under a given condition or using an estimated value which is generated by combining the estimated values represented by the data generated by said plurality of estimating means under the given condition.

2. An apparatus according to claim 1, wherein said manipulation variable generating means comprises means for determining a combined estimated value by weighting and combining the estimated values represented by the data generated by said plurality of estimating means, variably establishing weighting coefficients relative to the estimated values of the respective estimating means under said given condition to determine said combined estimated value including the estimated values of the respective estimating means, and generating said manipulation variable using the determined combined estimated value.

3. An apparatus according to claim 1, wherein said manipulation variable generating means comprises means for generating said manipulation variable according to an adaptive control process.

4. An apparatus according to claim 1, wherein said given condition comprises a condition based on the value of the data of the output of said detecting means.

5. An apparatus according to any one of claims 1, 2, 3, and 4, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

6. An apparatus according to claim 5, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and second estimating means for generating the data representing the estimated value according to the algorithm of a fuzzy inference process.

7. An apparatus according to claim 6, further comprising:

an air-fuel ratio sensor for detecting the air-fuel ratio of the exhaust gas entering said catalytic converter; and identifying means for sequentially identifying parameters to be set of the model of said exhaust system using the data of respective outputs of said air-fuel sensor and said oxygen concentration sensor;

said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

8. An apparatus according to claim 1, wherein said manipulation variable generating means comprises means for generating said manipulation variable according to a sliding mode control process.

9. An apparatus according to claim 8, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

10. An apparatus according to claim 9, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and second estimating means for generating the data representing the estimated value according to the algorithm of a fuzzy inference process, said algorithm of the fuzzy inference process comprising an algorithm for generating the value of a given linear function having as variable components time-series data of the output of said oxygen concentration sensor and determined depending on a switching function used in said sliding mode control process, and the value of the data of the output of said oxygen concentration sensor, as the parameters of an antecedent part of said algorithm of the fuzzy inference process, and also generating the data representing the estimated value as the parameters of a consequent part of the fuzzy inference process.

11. An apparatus according to claim 10, wherein said algorithm of the fuzzy inference process comprises an algorithm constructed based on a min-max-center-of-gravity process, using a plurality of bar-shaped functions as membership functions relative to the parameters of said consequent part.

12. An apparatus according to claim 10, further comprising:
an air-fuel ratio sensor for detecting the air-fuel ratio of the exhaust gas entering said catalytic converter; and
identifying means for sequentially identifying parameters to be set of the model of said exhaust system using the data of respective outputs of said air-fuel sensor and said oxygen concentration sensor;
said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

13. An apparatus according to claim 8, wherein said given condition comprises a combination condition of the value of a given linear function having as variable components time-series data of the output of said detecting means and determined depending on a switching function used in said sliding mode control process, and the value of the data of the output of said detecting means.

14. An apparatus according to claim 13, wherein said switching function comprises a linear function having as variable components time-series data of the difference between the output of said detecting means and said target value, and said given linear function comprises a linear function having coefficient values relative to the variable components thereof, said coefficient values being the same as coefficient values relative to the variable components of said switching function.

15. An apparatus according to claim 13, wherein said combination condition includes a condition as to whether a combination of the value of said linear function and the value of the data of the output of said detecting means is present in a predetermined range on a coordinate plane which has the value of said linear function and the value of the data of the output of said detecting means as coordinate components.

16. An apparatus according to any one of claims 13 through 15, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

17. An apparatus according to claim 16, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and second estimating means for generating the data representing the estimated value according to the algorithm of a fuzzy inference process, said algorithm of the fuzzy inference process comprising an algorithm for generating the value of said given linear function and the data of the output of said oxygen concentration sensor, as the parameters of an antecedent part of said algorithm of the fuzzy inference process, and also generating the data representing the estimated value as the parameters of a consequent part of the fuzzy inference process.

18. An apparatus according to claim 17, wherein said algorithm of the fuzzy inference process comprises an algorithm constructed based on a min-max-center-of-gravity process, using a plurality of bar-shaped functions as membership functions relative to the parameters of said consequent part.

19. An apparatus according to claim 17, further comprising:
an air-fuel ratio sensor for detecting the air-fuel ratio of the exhaust gas entering said catalytic converter; and
identifying means for sequentially identifying parameters to be set of the model of said exhaust system using the data of respective outputs of said air-fuel sensor and said oxygen concentration sensor;
said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

20. An apparatus according to any one of claims 1 through 15, wherein said plurality of estimating means comprise first estimating means for generating the data representing the estimated value according to an algorithm constructed based on a predetermined model of said plant which expresses a behavior of said plant as a system for generating the output of said detecting means from said input via a response delay element and a dead time element, and second estimating means for generating the data representing the estimated value according to the algorithm of a fuzzy inference process.

21. An apparatus for controlling a plant for generating an output from an input applied thereto, comprising:
an actuator for generating the input to said plant;
detecting means for detecting the output of said plant;
manipulation variable generating means for sequentially generating a manipulation variable for manipulating the input to said plant in order to converge an output of said detecting means to a predetermined target value;
actuator control means for controlling said actuator depending on said manipulation variable to manipulate the input to said plant; and
a plurality of estimating means for sequentially generating data of estimated values of the output of said detecting means after a total dead time which is the sum of a dead time of said plant and a dead time of an input manipulating system comprising said actuator control means and said actuator, according to respective different algorithms using at least data of the output of said detecting means;
said manipulation variable generating means comprising means for generating said manipulation variable using selectively the estimated value represented by either one of the data generated by said plurality of estimating means under a given condition or using an estimated value which is generated by combining the estimated values represented by the data generated by said plurality of estimating means under the given condition.

22. An apparatus according to claim 21, wherein said manipulation variable generating means comprises means for determining a combined estimated value by weighting and combining the estimated values represented by the data generated by said plurality of estimating means, variably establishing weighting coefficients relative to the estimated values of the respective estimating means under said given condition to determine said combined estimated value including the estimated values of the respective estimating means, and generating said manipulation variable using the determined combined estimated value.

23. An apparatus according to claim 21, wherein said manipulation variable generating means comprises means for generating said manipulation variable according to an adaptive control process.

24. An apparatus according to claim 21, wherein said given condition comprises a condition based on the value of the data of the output of said detecting means.

25. An apparatus according to any one of claims 22, 23, and 24, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

26. An apparatus according to claim 25, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and second estimating means for generating the data representing the estimated value according to the algorithm of a fuzzy inference process.

27. An apparatus according to claim 26, further comprising:
an air-fuel ratio sensor for detecting the air-fuel ratio of the exhaust gas entering said catalytic converter; and
identifying means for sequentially identifying parameters to be set of the model of said exhaust system using the data of respective outputs of said air-fuel sensor and said oxygen concentration sensor;
said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

28. An apparatus according to claim 21, wherein said manipulation variable generating means comprises means for generating said manipulation variable according to a sliding mode control process.

29. An apparatus according to claim 28, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

30. An apparatus according to claim 29, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and second estimating means for generating the data representing the estimated value according to the algorithm of a fuzzy inference process, said algorithm of the fuzzy inference process comprising an algorithm for generating the value of a given linear function having as variable components time-series data of the output of said oxygen concentration sensor and determined depending on a switching function used in said sliding mode control process, and the value of the data of the output of said oxygen concentration sensor, as the parameters of an antecedent part of said algorithm of the fuzzy inference process, and also generating the data representing the estimated value as the parameters of a consequent part of the fuzzy inference process.

31. An apparatus according to claim 30, wherein said algorithm of the fuzzy inference process comprises an algorithm constructed based on a min-max-center-of-gravity process, using a plurality of bar-shaped functions as membership functions relative to the parameters of said consequent part.

32. An apparatus according to claim 30, further comprising:
an air-fuel ratio sensor for detecting the air-fuel ratio of the exhaust gas entering said catalytic converter; and
identifying means for sequentially identifying parameters to be set of the model of said exhaust system using the data of respective outputs of said air-fuel sensor and said oxygen concentration sensor;
said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

33. An apparatus according to claim 28, wherein said given condition comprises a combination condition of the value of a given linear function having as variable components time-series data of the output of said detecting means and determined depending on a switching function used in said sliding mode control process, and the value of the data of the output of said detecting means.

34. An apparatus according to claim 33, wherein said switching function comprises a linear function having as variable components time-series data of the difference between the output of said detecting means and said target value, and said given linear function comprises a linear function having coefficient values relative to the variable components thereof, said coefficient values being the same as coefficient values relative to the variable components of said switching function.

35. An apparatus according to claim 33, wherein said combination condition includes a condition as to whether a combination of the value of said linear function and the value of the data of the output of said detecting means is present in a predetermined range on a coordinate plane which has the value of said linear function and the value of the data of the output of said detecting means as coordinate components.

36. An apparatus according to any one of claims 33 through 35, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

37. An apparatus according to claim 36, wherein said detecting means comprises an oxygen concentration sensor for generating an output depending on the concentration of oxygen in the exhaust gas which has passed through said catalytic converter, and said plurality of estimating means comprise first estimating means for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and second estimating means for generating the data representing the estimated value according to the algorithm of a fuzzy inference process, said algorithm of the fuzzy inference process comprising an algorithm for generating the value of said given linear function and the data of the output of said oxygen concentration sensor, as the parameters of an antecedent part of said algorithm of the fuzzy inference process, and also generating the data representing the estimated value as the parameters of a consequent part of the fuzzy inference process.

38. An apparatus according to claim 37, wherein said algorithm of the fuzzy inference process comprises an algorithm constructed based on a min-max-center-of-gravity process, using a plurality of bar-shaped functions as membership functions relative to the parameters of said consequent part.

39. An apparatus according to claim 37, further comprising:
an air-fuel ratio sensor for detecting the air-fuel ratio of the exhaust gas entering said catalytic converter; and
identifying means for sequentially identifying parameters to be set of the model of said exhaust system using the data of respective outputs of said air-fuel sensor and said oxygen concentration sensor;
said algorithm of said first estimating means comprising an algorithm for generating the data representing the estimated value using at least the data of the respective outputs of said air-fuel sensor and said oxygen concentration sensor and the parameters of the model of said exhaust system which are identified by said identifying means.

40. An apparatus according to any one of claims 21 through 35, wherein said plurality of estimating means comprise first estimating means for generating the data representing the estimated value according to an algorithm constructed based on a predetermined model of said plant which expresses a behavior of said plant as a system for generating the output of said detecting means from said input via a response delay element and a dead time element and a predetermined model of said input manipulating system which expresses a behavior of said input manipulating system as a system for generating the input to said plant from said manipulation variable via a dead time element, and second estimating means for generating the data representing the estimated value according to the algorithm of a fuzzy inference process.

41. A method of controlling a plant for generating an output from an input applied thereto, comprising the steps of:
detecting the output of said plant with detecting means;
sequentially generating a manipulation variable for manipulating the input to said plant in order to converge an output of said detecting means to a predetermined target value;
sequentially generating data of estimated values of the output of said detecting means after a dead time of said plant, according to a plurality of different estimating algorithms using at least data of the output of said detecting means; and
generating said manipulation variable using selectively the estimated value represented by either one of the data generated by said plurality of estimating algorithms under a given condition or using an estimated value which is generated by combining the estimated values represented by the data generated by said plurality of estimating algorithms under the given condition.

42. A method according to claim 41, further comprising the steps of determining a combined estimated value by weighting and combining the estimated values represented by the data generated by said plurality of estimating algorithms, variably establishing weighting coefficients relative to the estimated values of the respective estimating algorithms under said given condition to determine said combined estimated value including the estimated values of the respective estimating algorithms, and generating said manipulation variable using the determined combined estimated value.

43. A method according to claim 41, wherein said manipulation variable is generated according to an adaptive control process.

44. A method according to claim 41, wherein said given condition comprises a condition based on the value of the data of the output of said detecting means.

45. A method according to any one of claims 41, 42, 43, and 44, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

46. A method according to claim 45, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and a second estimating algorithm for generating the data representing the estimated value according to the algorithm of a fuzzy inference process.

47. A method according to claim 46, further comprising the steps of:
    detecting the air-fuel ratio of the exhaust gas entering said catalytic converter with an air-fuel sensor; and
    sequentially identifying parameters to be set of the model of said exhaust system using the data of respective outputs of said air-fuel sensor and said oxygen concentration sensor;
    said first estimating algorithm comprising an algorithm for generating the data representing the estimated value using at least the data of the respective outputs of said air-fuel sensor and said oxygen concentration sensor and identified values of the parameters of the model of said exhaust system.

48. A method according to claim 41, wherein said manipulation variable is generated according to a sliding mode control process.

49. A method according to claim 48, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

50. A method according to claim 49, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and a second estimating algorithm for generating the data representing the estimated value according to the algorithm of a fuzzy inference process, said second estimating algorithm comprising an algorithm for generating the value of a given linear function having as variable components time-series data of the output of said oxygen concentration sensor and determined depending on a switching function used in said sliding mode control process, and the value of the data of the output of said oxygen concentration sensor, as the parameters of an antecedent part of said algorithm of the fuzzy inference process, and also generating the data representing the estimated value as the parameters of a consequent part of the fuzzy inference process.

51. A method according to claim 50, wherein said algorithm of the fuzzy inference process comprises an algorithm constructed based on a min-max-center-of-gravity process, using a plurality of bar-shaped functions as membership functions relative to the parameters of said consequent part.

52. A method according to claim 50, further comprising the steps of:
    detecting the air-fuel ratio of the exhaust gas entering said catalytic converter with an air-fuel sensor; and
    sequentially identifying parameters to be set of the model of said exhaust system using the data of respective outputs of said air-fuel sensor and said oxygen concentration sensor;
    said first estimating algorithm comprising an algorithm for generating the data representing the estimated value using at least the data of the respective outputs of said air-fuel sensor and said oxygen concentration sensor and identified values of the parameters of the model of said exhaust system.

53. A method according to claim 48, wherein said given condition comprises a combination condition of the value of a given linear function having as variable components time-series data of the output of said detecting means and determined depending on a switching function used in said sliding mode control process, and the value of the data of the output of said detecting means.

54. A method according to claim 53, wherein said switching function comprises a linear function having as variable components time-series data of the difference between the output of said detecting means and said target value, and said given linear function comprises a linear function having coefficient values relative to the variable components thereof, said coefficient values being the same as coefficient values relative to the variable components of said switching function.

55. A method according to claim 53, wherein said combination condition includes a condition as to whether a combination of the value of said linear function and the value of the data of the output of said detecting means is present in a predetermined range on a coordinate plane which has the value of said linear function and the value of the data of the output of said detecting means as coordinate components.

56. A method according to any one of claims 53 through 55, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine and entering said catalytic converter, and said output from the plant comprises the concentration of a component of the exhaust gas which has passed through said catalytic converter.

57. A method according to claim 56, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element, and a second estimating algorithm for generating the data representing the estimated value according to the algorithm of a fuzzy inference process, said second estimating algorithm comprising an algorithm for generating the value of said given linear function and the data of the output of said oxygen concentration sensor, as the parameters of an antecedent part of said algorithm of the fuzzy inference process, and also generating the data representing the estimated value as the parameters of a consequent part of the fuzzy inference process.

58. A method according to claim 57, wherein said algorithm of the fuzzy inference process comprises an algorithm constructed based on a min-max-center-of-gravity process, using a plurality of bar-shaped functions as membership functions relative to the parameters of said consequent part.

59. A method according to claim 57, further comprising the steps of:
detecting the air-fuel ratio of the exhaust gas entering said catalytic converter with an air-fuel sensor; and
sequentially identifying parameters to be set of the model of said exhaust system using the data of respective outputs of said air-fuel sensor and said oxygen concentration sensor;
said first estimating algorithm comprising an algorithm for generating the data representing the estimated value using at least the data of the respective outputs of said air-fuel sensor and said oxygen concentration sensor and identified values of the parameters of the model of said exhaust system.

60. A method according to any one of claims 41 through 55, wherein said plurality of estimating algorithms comprise a first estimating algorithm for generating the data representing the estimated value according to an algorithm constructed based on a predetermined model of said plant which expresses a behavior of said plant as a system for generating the output of said detecting means from said input via a response delay element and a dead time element, and a second estimating algorithm for generating the data representing the estimated value according to the algorithm of a fuzzy inference process.

61. A method of controlling a plant for generating an output from an input generated by an actuator and applied thereto, comprising the steps of:

detecting the output of said plant with detecting means;
sequentially generating a manipulation variable for manipulating the input to said plant in order to converge an output of said detecting means to a predetermined target value;
controlling the operation of said actuator with actuator control means depending on said manipulation variable to manipulate the input to said plant;
sequentially generating data of estimated values of the output of said detecting means after a total dead time which is the sum of a dead time of said plant and a dead time of an input manipulating system comprising said actuator control means and said actuator, according to a plurality of different estimating algorithms using at least data of the output of said detecting means; and
generating said manipulation variable using selectively the estimated value represented by either one of the data generated by said plurality of estimating algorithms under a given condition or using an estimated value which is generated by combining the estimated values represented by the data generated by said plurality of estimating algorithms under the given condition.

62. A method according to claim 61, further comprising the steps of determining a combined estimated value by weighting and combining the estimated values represented by the data generated by said plurality of estimating algorithms, variably establishing weighting coefficients relative to the estimated values of the respective estimating algorithms under said given condition to determine said combined estimated value including the estimated values of the respective estimating algorithms, and generating said manipulation variable using the determined combined estimated value.

63. A method according to claim 61, wherein said manipulation variable is generated according to an adaptive control process.

64. A method according to claim 61, wherein said given condition comprises a condition based on the value of the data of the output of said detecting means.

65. A method according to any one of claims 61, 62, 63, and 64, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

66. A method according to claim 65, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and a second estimating algorithm for generating the data representing the estimated value according to the algorithm of a fuzzy inference process.

67. A method according to claim 66, further comprising the steps of:
   detecting the air-fuel ratio of the exhaust gas entering said catalytic converter with an air-fuel sensor; and
   sequentially identifying parameters to be set of the model of said exhaust system using the data of respective outputs of said air-fuel sensor and said oxygen concentration sensor;
   said first estimating algorithm comprising an algorithm for generating the data representing the estimated value using at least the data of the respective outputs of said air-fuel sensor and said oxygen concentration sensor and identified values of the parameters of the model of said exhaust system.

68. A method according to claim 61, wherein said manipulation variable is generated according to a sliding mode control process.

69. A method according to claim 68, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

70. A method according to claim 69, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and a second estimating algorithm for generating the data representing the estimated value according to the algorithm of a fuzzy inference process, said second estimating algorithm comprising an algorithm for generating the value of a given linear function having as variable components time-series data of the output of said oxygen concentration sensor and determined depending on a switching function used in said sliding mode control process, and the value of the data of the output of said oxygen concentration sensor, as the parameters of an antecedent part of said algorithm of the fuzzy inference process, and also generating the data representing the estimated value as the parameters of a consequent part of the fuzzy inference process.

71. A method according to claim 70, wherein said algorithm of the fuzzy inference process comprises an algorithm constructed based on a min-max-center-of-gravity process, using a plurality of bar-shaped functions as membership functions relative to the parameters of said consequent part.

72. A method according to claim 70, further comprising the steps of:
   detecting the air-fuel ratio of the exhaust gas entering said catalytic converter with an air-fuel sensor; and
   sequentially identifying parameters to be set of the model of said exhaust system using the data of respective outputs of said air-fuel sensor and said oxygen concentration sensor;
   said first estimating algorithm comprising an algorithm for generating the data representing the estimated value using at least the data of the respective outputs of said air-fuel sensor and said oxygen concentration sensor and identified values of the parameters of the model of said exhaust system.

73. A method according to claim 68, wherein said given condition comprises a combination condition of the value of a given linear function having as variable components time-series data of the output of said detecting means and determined depending on a switching function used in said sliding mode control process, and the value of the data of the output of said detecting means.

74. A method according to claim 73, wherein said switching function comprises a linear function having as variable components time-series data of the difference between the output of said detecting means and said target value, and said given linear function comprises a linear function having coefficient values relative to the variable components thereof, said coefficient values being the same as coefficient values relative to the variable components of said switching function.

75. A method according to claim 73, wherein said combination condition includes a condition as to whether a combination of the value of said linear function and the value of the data of the output of said detecting means is present in a predetermined range on a coordinate plane which has the value of said linear function and the value of the data of the output of said detecting means as coordinate components.

76. A method according to any one of claims 73 through 75, wherein said plant comprises an exhaust system ranging from a position upstream of a catalytic converter, which is disposed in an exhaust passage of an internal combustion engine for purifying an exhaust gas flowing in said exhaust passage, to a position downstream of said catalytic converter, and including said catalytic converter, and wherein said input to the plant comprises an air-fuel ratio of the exhaust gas generated by the internal combustion engine as said actuator and entering said catalytic converter, and said output from the plant comprises the concentration of a component of the exhaust gas which has passed through said catalytic converter.

77. A method according to claim 76, wherein said detecting means comprises an oxygen concentration sensor for generating an output depending on the concentration of oxygen in the exhaust gas which has passed through said catalytic converter, and said plurality of estimating algorithms comprise a first estimating algorithm for generating the data representing the estimated value according to an algorithm constructed based on a predetermined model of said exhaust system which expresses a behavior of said exhaust system as a system for generating the output of said oxygen concentration sensor from the air-fuel ratio of the exhaust gas entering said catalytic converter via a response delay element and a dead time element and a predetermined model of said input manipulating system which expresses a behavior of said input manipulating system as a system for generating an air-fuel ratio of the exhaust gas entering said catalytic converter from said manipulation variable via a dead time element, and a second estimating algorithm for generating the data representing the estimated value according to the algorithm of a fuzzy inference process, said second estimating algorithm comprising an algorithm for generating the value of said given linear function and the data of the output of said oxygen concentration sensor, as the parameters of an antecedent part of said algorithm of the fuzzy inference process, and also generating the data representing the estimated value as the parameters of a consequent part of the fuzzy inference process.

78. A method according to claim 77, wherein said algorithm of the fuzzy inference process comprises an algorithm constructed based on a min-max-center-of-gravity process, using a plurality of bar-shaped functions as membership functions relative to the parameters of said consequent part.

79. A method according to claim 77, further comprising the steps of:
  detecting the air-fuel ratio of the exhaust gas entering said catalytic converter with an air-fuel sensor; and
  sequentially identifying parameters to be set of the model of said exhaust system using the data of respective outputs of said air-fuel sensor and said oxygen concentration sensor;
  said first estimating algorithm comprising an algorithm for generating the data representing the estimated value using at least the data of the respective outputs of said air-fuel sensor and said oxygen concentration sensor and identified values of the parameters of the model of said exhaust system.

80. A method according to any one of claims 61 through 75, wherein said plurality of estimating algorithms comprise a first estimating algorithm for generating the data representing the estimated value according to an algorithm constructed based on a predetermined model of said plant which expresses a behavior of said plant as a system for generating the output of said detecting means from said input via a response delay element and a dead time element and a predetermined model of said input manipulating system which expresses a behavior of said input manipulating system as a system for generating the input to said plant from said manipulation variable via a dead time element, and a second estimating algorithm for generating the data representing the estimated value according to the algorithm of a fuzzy inference process.

* * * * *

UNITED STATES PATENT AND TRADEMARK OFFICE
CERTIFICATE OF CORRECTION

PATENT NO. : 6,684,150 B2
DATED : January 27, 2004
INVENTOR(S) : Yuji Yasui et al.

It is certified that error appears in the above-identified patent and that said Letters Patent is hereby corrected as shown below:

Column 56,
Line 35, replace "20. An apparatus according to any one of claims 1 through 15," with
-- 20. An apparatus according to any one of claims 1, 2, 3, 4, 8, 13, 14, and 15, --

Column 57,
Line 24, replace "25. An apparatus according to any one of claims 22, 23, and 24," with
-- 25. An apparatus according to any one of claims 21, 22, 23, and 24, --

Column 60,
Line 24, replace "40. An apparatus according to any one of claims 21 through 35," with
-- 40. An apparatus according to any one of claims 21, 22, 23, 24, 28, 33, 34 and 35, --

Column 63,
Line 54, replace "60. A method according to any one of claims 41 through 55," with
-- 60. A method according to any one of claims 41, 42, 43, 44, 48, 53, 54 and 55, --

Column 68,
Line 10, replace "80. A method according to any one of claims 61 through 75" with
-- 80, A method according to any one of 61, 62, 63, 64, 68, 73, 74 and 75, --

Signed and Sealed this

Fifteenth Day of February, 2005

JON W. DUDAS
*Director of the United States Patent and Trademark Office*